United States Patent
Sato

(10) Patent No.: US 7,911,708 B2
(45) Date of Patent: Mar. 22, 2011

(54) ZOOM LENS AND OPTICAL APPARATUS AND METHOD FOR MANUFACTURING THEREOF

(75) Inventor: Susumu Sato, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 82 days.

(21) Appl. No.: 12/275,141

(22) Filed: Nov. 20, 2008

(65) Prior Publication Data
US 2009/0190234 A1 Jul. 30, 2009

(30) Foreign Application Priority Data

Nov. 22, 2007 (JP) ................................. 2007-303108
Nov. 22, 2007 (JP) ................................. 2007-303109

(51) Int. Cl.
*G02B 15/14* (2006.01)
(52) U.S. Cl. .................... 359/687; 359/684; 359/676
(58) Field of Classification Search .................. 359/676, 359/683, 684, 686, 687
See application file for complete search history.

(56) References Cited

U.S. PATENT DOCUMENTS

| | | | |
|---|---|---|---|
| 6,853,496 B2 | 2/2005 | Eguchi | |
| 7,023,624 B2 | 4/2006 | Nanba | |
| 7,061,686 B2 | 6/2006 | Ohtake | |
| 7,075,731 B1 | 7/2006 | Yamada | |
| 7,420,745 B2 | 9/2008 | Ohashi | |
| 7,457,047 B2 * | 11/2008 | Noguchi et al. | 359/687 |
| 7,492,526 B2 * | 2/2009 | Sato | 359/687 |
| 7,525,737 B2 * | 4/2009 | Itoh | 359/687 |
| 7,605,987 B2 * | 10/2009 | Nishimura | 359/687 |

FOREIGN PATENT DOCUMENTS

| | | | |
|---|---|---|---|
| EP | 2071380 A2 * | 6/2009 | |
| JP | 04-171411 A | 6/1992 | |
| JP | 2003-202499 A | 7/2003 | |
| JP | 2004-094233 A | 3/2004 | |
| JP | 2004-94233 A | 3/2004 | |
| JP | 2004-212616 A | 7/2004 | |
| JP | 2005-062228 A | 3/2005 | |
| JP | 2005-62228 A | 3/2005 | |
| JP | 2006-308957 A | 11/2006 | |

* cited by examiner

*Primary Examiner* — David N Spector
(74) *Attorney, Agent, or Firm* — Miles & Stockbridge P.C.

(57) ABSTRACT

A zoom lens includes a first lens group having a positive refractive power, a second lens group having a negative refractive power, a third lens group having a positive refractive power, and a fourth lens group having a positive refractive power, which are disposed in order from an object along the optical axis, wherein the third lens group comprises: a pre-group, which has a first positive lens, a negative meniscus lens having a convex surface facing the object, a second positive lens, and which has a positive refractive power; and a negative meniscus lens having a convex surface facing the object, which are disposed in order from the object; at least one of three surfaces of an object side and image side lens surfaces of the first positive lens and an object side lens surface of the negative meniscus lens is aspherical; and at least one of three surfaces of an object side lens surface of the second positive lens, and an object side and image side lens surfaces of the negative meniscus lens is aspherical.

49 Claims, 79 Drawing Sheets

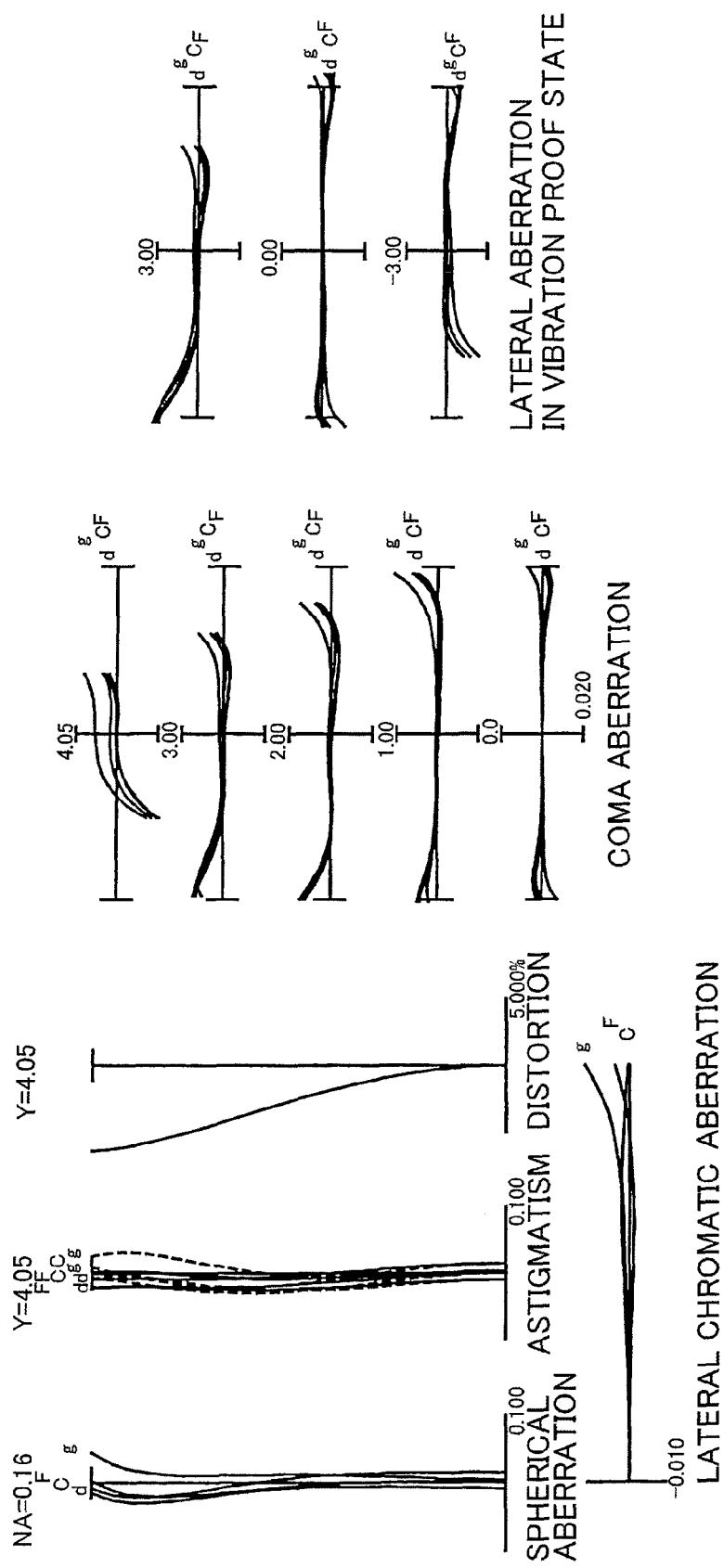

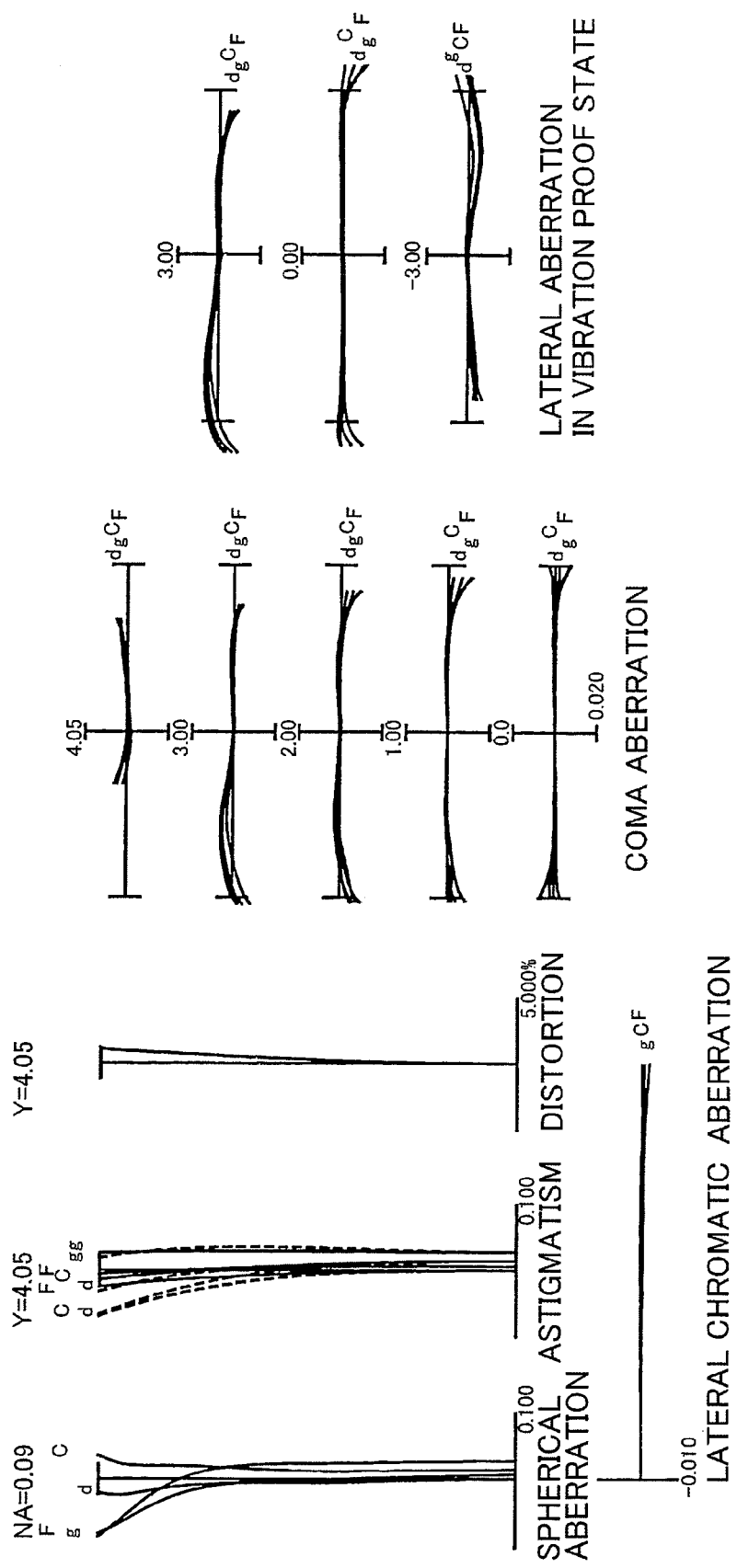

Fig.5
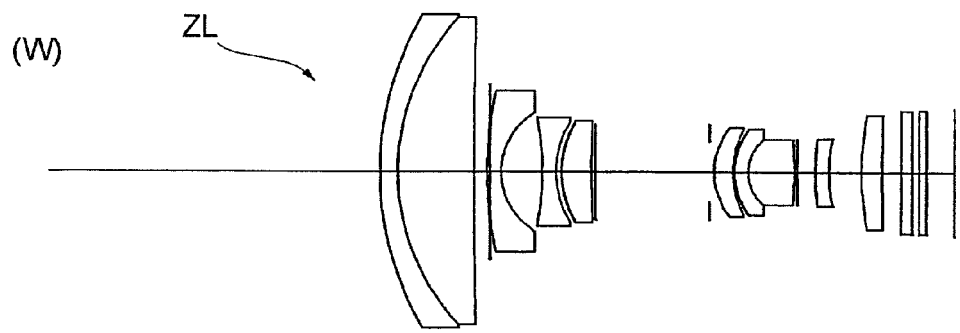
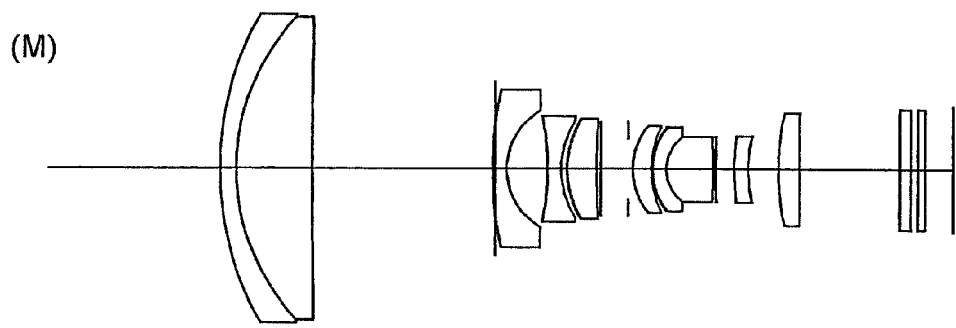
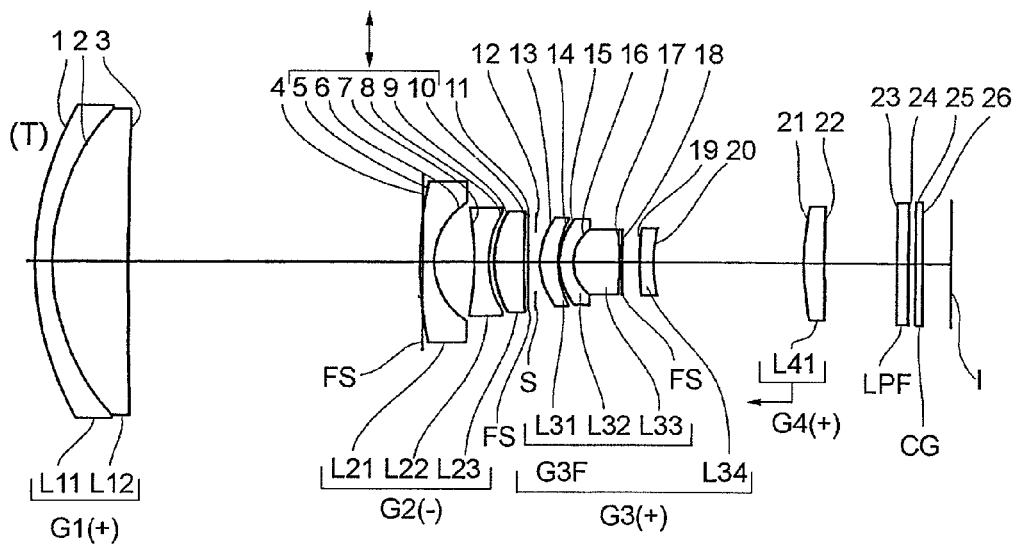

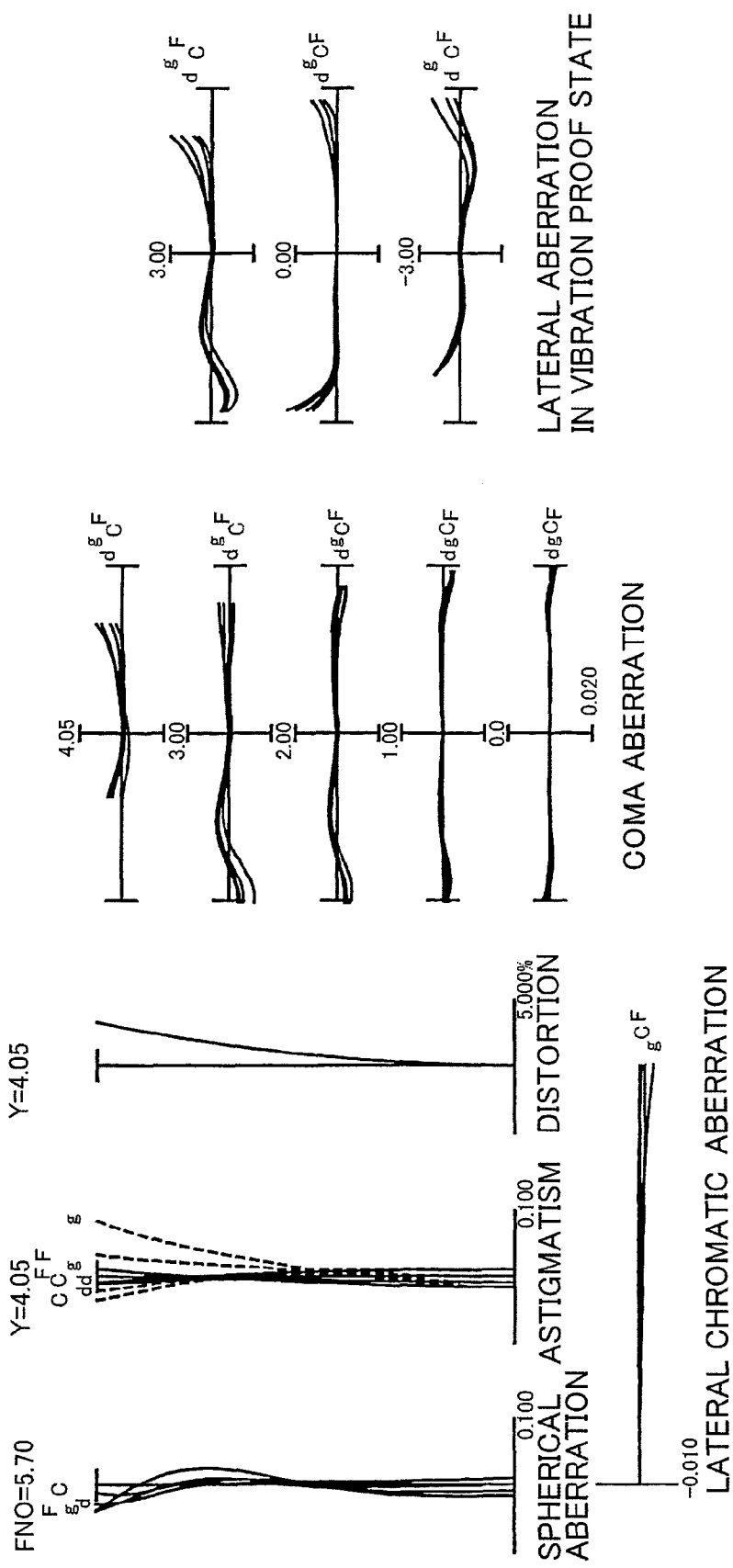

*Fig. 11*
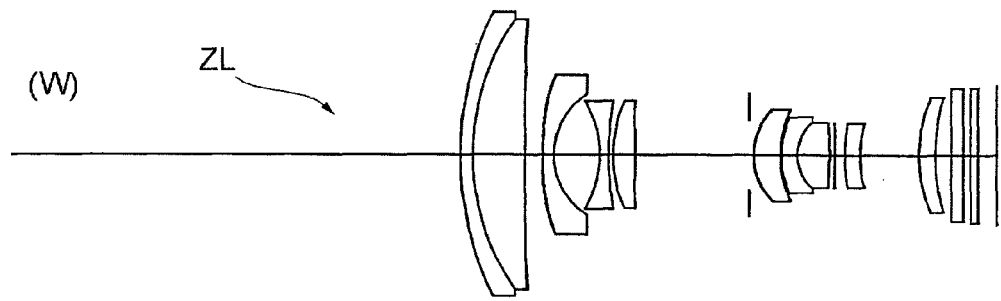
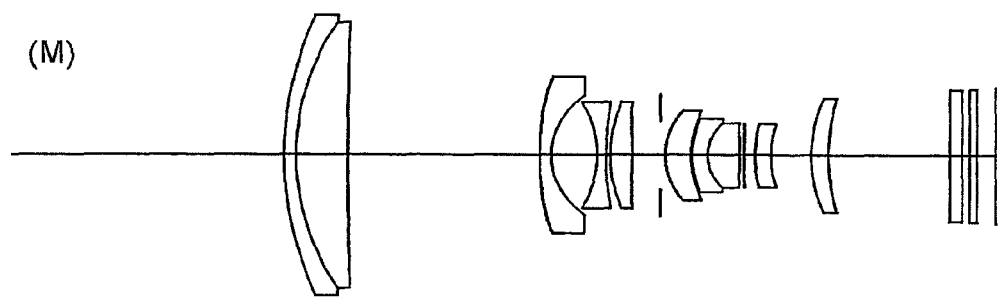
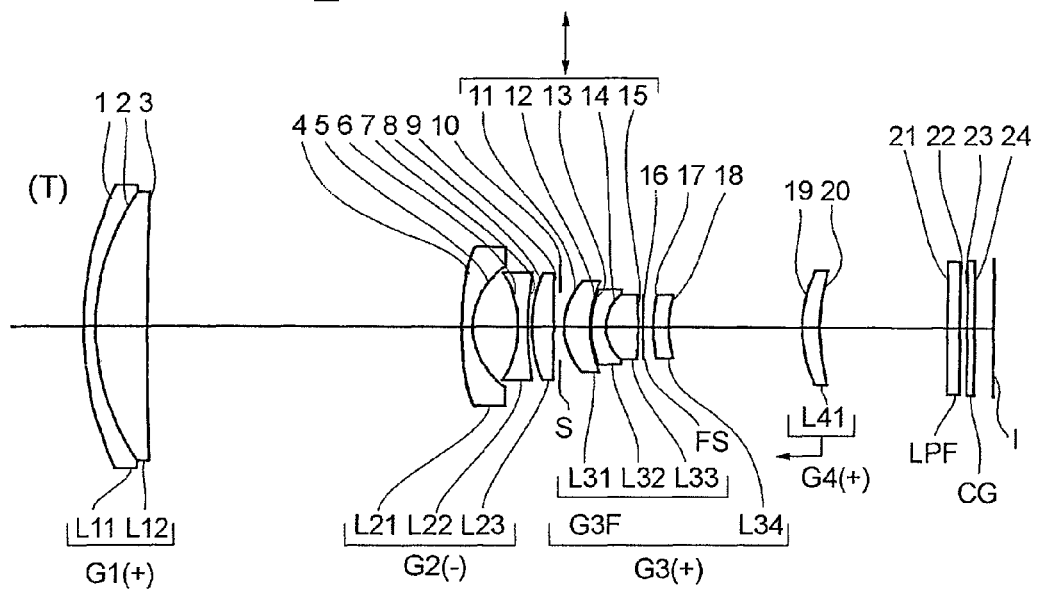

Fig. 14
FIFTH EXAMPLE
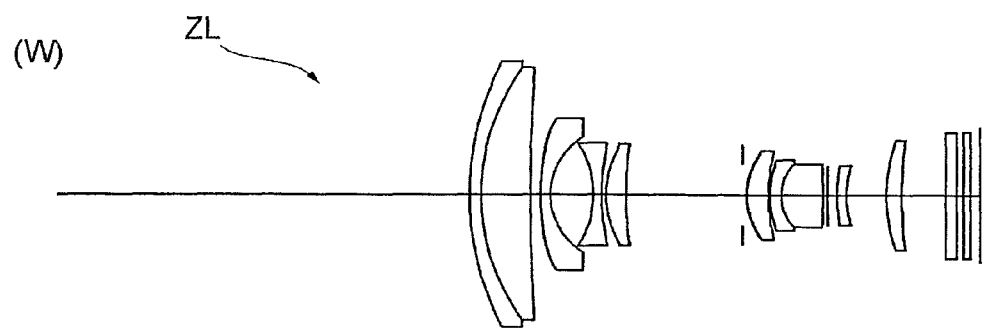
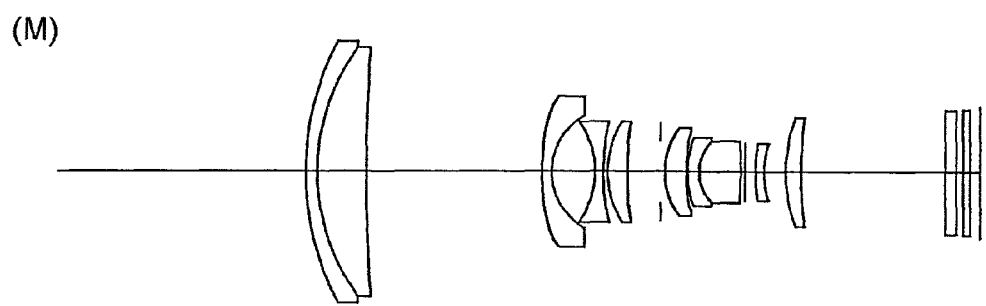
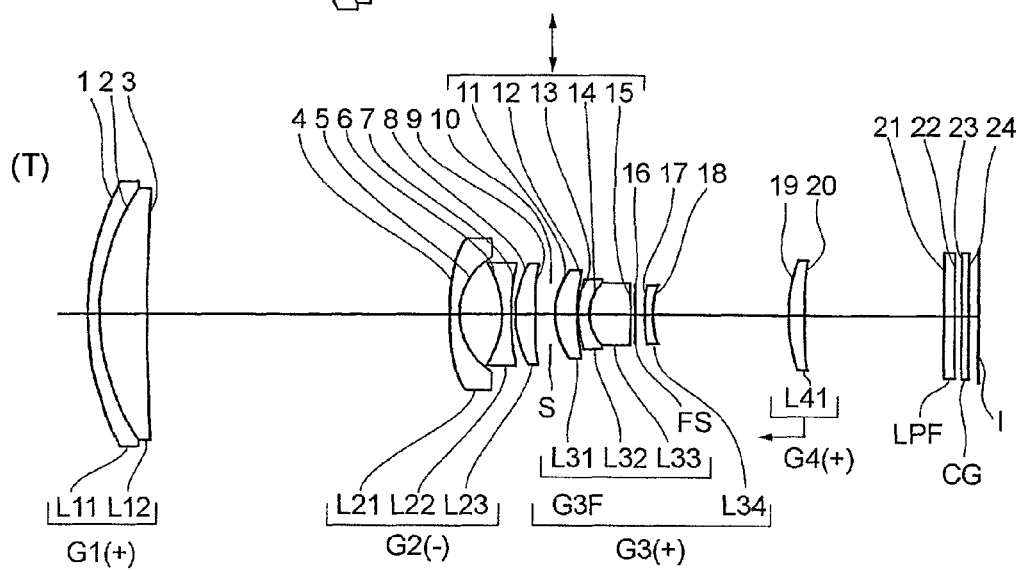

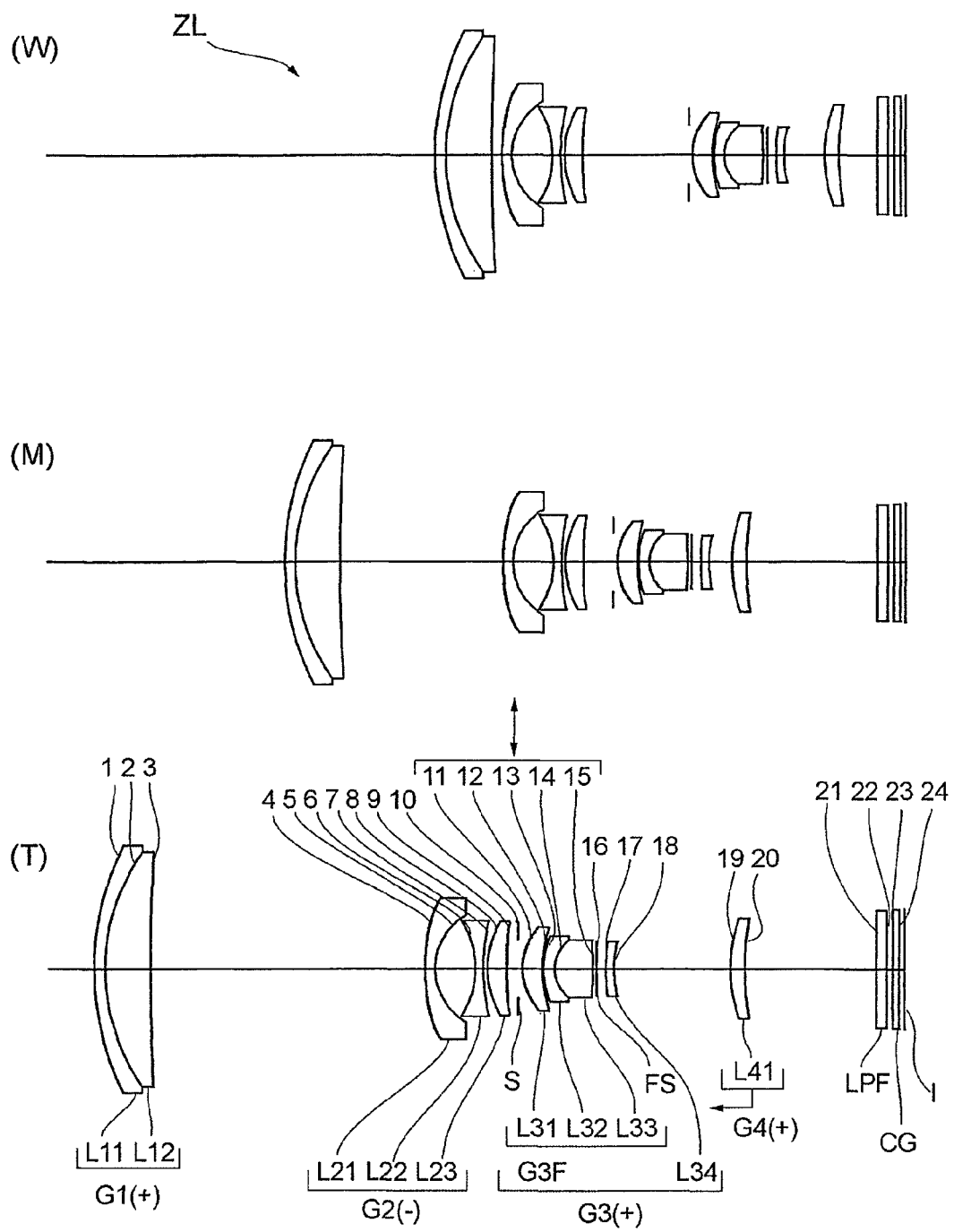

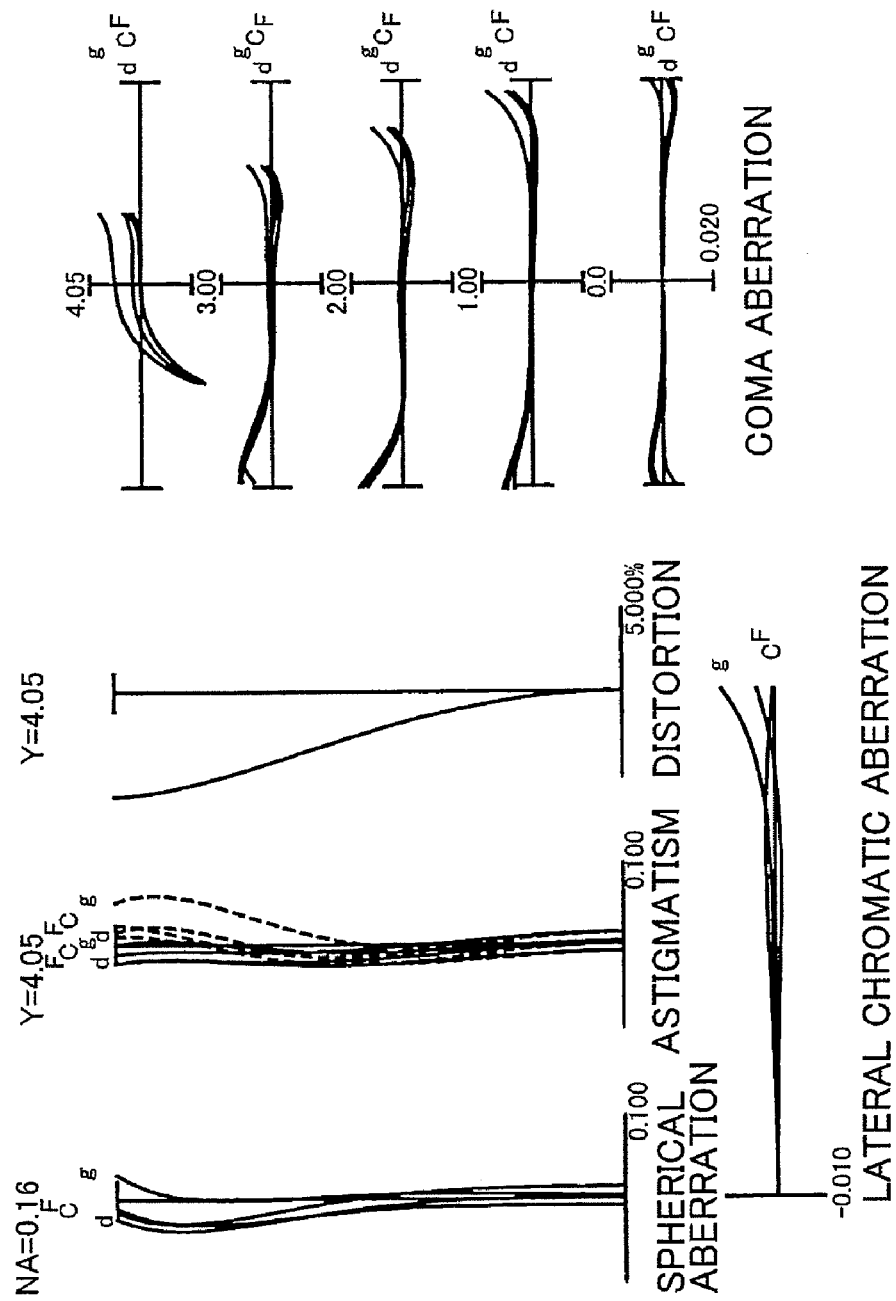

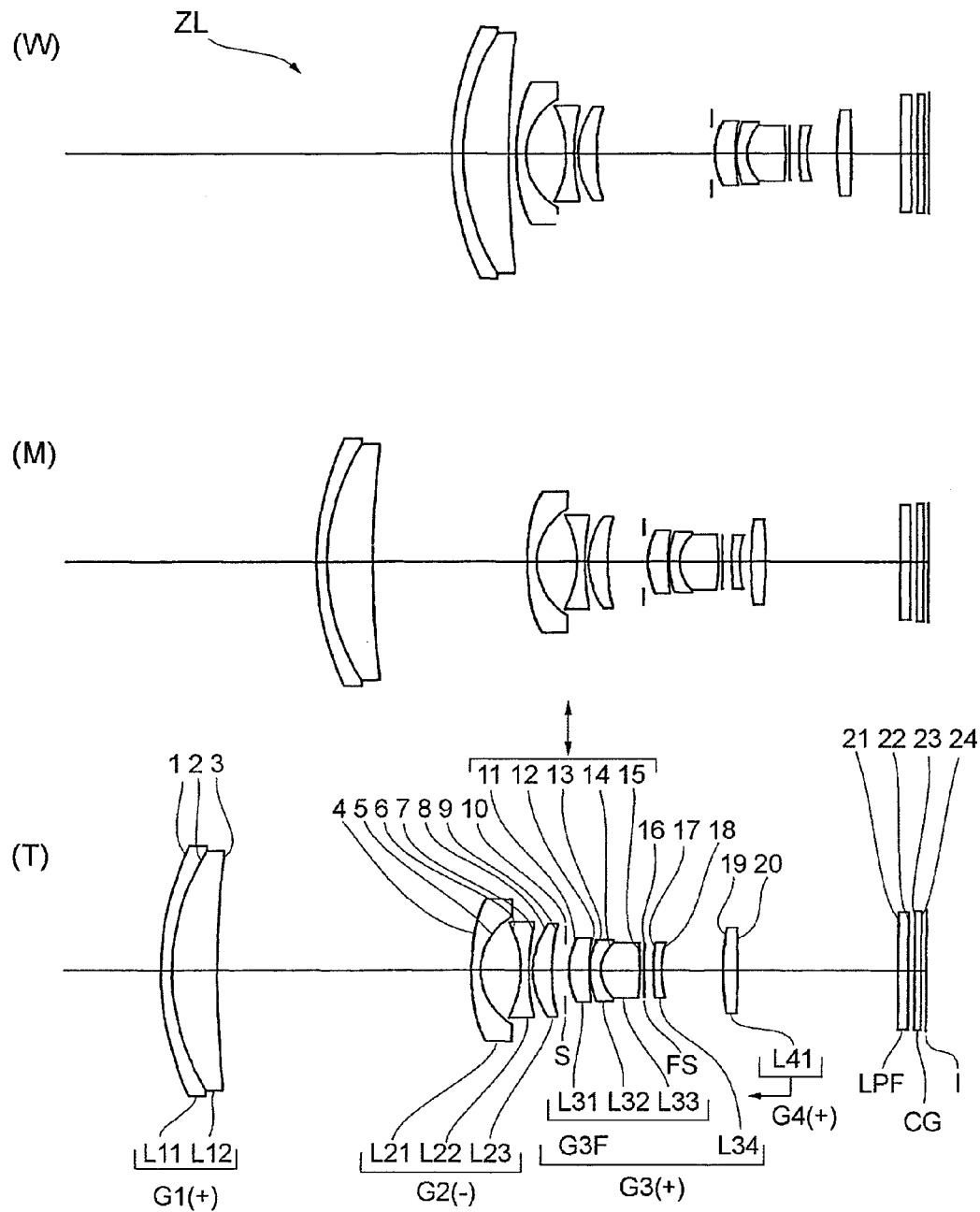

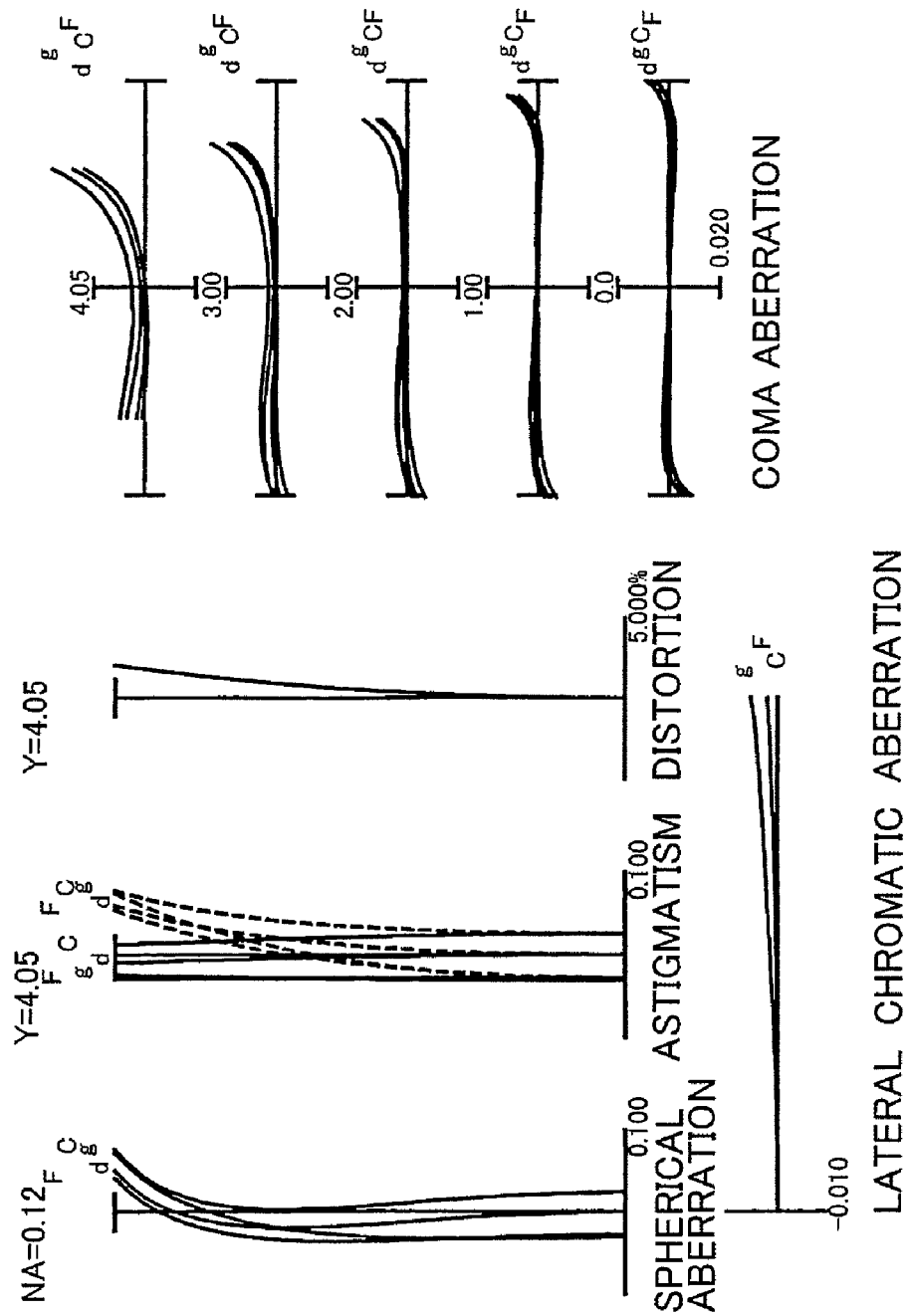

ZOOM LENS AND OPTICAL APPARATUS AND METHOD FOR MANUFACTURING THEREOF

INCORPORATION BY REFERENCE

This invention claims the benefit of Japanese Patent Applications No. 2007-303108 and No. 2007-303109 which are hereby incorporated by reference.

FIELD OF THE INVENTION

The present invention relates to a zoom lens which is suitable for an electronic still camera, and an optical apparatus and manufacturing method thereof.

BACKGROUND OF THE INVENTION

A four-group configuration zoom lens comprised of a first lens group having a positive refractive power, a second lens group having a negative refractive power, a third lens group having a positive refractive power and a fourth lens group having a positive refractive power, which are disposed in order from an object, has been proposed (e.g. Japanese Patent Application Laid-Open No. H4-171411, No. 2005-62228, No. 2004-212616, No. 2004-94233 and No. 2006-308957).

PROBLEMS TO BE SOLVED BY THE INVENTION

However, in the case of the zoom lenses of the above patent documents, the total length of the lenses with respect to the focal length in the wide-angle end state is long, so illumination light is eclipsed by the object side structure of the lens barrel (a part of the illumination light is interrupted by the object side structure) when stroboscopic photography is performed in the wide-angle end state.

Also in the case of the zoom lenses of Japanese Patent Application Laid-Open No. 2004-212616 and No. 2004-94233, the variable power ratio is only about 4 times, while the photographing angle of view in the wide-angle end state is about 35°. In the case of the zoom lens of Japanese Patent Application Laid-Open No. 2006-308957, the photographing angle of view is wide, but the total length of the lenses with respect to the focal length in the wide-angle end state is long, so the illumination light is eclipsed by the object side structure of the lens barrel when stroboscopic photography is performed in the wide-angle end state.

SUMMARY OF THE INVENTION

With the foregoing in view, it is an object of the present invention to provide a compact zoom lens having an excellent optical performance, and an optical apparatus and manufacturing method thereof.

A zoom lens of the present invention has a first lens group having positive refractive power, a second lens group having a negative refractive power, a third lens group having a positive refractive power, and a fourth lens group having a positive refractive power, which are disposed in order from the object, wherein the third lens group has a 3rd group-1st positive lens, a 3rd group-2nd negative lens, a 3rd group-3rd positive lens and a 3rd group-4th negative lens, which are disposed in order from the object, at least one of the three surfaces of an object side lens surface of the 3rd group-1st positive lens, an image side lens surface of the 3rd group-1st positive lens, and an object side lens surface of the 3rd group-2nd negative lens is aspherical, and at least one of the three surfaces of an image side lens surface of the 3rd group-3rd positive lens, an object side lens surface of the 3rd group-4th negative lens, and an image side lens surface of the 3rd group-4th negative lens is aspherical.

In the above zoom lens, it is preferable that a radius of curvature of the image side lens surface of the 3rd group-2nd negative lens and a radius of curvature of the object side lens surface of the 3rd group-3rd positive lens are smaller than a radius of curvature of other lens surfaces constituting the third lens group.

In the above zoom lens, it is preferable that a condition of the following expression $$-0.6 < f30/f34 < -0.1$$

is satisfied, where f30 is a focal length of the third lens group, and f34 is a focal length of the 3rd group-4th negative lens.

In the above zoom lens, it is preferable that in the third lens group, the 3rd group-2nd negative lens and the 3rd group-3rd positive lens are cemented to be a cemented lens.

In the above zoom lens, it is preferable that a condition of the following expression $$-0.24 < fG3F/(f34 \times N3n) < -0.05$$

is satisfied, where fG3F is a composite focal length of the 3rd group-1st positive lens, the 3rd group-2nd negative lens and the 3rd group-3rd positive lens, f34 is a focal length of the 3rd group-4th negative lens, and N3n is an average refractive index of the 3rd group-2nd negative lens and the 3rd group-4th negative lens.

In the above zoom lens, it is preferable that a condition of the following expression $$0.03 < (Fw \times f30)/Ft^2 < 0.08$$

is satisfied, where Fw is a focal length of the zoom lens in a wide-angle end state, f30 is a focal length of the third lens group, and Ft is a focal length of the zoom lens in a telephoto end state.

In the above zoom lens, it is preferable that a condition of the following expression $$0.28 < d33/d30 < 0.60$$

is satisfied, where d33 is a thickness of the 3rd group-3rd positive lens on an optical axis, and d30 is a thickness of the third lens group on the optical axis.

In the above zoom lens, it is preferable that at least a part of the third lens group is moved in a direction vertical to the optical axis of the zoom lens.

In the above zoom lens, it is preferable that the image side lens surface of the 3rd group-3rd positive lens is aspherical.

In the above zoom lens, it is preferable that in the third lens group, a flare cut stop is disposed between the 3rd group-3rd positive lens and the 3rd group-4th negative lens.

In the above zoom lens, it is preferable that at least a part of the second lens group is moved in a direction vertical to the optical axis of the zoom lens.

In the above zoom lens, it is preferable that a flare cut stop is disposed at the object side and the image side of the second lens group respectively.

In the above zoom lens, it is preferable that upon zooming from a wide-angle end state to a telephoto end state, the first lens group and the third lens group are moved to the object, the second lens group is moved in a concave locus facing the object, and the fourth lens group is moved in a convex locus facing the object.

In the above zoom lens, it is preferable that the fourth lens group is consisted of a positive meniscus lens having a convex surface facing the object, and to move to the object when focusing.

In the above zoom lens, it is preferable that at least one of the 3rd group-2nd negative lens and the 3rd group-4th negative lens is a negative meniscus lens having a convex surface facing the object.

Another zoom lens according to the present invention has a first lens group having a positive refractive power, a second lens group having a negative refractive power, a third lens group having a positive refractive power, and a fourth lens group having a positive refractive power, which are disposed in order from an object, wherein the first lens group has a 1st group-1st negative lens and a 1st group-2nd positive lens, which are disposed in order from the object, the second lens group has a 2nd group-1st negative lens, a 2nd group-2nd negative lens, and a 2nd group-3rd positive lens, which are disposed in order from the object, an object side lens surface of the 2nd group-1st negative lens is aspherical, and the 2nd group-3rd positive lens has at least one aspherical surface.

In the above zoom lens, it is preferable that a condition of the following expression $$-0.15 < F2/F1 < -0.05$$

is satisfied, where F1 is a focal length of the first lens group, and F2 is a focal length of the second lens group.

In the above zoom lens, it is preferable that a condition of the following expression $$0.57 < F4/F1 < 1.30$$

is satisfied, where F1 is a focal length of the first lens group, and F4 is a focal length of the fourth lens group.

In the above zoom lens, it is preferable that a condition of the following expression $$1.85 < N11 < 2.30$$

is satisfied, where N11 is a refractive index of the 1st group-1st negative lens.

In the above zoom lens, it is preferable that the 1st group-1st negative lens and the 1st group-2nd positive lens are cemented, and the 2nd group-1st negative lens, the 2nd group-2nd negative lens, and the 2nd group-3rd positive lens are all single lenses.

In the above zoom lens, it is preferable that a condition of the following expression $$-0.15 < R12F/R12I < 0.25$$

is satisfied, where R12F is a radius of curvature of an object side lens surface of the 1st group-2nd positive lens, and R12I is a radius of curvature of an image side lens surface of the 1st group-2nd positive lens.

In the above zoom lens, it is preferable that a condition of the following expression $$-0.15 < R23F/R23I < 0.30$$

is satisfied, where R23F is a radius of curvature of an object side lens surface of the 2nd group-3rd positive lens, and R23I is a radius of curvature of an image side lens surface of the 2nd group-3rd positive lens.

In the above zoom lens, it is preferable that the third lens group has a 3rd group-1st positive lens, a 3rd group-2nd negative meniscus lens having a convex surface facing the object, a 3rd group-3rd positive lens, and a 3rd group-4th negative meniscus lens having a convex surface facing the object, which are disposed in order from the object.

In the above zoom lens, it is preferable that the fourth lens group has a 4th group-1st positive lens having the object side lens surface having a convex surface facing the object, an absolute value of a radius of curvature of the object side lens surface of the 4th group-1st positive lens is smaller than an absolute value of a radius of curvature of the image side lens surface of the 4th group-1st positive lens, and the 4th group-1st positive lens moves to the object when focusing.

In the above zoom lens, it is preferable that when power is changed from a wide-angle focal length to a telephoto focal length, the first lens group and the third lens group are moved to the object, the second lens group is moved in a concave locus facing the object, and the fourth lens group is moved in a convex locus facing the object.

In the above zoom lens, it is preferable that at least one of the 1st group-1st negative lens and the 2nd group-1st negative lens is a negative meniscus lens the convex surface facing the object.

In the above zoom lens, it is preferable that the 2nd group-2nd negative lens has a biconcave shape.

Another zoom lens according to the present invention has a first lens group having a positive refractive power, a second lens group having a negative refractive power, a third lens group having a positive refractive power, and a fourth lens group having a positive refractive power, which are disposed in order from an object, wherein the second lens group and the third lens group have a plurality of lenses, a lens surface closest to the object, of the second lens group, is aspherical, at least one surface of a lens disposed closest to the image, of the second lens group, is aspherical, at least one surface from a lens surface closest to the object, of the third lens group, to an object side lens surface of a lens having a greatest central thickness in the third lens group is aspherical, and at least one surface from an image side lens surface of the lens having a greatest central thickness in the third lens group to a lens surface closest to the image of the third lens group is aspherical.

In the above zoom lens, it is preferable that the third lens group has a negative meniscus lens having a convex surface facing the object.

In the above zoom lens, it is preferable that the first lens group has a 1st group-1st negative lens and a 1st group-2nd positive lens, which are disposed in order from the object, and the second lens group has a 2nd group-1st negative lens, a 2nd group-2nd negative lens, and a 2nd group-3rd positive lens, which are disposed in order from the object.

In the above zoom lens, it is preferable that the third lens group has a 3rd group-1st positive lens, a 3rd group-2nd negative lens, a 3rd group-3rd positive lens, and a 3rd group-4th negative lens, which are disposed in order from the object.

In the above zoom lens, it is preferable that the lens of which central thickness is greatest in the third lens group is the 3rd group-3rd positive lens.

A method for manufacturing a zoom lens according to the present invention has steps of: arranging a first lens group having a positive refractive power, a second lens group having a negative refractive power, a third lens group having a positive refractive power, and a fourth lens group having a positive refractive power, which are disposed in order from an object; arranging, in the third lens group, a 3rd group-1st positive lens, a 3rd group-2nd negative lens, a 3rd group-3rd positive lens and a 3rd group-4th negative lens, which are disposed in order from the object; forming at least one of three surfaces of an object side lens surface of the 3rd group-1st positive lens, an image side lens surface of the 3rd group-1st positive lens, and an object side lens surface of the 3rd group-2nd negative lens to be aspherical; and forming at least one of three surfaces of an image side lens surface of the 3rd group-3rd positive lens, an object side lens surface of the 3rd group-4th negative lens, and an image side lens surface of the 3rd group-4th negative lens to be aspherical.

In the above manufacturing method for a zoom lens, it is preferable that at least one of the 3rd group-2nd negative lens and the 3rd group-4th negative lens is a negative meniscus lens having a convex surface facing the object.

In the above manufacturing method for a zoom lens, it is preferable that in the third lens group, the 3rd group-2nd negative lens and the 3rd group-3rd positive lens are cemented to be a cemented lens.

In the above manufacturing method for a zoom lens, it is preferable that at least a part of the third lens group is moved in a direction vertical to the optical axis of the zoom lens.

In the above manufacturing method for a zoom lens, it is preferable that at least a part of the second lens group is moved in a direction vertical to the optical axis of the zoom lens.

In the above manufacturing method for a zoom lens, it is preferable that upon zooming from a wide-angle end state to a telephoto end state, the first lens group and the third lens group are moved to the object, the second lens group is moved in a concave locus facing the object, and the fourth lens group is moved in a convex locus facing the object.

In the above manufacturing method for a zoom lens, it is preferable that the fourth lens group is moved to the object when focusing.

Another manufacturing method for a zoom lens according to the present invention comprises steps of: arranging a first lens group having a positive refractive power, a second lens group having a negative refractive power, a third lens group having a positive refractive power, and a fourth lens group having a positive refractive power, which are disposed in order from an object; arranging, in the first lens group, a 1st group-1st negative lens and a 1st group-2nd positive lens which are disposed in order from the object; arranging, in the second lens group, a 2nd group-1st negative lens, a 2nd group-2nd negative lens, and a 2nd group-3rd positive lens which are disposed in order from the object; forming an object side lens surface of the 2nd group-1st negative lens to be aspherical; and forming at least one surface of the 2nd group-3rd positive lens is aspherical.

In the above manufacturing method for a zoom lens, it is preferable that the 1st group-1st negative lens and the 1st group-2nd positive lens are cemented, and the 2nd group-1st negative lens, the 2nd group-2nd negative lens and the 2nd group-3rd positive lens are all single lenses.

In the above manufacturing method for a zoom lens, it is preferable that the fourth lens group is moved to the object when focusing.

In the above manufacturing method for a zoom lens, it is preferable that upon zooming from a wide-angle focal length to a telephoto focal length, the first lens group and the third lens group are moved to the object, the second lens group is moved in a concave locus facing the object, and the fourth lens group is moved in a convex locus facing the object.

Another manufacturing method for a zoom lens according to the present invention comprises steps of: arranging a first lens group having a positive refractive power, a second lens group having a negative refractive power, a third lens group having a positive refractive power, and a fourth lens group having a positive refractive power, which are disposed in order from an object; arranging a plurality of lenses in the second lens group and the third lens group; forming a lens surface closest to the object, of the second lens group, to be aspherical; forming at least one surface of a lens disposed closest to the image, of the second lens group, to be aspherical; forming at least one surface from a lens surface closest to the object, of the third lens group, to an object side lens surface of a lens having a greatest central thickness in the third lens group to be aspherical; and forming at least one surface from an image side lens surface of a lens having a greatest central thickness in the third lens group to a lens surface closest to the image side, of the third lens group, to be aspherical.

In the above manufacturing method for a zoom lens, it is preferable that a 1st group-1st negative lens and a 1st group-2nd positive lens are disposed in order form the object in the first lens group, and a 2nd group-1st negative lens, a 2nd group-2nd negative lens, and a 2nd group-3rd positive lens are disposed in order from the object in the second lens group.

In the above manufacturing method for a zoom lens, it is preferable that a 3rd group-1st positive lens and a 3rd group-2nd negative lens, a 3rd group-3rd positive lens, and a 3rd group-4th negative lens are disposed in order from the object in the third lens group.

In the above manufacturing method for a zoom lens, it is preferable that the fourth lens group is moved to the object when focusing.

In the above manufacturing method for a zoom lens, it is preferable that upon zooming from a wide-angle focal length to a telephoto focal length, the first lens group and the third lens group are moved to the object, the second lens group is moved in a concave locus facing the object, and the fourth lens group is moved in a convex locus facing the object.

An optical apparatus according to the present invention is constructed by equipping the above zoom lenses.

ADVANTAGEOUS EFFECTS OF THE INVENTION

As described above, according to the present invention, a compact zoom lens having an excellent optical performance, and an optical apparatus and a manufacturing method thereof can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 3 are graphs showing various aberrations of the zoom lens in the infinity focusing state and lateral aberrations in the vibration proof state according to the first example, where

FIG. 4 are graphs showing various aberrations of the zoom lens in the close distance focusing state and lateral aberrations in the vibration proof state according to the first example, where FIG. 4A is a case of a wide-angle end state, FIG. 4C is a case of a telephoto end state;

FIG. 5 are cross-sectional views depicting a configuration of a zoom lens according to a second example, where (W) shows a wide-angle end state in an infinity focusing state, (M) shows an intermediate focal length state in the infinity focusing state, and (T) is a telephoto end state in the infinity focusing state;

FIG. 6 graphs showing various aberrations of the zoom lens in the infinity focusing state and lateral aberration in the vibration proof state according to the second example, where FIG. 6C is a case of a telephoto end state;

FIG. 7 are graphs showing various aberrations of the zoom lens in the close distance focusing state and lateral aberrations in the vibration proof state according to the second example, where

FIG. 9 are graphs showing various aberrations of the zoom lens in the infinity focusing state and lateral aberrations in the vibration proof state in the third example, where

FIG. 10 are graphs showing various aberrations of the zoom lens in the close distance focusing state and lateral aberrations in the vibration proof state according to the third example, where

FIG. 11 are cross-sectional views depicting a configuration of a zoom lens according to a fourth example, where (W) shows a wide-angle end state in an infinity focusing state, (M) shows an intermediate focal length state in the infinity focusing state, and (T) is a telephoto end state in the infinity focusing state;

FIG. 12 are graphs showing various aberrations of the zoom lens in the infinity focusing state and lateral aberrations in the vibration proof state according to the fourth example, where

FIG. 13 are graphs showing various aberrations of the zoom lens in the close distance focusing state and lateral aberrations in the vibration proof state according to the fourth example, where

FIG. 14 are cross-sectional views depicting a configuration of a zoom lens according to a fifth example, where (W) shows a wide-angle end state in an infinity focusing state, (M) shows an intermediate focal length state in the infinity focusing state, and (T) is a telephoto end state in the infinity focusing state;

FIG. 15 are graphs showing various aberrations of the zoom lens in the infinity focusing state and lateral aberrations in the vibration proof state in the fifth example, where

FIG. 16 are graphs showing various aberrations of the zoom lens in the close distance focusing state and lateral aberrations in the vibration proof state according to the fifth example, where

FIG. 18 are graphs showing various aberrations of the zoom lens in the infinity focusing state and lateral aberrations in the vibration proof state in the sixth example, where

FIG. 19 are graphs showing various aberrations of the zoom lens in the close distance focusing state and lateral aberrations in the vibration proof state according to the sixth example, where

FIG. 20 are cross-sectional views depicting a configuration of a zoom lens according to a seventh example, where (W) shows a wide-angle end state in an infinity focusing state, (M) shows an intermediate focal length state in the infinity focusing state, and (T) is a telephoto end state in the infinity focusing state;

FIG. 21 are graphs showing various aberrations of the zoom lens in the infinity focusing state and lateral aberrations in the vibration proof state according to the seventh example, where

FIG. 22 are graphs showing various aberrations of the zoom lens in the close distance focusing state and lateral aberrations in the vibration proof state according to the seventh example, where

FIG. 24 are graphs showing various aberrations of the zoom lens in the infinity focusing state and lateral aberrations in the vibration proof state according to the eighth example, where

FIG. 25 are graphs showing various aberrations of the zoom lens in the close distance focusing state and lateral aberrations in the vibration proof state according to the eighth example, where

FIG. 27 are graphs showing various aberrations of the zoom lens in the infinity focusing state and lateral aberrations in the vibration proof state according to the ninth example, where

FIG. 28 are graphs showing various aberrations of the zoom lens in the close distance focusing state and lateral aberrations in the vibration proof state according to the ninth example, where FIG. 28A is a case of a wide-angle end state.

FIG. 29 are cross-sectional views depicting a configuration of a zoom lens according to a tenth example, where (W) shows a wide-angle end state in an infinity focusing state, (M) shows an intermediate focal length state in the infinity focusing state, and (T) is a telephoto end state in the infinity focusing state;

FIG. 30 are graphs showing various aberrations of the zoom lens in the infinity focusing state and lateral aberrations in the vibration proof state according to the tenth example, where

FIG. 31 are graphs showing various aberrations of the zoom lens in the close distance focusing state and lateral aberrations in the vibration proof state according to the tenth example, where

FIG. 33 are graphs showing various aberrations of the zoom lens in the infinity focusing state and lateral aberrations in the vibration proof state according to the eleventh example, where

FIG. 34 are graphs showing various aberrations of the zoom lens in the close distance focusing state and lateral aberrations in the vibration proof state according to the eleventh example, where FIG. 34B is a case of an intermediate focal length state.

DESCRIPTION OF THE PREFERRED EMBODIMENTS

Figure 1:
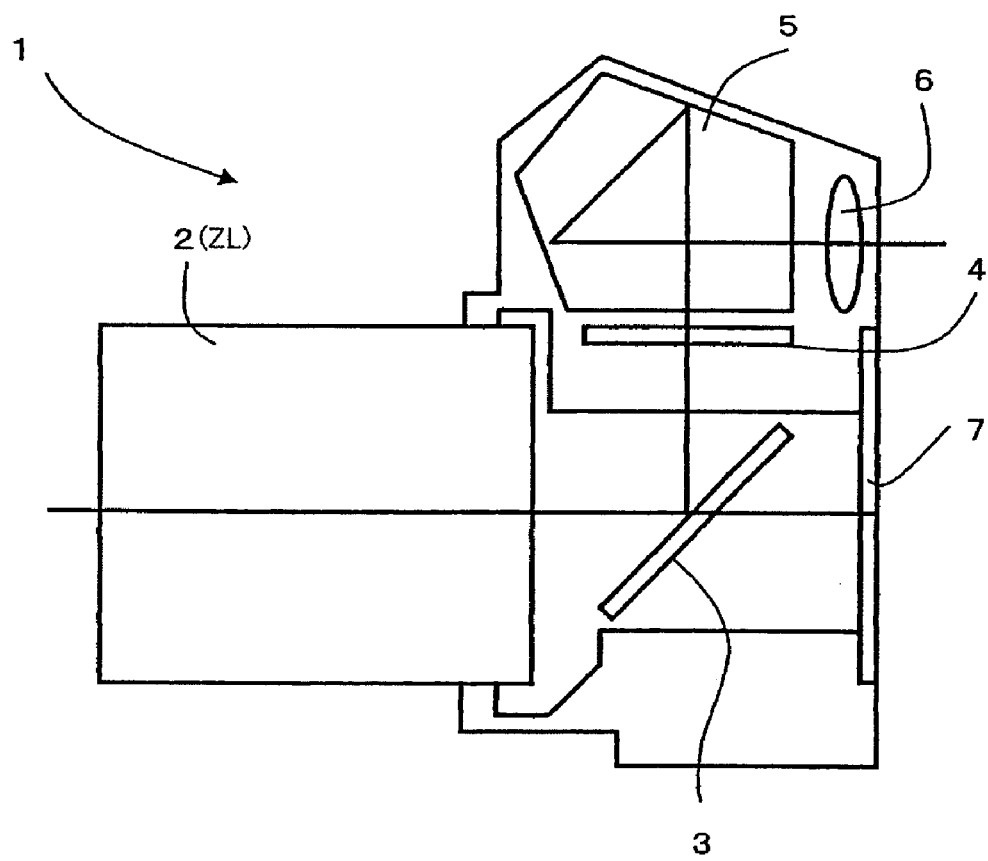
FIG. 1 is a cross-sectional view depicting a digital single-lens reflex camera in which a zoom lens of the present embodiment is equipped.

Preferred embodiments will now be described with reference to the drawings. FIG. 1 is a cross-sectional view depicting a digital single-lens reflex camera 1 (optical apparatus) having a zoom lens ZL according to the present embodiment. In the digital single-lens reflex camera 1 shown in FIG. 1, lights from an object, which is not illustrated, are collected by a camera lens 2, and imaged on a focal plate 4 via a quick return mirror 3. The lights imaged on the focal plate 4 are reflected in a penta prism 5 for a plurality of times, and guided to an ocular 6. Thereby the user can observe the object image as an erect image via the ocular 6.

If the user presses a release button, which is not illustrated, the quick return mirror 3 moves out of the optical path, and the lights of the object, which is not illustrated, collected by the camera lens 2, form an object image on an image sensing element 7. Thereby the lights from the object are captured by the image sensing element 7 and are recorded in a memory, which is not illustrated, as the object image. Thus the user can photograph the object using this camera 1. The camera 1 in FIG. 1 may be one which has a removable zoom lens ZL, or one that is integrated with the zoom lens ZL. The camera 1 may be a single-lens reflex camera, or a compact camera which does not have a quick return mirror.

The zoom lens ZL according to the present embodiment, which is used as a camera lens 2 of the digital single-lens reflex camera 1, is comprised of a first lens group G1 having a positive refractive power, a second lens group G2 having a negative refractive power, a third lens group G3 having a positive refractive power, and a fourth lens group G4 having a positive refractive power, which are disposed in order from an object along the optical axis.

From an optical point of view, this lens is configured by a first lens group G1 that is a collective lens group, a second lens group G2 that is a variable power lens group, a third lens group G3 that is an image lens group, and a fourth lens group G4 that is a field lens group.

In the zoom lens ZL having this configuration, the first lens group G1 and the second lens group G2, where the entering height of rays and entry angle of rays greatly change with zooming (power change), are closely related to the fluctuation of the spherical aberration and the curvature of field due to zooming.

Therefore the first lens group G1 is configured by a negative meniscus lens L11 the convex surface facing the object and a positive lens L12, which are disposed in order from the object, so as to be concentric with respect to an aperture stop, then fluctuation of the curvature of field due to zooming can be suppressed. Also it is preferable that in the first lens group G1, the negative meniscus lens L11 and the positive lens L12 are formed to be a cemented lens, then mutual eccentricity is not generated when the lenses are equipped in the lens-barrel, which can prevent a field tilt (distortion of the image surface) caused by eccentricity.

If the second lens group G2 is comprised of a negative meniscus lens L21 the convex surface facing the object, a biconcave lens L22 and a positive lens L23, which are disposed in order from the object, wherein an object side lens surface of the negative meniscus lens L21 is aspherical and one surface of an object side and image side lens surfaces of the positive lens L23 is aspherical, whereby the fluctuation of the spherical aberration due to zooming can be suppressed. It is preferable that in the second lens group G2, all of negative meniscus lens L21, biconcave lens L22 and positive lens L23 are single lenses (in other words, air exists in all the spaces between these lenses), so as to secure flexibility in aberration correction.

In order to decrease the total length of the zoom lens in the wide-angle end state, it is preferable that the first lens group G1 is constructed by two lenses, concave and convex, and the second lens group G2 is constructed by three lenses, concave, concave and convex, so that the total glass thickness of the first lens group G1 and the second lens group G2 is decreased.

The third lens group G3, of which entry height of rays and entry angle of rays change little with respect to zooming (power change), and contributes little to various aberration fluctuations during zooming. However, the third lens group G3, which is an imaging lens group, as mentioned above, and forms an image by further condensing beams collected by the first lens group G1, requires strong refractive power, and therefore has a lens configuration of which the radius of curvature is small. Hence in the third lens group G3, a major high order spherical aberration tends to be generated. Therefore it is preferable to suppress the generation of a spherical aberration by disposing the aperture stop in the third lens group G3 (object side), so that incident light enters at an obtuse angle.

It is preferable that the third lens group G3 has a telephoto type lens configuration where a positive lens L31, a negative meniscus lens L32 having the convex surface facing the object, a pre-group G3F which is constructed by a positive lens L33 having positive refractive power, and a negative meniscus lens L34 having the convex surface facing the object, which are disposed in order from the object along the optical axis, are disposed. Because of this configuration, the back focus of the third lens group G3 decreases, that is, the back focus of the zoom lens decreases. Also the incident beam height with respect to the maximum photographing angle of view decreases, so the effective diameter of the first lens group G1 decreases, and the total lens length in the wide-angle end state also decreases.

It is preferable, in terms of aberration correction, that the third lens group G3 has a pre-group G3F having a triplet structure (positive, negative and positive), since adjustment of Seidel's five aberrations correction becomes possible, and an aberration of the curvature of field can be corrected by adding a negative lens (negative meniscus lens L32) to this triplet structured pre-group G3F. In order to correct the aberrations of this triplet structured pre-group G3F even more accurately, it is preferable that the radius of curvature of the image side lens surface of the negative meniscus lens L32 and the radius of curvature of the object side lens surface of the positive lens L33 are smaller than the radius of curvature of the other lens surfaces constituting the third lens group G3. Because the image side lens surface of the negative meniscus lens L32 and the object side lens surface of the positive lens L33, which face each other, are lens surfaces of which exit angle with respect to incident beams is mild regardless the angle of view, little high order spherical aberration is generated, even if these lens surfaces have a strong negative refractive surface and strong positive refractive surface to correct chromatic aberration. Therefore, by using the above configuration for the pre-group G3F, spherical aberration and chromatic aberration generated by the pre-group G3F having a positive refractive power, can be simultaneously corrected. In order to correct the chromatic aberration even more accurately in the pre-group G3F, it is preferable that the radius of curvature of the image side lens surface of the negative meniscus lens L32 and the object side lens surface of the positive lens L33 are the same when these lenses are cemented.

Also in order to correct the aberrations even more accurately in the third lens group G3 having the above configuration, it is preferable that one of the three surfaces of the object side and the image side lens surfaces of the positive lens L31 and the object side lens surface of the negative meniscus lens L32 is an aspherical surface ASP1, and one of the three surfaces of the object side lens surface of the positive lens L33 and the object side and image side lens surfaces of the negative meniscus lens L34 is an aspherical surface ASP2. Then the spherical aberration and coma aberration are corrected by the former aspherical surface ASP1, and the aberration of the curvature of field in the wide-angle end state is corrected by the latter aspherical surface ASP2.

The fourth lens group G4, of which incoming beam diameter with respect to each image height is small, is greatly related to the fluctuation of the curvature of field, rather than the spherical aberration. Therefore it is preferable that the fourth lens group G4 has a positive lens of which object side lens surface has a convex surface facing the object. It is especially preferable that the fourth lens group G4 has a positive lens of which the absolute value of the radius of curvature of the object side lens surface is smaller than the absolute value of the radius of curvature of the image side lens surface, and of which the object side lens surface is a convex surface facing the object. Thereby fluctuation of the aberration of the curvature of field in short distance focusing can be suppressed. It is also preferable that the fourth lens group G4 is moved to the object along the optical axis when focusing is performed from an infinite distance object to a short distance object. Thereby the fluctuation of the spherical aberration in the short distance focusing can be decreased. The fourth lens G4 also has a function to move the exit pupil position away from the image formation surface (toward the object), and suppress shading when the solid image sensing element and the photographing optical system are matched.

In order to decrease the total length of the zoom lens ZL which is a high variable power optical system when the zoom lens is housed in a lens-barrel, it is preferable to move the first lens group G1 to the object when an object is zoomed (power change) from the wide-angle end state at an infinite distance to the telephoto end state. Thereby the total length of the lenses of the first lens group G1 in a housed state can be easily decreased than in the wide-angle end state. For even more effective zooming, it is preferable to move the second lens group G2 to the object with a concave locus along the optical axis, and to move the third lens group G3 to the object during zooming. By this configuration, the space required for zooming can be decreased in the second lens group G2, so that the space required for zooming can be secured in the third lens group G3. It is preferable that the fourth lens group G4 is moved to the object with a convex locus along the optical axis. By this configuration, the fluctuation of the curvature of field, due to zooming, can be corrected.

In the zoom lens ZL, correction of Seidel's five aberrations can be adjusted by using the triplet structure (positive, negative, positive) for the pre-group G3F of the third lens group G3, as mentioned above. Therefore if the pre-group G3F is constructed such that the constituent lenses are integrated and vibration proof correction is performed by moving the lenses in a direction vertical to the optical axis, sufficient aberration correction becomes possible. Also it is effective to dispose the negative meniscus lens L34 at the image side of the pre-group G3F, and to appropriately specify the allocation of the refractive power between the pre-group G3F and the negative meniscus lens L34, since the moving amount of the image surface with respect to the moving amount of the pre-group G3F can be adjusted.

If the image side lens surface of the positive lens L33 in the pre-group G3F is aspherical, the third lens group G3 becomes a lens group having an image formation performance that is more suitable for vibration proof correction. If vibration proof correction is performed in the third lens group G3, as mentioned above, the amount of movement for vibration proofing is added, so the effective diameter of the pre-group G3F becomes greater than the case of not performing vibration proof correction. Therefore in order to cut the portion where the coma aberration is major, it is preferable that a flare cut stop is disposed between the image side lens surface of the positive lens L33 and the object side lens surface of the negative meniscus lens L34 in the third lens group G3. In this case, the flare cut stop may be integrated with the lens-barrel for securing the negative meniscus lens L34. In the present embodiment, the flare cut stop also plays a function of a field stop.

Since the second lens group G2 is a lens group of which aberration correction is highly flexible, just like the third lens group G3, an image blur may be corrected by moving the second lens group G2 as a whole in a direction vertical to the optical axis. If vibration proof correction is performed in the second lens group G2, the amount of moving for vibration proofing must be added, as mentioned above, so the effective diameter of the second lens group G2 is greater than the case of not performing vibration proof correction. Therefore in order to cut the portion where coma aberration is major, it is preferable that a flare cut stop is disposed at the object side and the image side of the second lens group G2 respectively.

First Group of Embodiments

The first group of embodiments will now be described. This group includes the later mentioned first to sixth examples.

In the zoom lens ZL having the above mentioned configuration, in order to perform good aberration correction while keeping the effective diameter of the first lens group G1 small, it is preferable to satisfy the following expression (1), $$-0.6 < f30/f34 < -0.1 \quad (1)$$

where f30 is a focal length of the third lens group G3, and f34 is a focal length of the negative meniscus lens L34.

The above conditional expression (1) specifies an appropriate ratio of the focal length f30 of the third lens group G3 and the focal length f34 of the negative meniscus lens L34. In this conditional expression (1), if the ratio is less than the lower limit value, fluctuation of the curvature of field, due to zooming (power change) increases, which is not desirable. On the other hand, if the ratio is higher than the upper limit value in the conditional expression (1), the total optical length of the third lens group G3 increases, and the total length of the zoom lens in the wide-angle end state increases accordingly, which increases the effective diameter of the first lens group G1. To prevent this, the refractive power of the third lens group G3 could be increased along with decreasing the refractive power of the fourth lens group G4, but this increases the spherical aberration, which is not desirable. In order to make the effects of the present embodiment certain, it is preferable that the lower limit value of the conditional expression (1) is −0.56. Also to make the effects of the present embodiment certain, it is preferable that the upper limit value of the conditional expression (1) is −0.20.

In the zoom lens ZL, in order to perform good aberration correction while keeping the total length of the lens in the wide-angle end state short, it is preferable to satisfy the following expression (2)

$$-0.24 < fG3F/(f34 \times N3n) < -0.05 \quad (2)$$

where fG3F is a focal length of the pre-group G3F of the third lens group G3, f34 is a focal length of the negative meniscus lens L34, and N3n is an average refractive index of the negative meniscus lens L32 and the negative meniscus lens L34.

The above conditional expression (2) specifies an appropriate relationship of the focal length fG3F of the pre-group G3F, the focal length f34 of the negative meniscus lens L34, and the average refractive power N3n of the negative meniscus lens L32 and the negative meniscus lens L34 in the third lens group G3. In this conditional expression (2), if the value specifying this relationship is less than the lower limit value, the fluctuation of the curvature of field due to zooming (power change) increases in the third lens group G3, which is not desirable. On the other hand, if the value specifying this relationship is higher than the upper limit value in the conditional expression (2), the spherical aberration increases in the third lens group G3, which is not desirable. In order to make the effects of the present embodiment certain, it is preferable that the lower limit value of the conditional expression (2) is −0.23. Also to make the effects of the present embodiment certain, it is preferable that the upper limit value of the conditional expression (2) is −0.08.

In the zoom lens ZL, it is preferable to satisfy the following expression (3)

$$0.03 < (Fw \times f30)/Ft^2 < 0.08 \quad (3)$$

where Fw is a focal length of the zoom lens in the wide-angle end state, f30 is a focal length of the third lens group, and Ft is a focal length of the zoom lens in the telephoto end state.

The above conditional expression (3) specifies an appropriate relationship of the focal length Fw of the zoom lens in the wide-angle end state, the focal length f30 of the third lens group G3, and the focal length Ft of the zoom lens in the telephoto end state. In this conditional expression (3), if the value specifying this relationship is less than the lower limit value, a major spherical aberration is generated, which is not desirable. On the other hand, if the value specifying this relationship is higher than the upper limit value in the conditional expression (3), the effective diameter of the first lens group G1 increases. To prevent this, the positive refractive power of the first lens group G1 could be increased with decreasing the total length of the lens, but this increases the aberration of the curvature of field in the telephoto end state, which is not desirable. In order to make the effects of the present embodiment certain, it is preferable that the lower limit value of the conditional expression (3) is 0.035. Also to make the effects of the present embodiment certain, it is preferable that the upper limit value of the conditional expression (3) is 0.06.

In the zoom lens ZL, it is preferable to satisfy the following expression (4)

$$0.28 < d33/d30 < 0.60 \quad (4)$$

where d33 is a thickness of the positive lens L33 on the optical axis, and d30 is a thickness of the third lens group G3 on the optical axis.

The above conditional expression (4) specifies an appropriate ratio of the thickness d33 of the positive lens L33 on the optical axis, and the thickness d30 of the third lens group G3 on the optical axis. In this conditional expression (4), if the ratio is less than the lower limit value, the spherical aberration increases, which is not desirable. On the other hand, if the ratio is higher than the upper limit value in the conditional expression (4), the thickness of the third lens group G3 on the optical axis increases, and the total length of the lens also increases. To prevent this, the positive refractive power of the first lens group G1 could be increased with decreasing the total length of the lens, but this increases the aberration of the curvature of field in the telephoto end state, which is not desirable. In order to make the effects of the present embodiment certain, it is preferable that the lower limit value of the conditional expression (4) is 0.29. Also to make the effects of the present embodiment certain, it is preferable that the upper limit value of the conditional expression (4) is 0.50.

Examples in the First Group

Concrete examples of the first group of embodiments will now be described with reference to the accompanying drawings. The zoom lens ZL (lens system) according to each example is, as described above, comprised of a first lens group G1 having a positive refractive power, a second lens group G2 having a negative refractive power, an aperture stop S for adjusting light quantity, a third lens group G3 having a positive refractive power, a fourth lens group G4 having a positive refractive power, a low pass filter LPF for cutting the special frequency exceeding a critical resolution of a solid image sensing element, and a cover glass CG of the solid image sensing element, which are disposed in order from the object along the optical axis. The image surface I is formed on an image sensing element, which is not illustrated, and this image sensing element is a CCD or CMOS, for example.

The first lens group G1 is comprised of a cemented lens where a negative meniscus lens L11 the convex surface facing the object and a positive lens L12, which are disposed in order from the object, are cemented. The second lens group G2 is comprised of a negative meniscus lens L21 the convex surface facing the object, a biconcave lens L22 and a positive lens L23, which are disposed in order from the object. The third lens group G3 is comprised of: a pre-group G3F which is further comprised of a positive lens L31 the concave surface facing the object, and a cemented lens where a negative meniscus lens L32 the convex surface facing the object and a biconvex lens (positive lens) L33 are cemented; and a negative meniscus lens L34 the convex surface facing the object, which are disposed in order from the object. In the third lens group G3, a flare cut stop (also playing a role of a field stop) FS is disposed between the pre-group G3F and the negative meniscus lens L34. The fourth lens group G4 is comprised of a positive lens L41, the convex surface facing the object.

In the zoom lens ZL having the above configuration, when zooming (power change) is performed from the wide-angle end state to the telephoto end state, the first lens group G1 and the third lens group G3 are moved to the object, and the second lens group G2 is moved to the object with a concave locus along the optical axis, and the fourth lens group G4 is moved to the object with a convex locus along the optical axis. The fourth lens group G4 can be moved on the optical axis when focusing the object in a finite distance. The third lens group G3 is a vibration proof lens group which corrects image blur generated by motion blur, by vibrating the pre-group G3F in a direction vertical to the optical axis.

Table 1 to Table 6 shown below are tables of respective data on the first to sixth examples. In all the tables, F is a focal length in a zoom lens, FNO is an F number, ω is a half angle of view, β is a photographing magnification, D0 is a distance from an object to an object side lens surface of the lens L11 which is disposed closest to the object in the first lens group G1, Bf is a back focus, and TL is a total length of a lens. The surface number is the sequence of the lens surface from the object side, along the beam traveling direction, r is a radius of curvature of each lens surface, d is a surface distance which is a distance from each optical surface to the next optical surface (or image surface) on the optical axis, nd is a refractive index with respect to the d-line (wavelength: 587.6 nm), and vd is an Abbe number based on the d-line. In the tables, values corresponding to the above conditional expression (1) to (4) are also shown.

In the tables, "mm" is normally used as the unit for focal length F, radius of curvature r, surface distance d and other lengths. However, a similar performance can be acquired even if the optical system is proportionally expanded or reduced, so the unit is not limited to "mm", but another appropriate unit can be used. In the tables, "∞" in the radius of curvature indicates the surface or an aperture, and the refractive index "1.00000" of air is omitted.

In the tables, an aspherical surface with an "*" is given by the following expression (a), where y is the height in a direction vertical to the optical axis, S(y) is a distance (sag amount) from a tangential surface at the vertex of the aspherical surface to a position on the aspherical surface at the height y along the optical axis. r is a radius of curvature of the reference spherical surface (paraxial radius of curvature), K is a conical coefficient, and An is an n degree aspherical coefficient. In each example, second degree aspherical coefficient A2 is 0, which is omitted. En indicates ×10$^n$. For example, 1.234E−05=1.234×10$^{-5}$.

$$S(y) = (y^2/r)/\{1 + (1 - K \cdot y^2/r^2)^{1/2}\} + \\ A4 \times y^4 + A6 \times y^6 + A8 \times y^8 + A10 \times y^{10} \tag{a}$$

First Example

Figure 2:
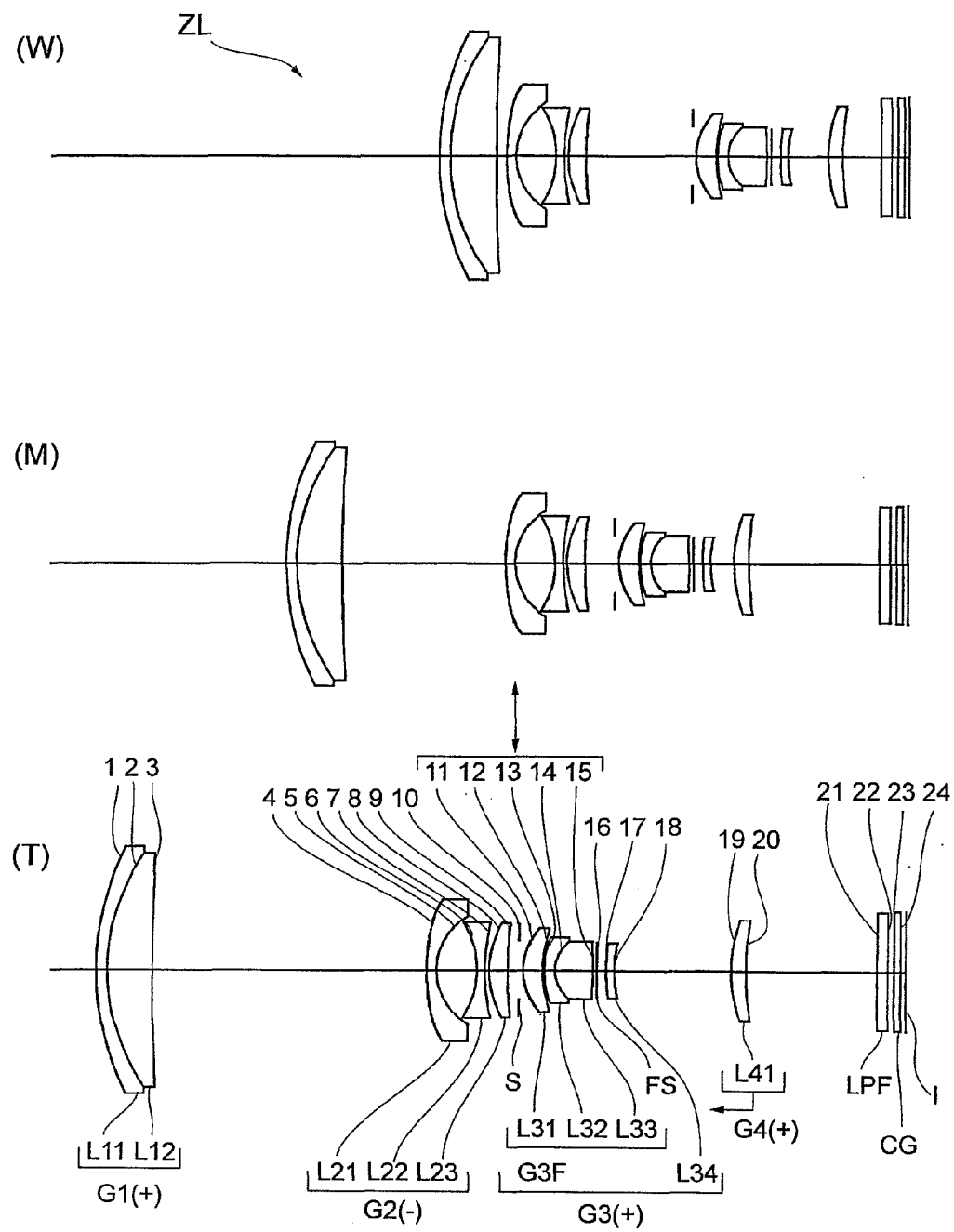
FIG. 2 are cross-sectional views depicting a configuration of a zoom lens according to a first example, where (W) shows a wide-angle end state in an infinity focusing state, (M) shows an intermediate focal length state in the infinity focusing state, and (T) is a telephoto end state in the infinity focusing state.

The first example will now be described with reference to FIG. 2 to FIG. 4 and Table 1. FIG. 2 shows the configuration of the zoom lens ZL according to the first example, wherein the change of the focal length state from the wide-angle end state (W) to the telephoto end state (T) via the intermediate focal length state (M), that is, the movement of each lens group during zooming, is shown.

Table 1 shows each data of the first example. The surface numbers 1 to 24 in Table 1 correspond to the surfaces 1 to 24 in FIG. 2. In the first example, the object side lens surface of the negative meniscus lens L21, image side lens surface of the positive meniscus lens L23, object side lens surface of the positive meniscus lens L31, and image side lens surface of the biconvex lens L33, in other words, the lens surfaces of the fourth surface, ninth surface, eleventh surface and fifteenth surface are all formed to be an aspherical shape.

In the tables, d3 is an axial air distance between the first lens group G1 and the second lens group G2, d9 is an axial air distance between the second lens group G2 and the aperture stop S, d18 is an axial air distance between the third lens group G3 and the fourth lens group G4, and d20 is an axial air distance between the fourth lens group and the low pass filter LPF. These axial air distances d3, d9, d18 and d20 change during zooming.

TABLE 1

| [All parameters] | | | | | |
|---|---|---|---|---|---|
| | Wide-angle end | | intermediate focal length | | telephoto end |
| F | 5.20 | ~ | 15.00 | ~ | 29.75 |
| FNO | 3.0 | ~ | 4.4 | ~ | 5.7 |
| ω | −39.32 | ~ | −14.78 | ~ | −7.68 |

TABLE 1-continued

[Lens parameters]

| Surface Number | r | d | nd | νd |
|---|---|---|---|---|
| 1 | 21.3725 | 0.8000 | 1.903660 | 31.31 |
| 2 | 15.7730 | 3.4000 | 1.603000 | 65.47 |
| 3 | 159.6044 | (d3 = variable) | | |
| 4* | 20.6225 | 0.7000 | 1.851350 | 40.10 |
| 5 | 4.8000 | 3.0000 | | |
| 6 | −6.8565 | 0.6000 | 1.755000 | 52.29 |
| 7 | 17.0023 | 0.3000 | | |
| 8 | 7.3490 | 1.4000 | 1.821140 | 24.06 |
| 9* | 154.8042 | (d9 = variable) | | |
| 10 | aperture stop S | 0.3000 | | |
| 11* | 4.6153 | 1.5000 | 1.768020 | 49.23 |
| 12 | 11.0713 | 0.1000 | | |
| 13 | 7.2985 | 0.8000 | 1.903660 | 31.31 |
| 14 | 2.8000 | 2.9000 | 1.592010 | 67.05 |
| 15* | −20.7158 | 0.3000 | | |
| 16 | flare cut stop FS | 0.7000 | | |
| 17 | 17.5815 | 0.6000 | 1.883000 | 40.77 |
| 18 | 8.7426 | (d18 = variable) | | |
| 19 | 11.0019 | 1.1000 | 1.516800 | 64.12 |
| 20 | 24.7103 | (d20 = variable) | | |
| 21 | ∞ | 0.8000 | 1.516800 | 64.12 |
| 22 | ∞ | 0.5000 | | |
| 23 | ∞ | 0.5000 | 1.516800 | 64.12 |
| 24 | ∞ | (Bf) | | |

[Aspherical data]

Fourth surface $K = 11.8959, A4 = 2.18410E-04, A6 = -2.69740E-06, A8 = 0.00000E+00, A10 = 0.00000E+00$ Ninth surface $K = -100.0000, A4 = 9.20510E-04, A6 = 4.77340E-05, A8 = -4.83050E-06, A10 = 2.35060E-07$ Eleventh surface $K = -0.4635, A4 = 1.74700E-04, A6 = 2.29920E-05, A8 = 0.00000E+00, A10 = 0.00000E+00$ Fifteenth surface $K = -100.0000, A4 = 5.55600E-04, A6 = 1.64610E-04, A8 = 0.00000E+00, A10 = 0.00000E+00$

[Variable distance during focusing]

| | Infinite distance | | | Close distance | | |
|---|---|---|---|---|---|---|
| F, β | 5.20000 | 15.00000 | 29.75200 | −0.05000 | −0.05000 | −0.05000 |
| D0 | ∞ | ∞ | ∞ | 94.3045 | 274.9835 | 540.9729 |
| d3 | 0.78498 | 12.19483 | 20.65553 | 0.78498 | 12.19483 | 20.65553 |
| d9 | 7.95930 | 2.23455 | 0.85391 | 7.95930 | 2.23455 | 0.85391 |
| d18 | 3.07965 | 1.73668 | 8.77541 | 2.24637 | 0.47870 | 6.36698 |
| d20 | 2.91543 | 9.94349 | 9.98482 | 3.74870 | 11.20147 | 12.39325 |
| Bf | 0.40631 | 0.40631 | 0.40631 | 0.40631 | 0.40631 | 0.40631 |
| TL | 35.44566 | 46.81584 | 60.97596 | 35.44566 | 46.81583 | 60.97596 |

[Vibration proof lens group moving amount and image surface moving amount during vibration proof correction]

| F, β | 5.20000 | 15.00000 | 29.75200 | −0.05000 | −0.05000 | −0.05000 |
|---|---|---|---|---|---|---|
| Lens | ±0.055 | ±0.065 | ±0.071 | ±0.055 | ±0.064 | ±0.070 |
| Image Surface | ±0.110 | ±0.186 | ±0.262 | ±0.110 | ±0.186 | ±0.262 |

[Zoom lens group data]

| Group No. | First surface of group | Focal length of group |
|---|---|---|
| G1 | 1 | 49.90959 |
| G2 | 4 | −5.45518 |
| G3 | 11 | 7.80739 |
| G4 | 19 | 37.35259 |

TABLE 1-continued

[Conditional expressions]

(1) f30/f34 = −0.384
(2) fG3F/(F34 × N3n) = −0.182
(3) (Fw × F30)/Ft$^2$ = 0.046
(4) d33/d30 = 0.420

As the data table in Table 1 shows, the zoom lens ZL according to the present example satisfies all of the above conditional expressions (1) to (4).

Figure 3A:
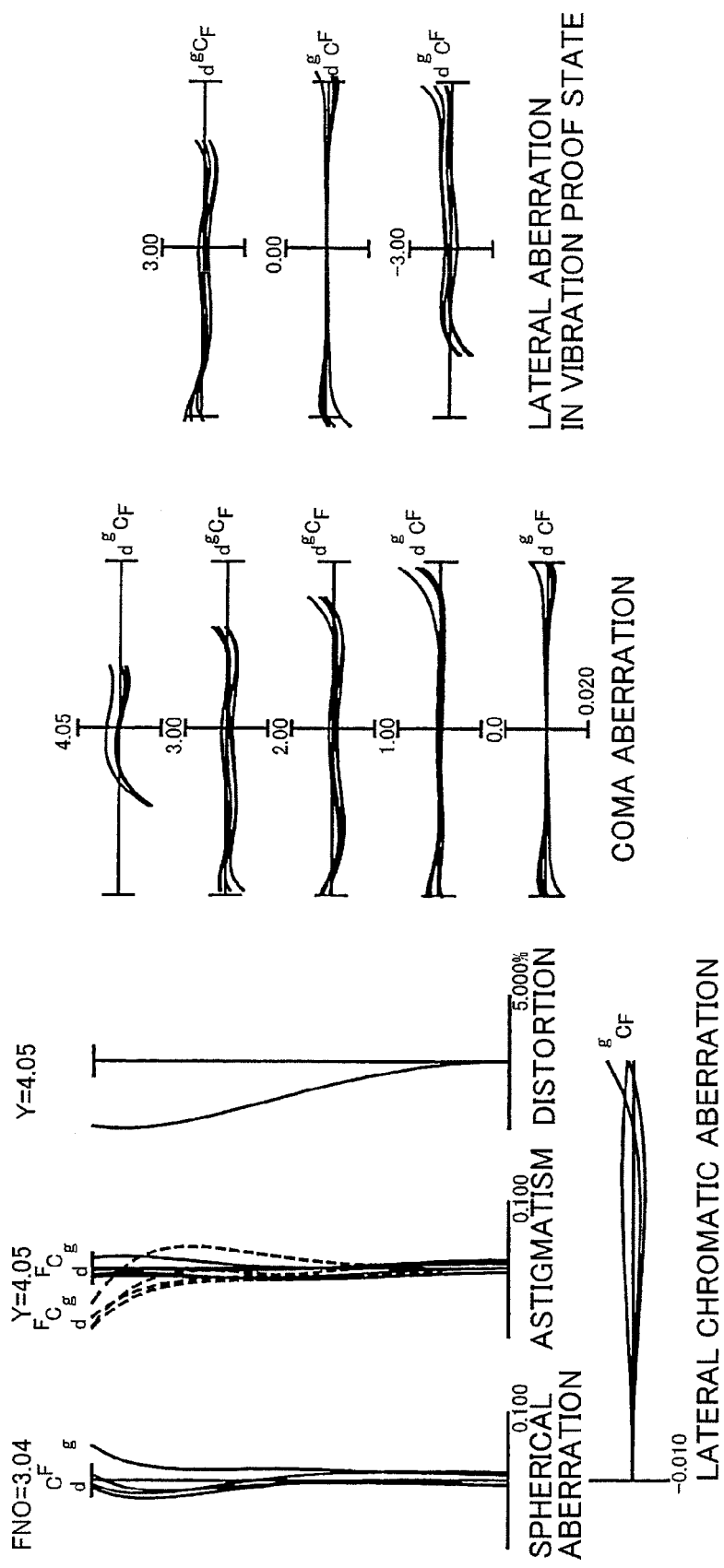
FIG. 3A is a case of a wide-angle end state.
Figure 3B:
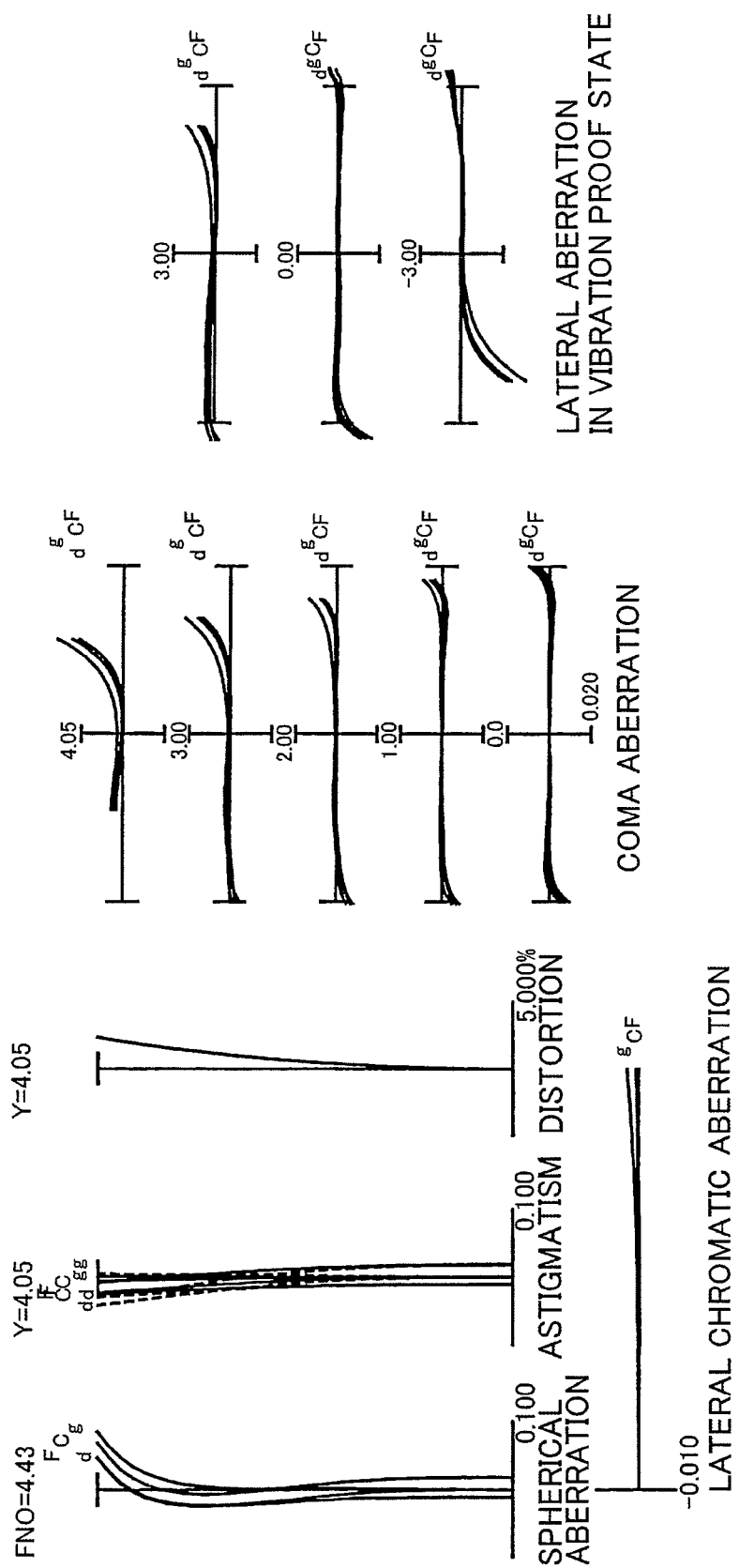
FIG. 3B is a case of an intermediate focal length state.
Figure 3C:
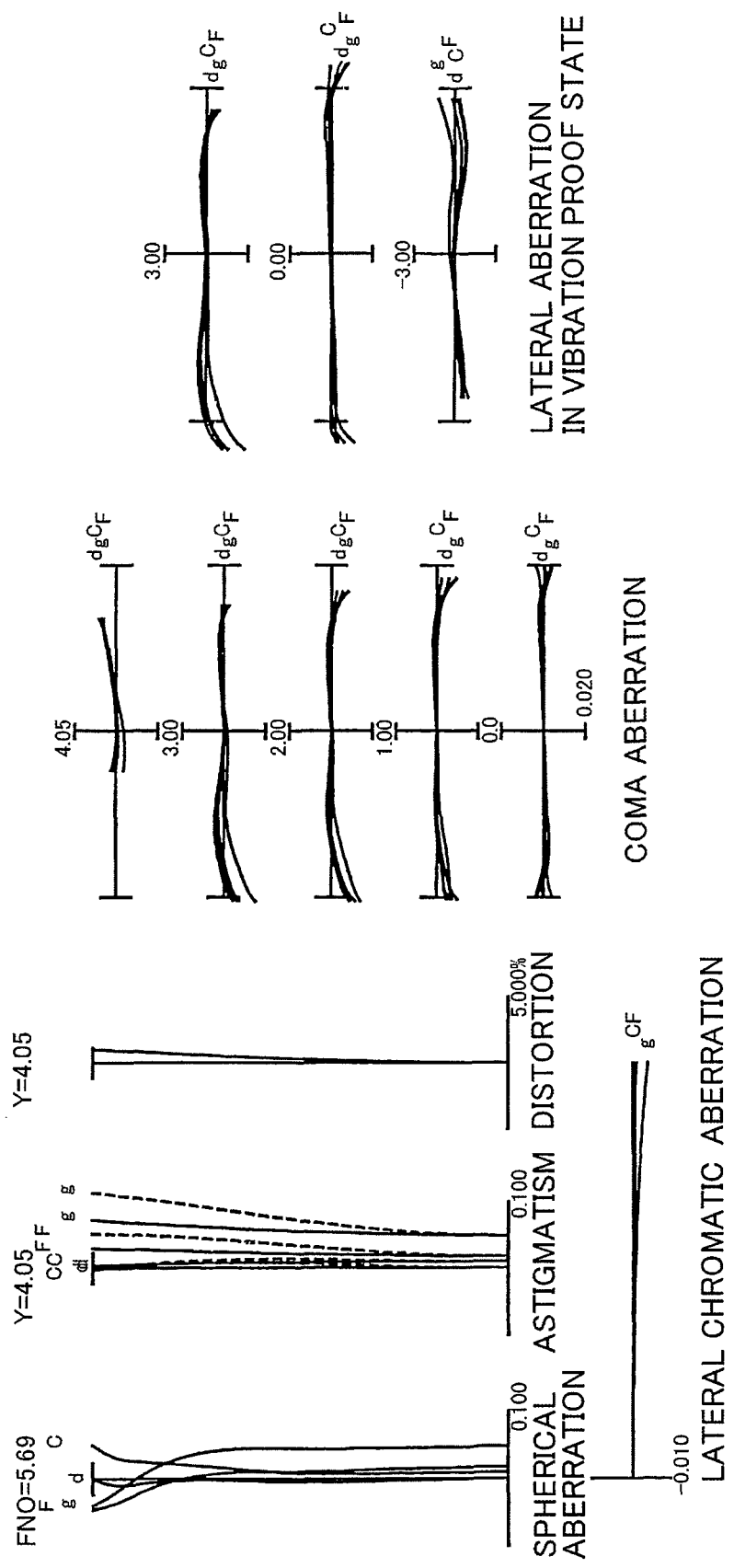
FIG. 3C is a case of a telephoto end state.
Figure 4B:
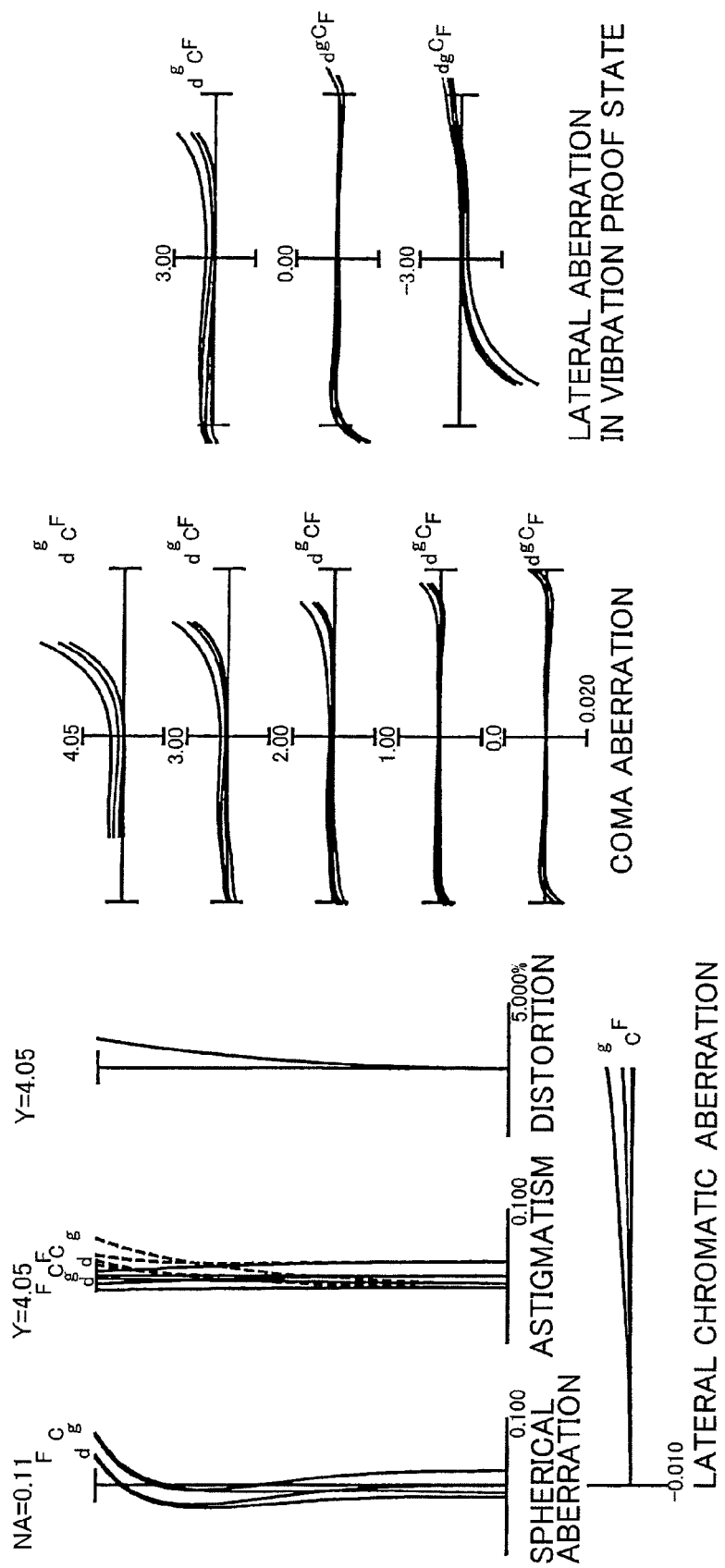
FIG. 4B is a case of an intermediate focal length state.

FIG. 3 are graphs showing various aberrations of the zoom lens in the infinity focusing state and lateral aberrations in the vibration proof state according to the first example, where FIG. 3A is a case of the wide-angle end state (F=5.20 mm), FIG. 3B is a case of the intermediate focal length state (F=15.00 mm), and FIG. 3C is a case of the telephoto end state (F=29.75 mm). FIG. 4 are graphs showing various aberrations of the zoom lens in a close distance focusing state and lateral aberrations in the vibration proof state according to the first example, where FIG. 4A is a case of the wide-angle end state (Rw=130 mm), FIG. 4B is a case of the intermediate focal length state (Rm=322 mm), and FIG. 4C is a case of the telephoto end state (Rt=602 mm).

In each aberration graph, FNO is an F number, Y is an image height, D is a d-line (wavelength: 587.6 nm), G is a g-line (wavelength: 435.6 nm), C is a C-line (wavelength: 656.3 nm), and F is an F-line (wavelength: 486.1 nm). In the aberration graphs to indicate astigmatism, the solid line indicates a sagittal image surface, and a broken line indicates a meridional image surface. In the aberration graph to indicate the lateral chromatic aberration, data is shown based on the d-line. The above description of the aberration graphs is the same for other examples, where this description is omitted.

As each aberration graph shows, in the zoom lens ZL according to the first example, various aberrations are well corrected in both the case of each focal length state from the wide-angle end to telephoto end in the infinite focusing state, and in the case of each focal length state from the wide-angle end to telephoto end in the close distance focusing state, and excellent image formation performance is implemented.

By equipping the zoom lens ZL of the first example, excellent optical performance can be insured for a digital single-lens reflex camera (optical apparatus, see FIG. 1).

Second Example

The second example will now be described with reference to FIG. 5 to FIG. 7, and Table 2. FIG. 5 shows the configuration of the zoom lens ZL according to the second example, where a change of focal length state from the wide-angle end state (W) to the telephoto end state (T) via the intermediate focal length state (M), that is, the movement of each lens group during zooming, is shown.

Table 2 shows each data of the second example. The surface numbers 1 to 26 in Table 2 correspond to the surfaces 1 to 26 in FIG. 5. In the second example, then object side lens surface of the negative meniscus lens L21, object side lens surface of the positive meniscus lens L23, object side lens surface of the negative meniscus lens L32, and image side lens surface of the biconvex lens L33, in other words, lens surfaces of the fifth surface, ninth surface, fifteenth surface and seventeenth surface are all formed to be aspherical shape. In the second example, the flare cut stop (also plays a role of field stop) FS is disposed not only between the pre-group G3F and the negative meniscus lens L34 mentioned above, but also at the object side and image side of the second lens group G2.

In the tables, d3 is an axial air distance between the first lens group G1 and the second lens group G2, d11 is an axial air distance between the second lens group G2 and the aperture stop S, d20 is an axial air distance between the third lens group G3 and the fourth lens group G4, and d22 is an axial air distance between the fourth lens group G4 and the low pass filter LPF. These axial air distances d3, d11, d20 and d22 change during zooming.

TABLE 2

| [All parameters] | | | | | |
|---|---|---|---|---|---|
| | Wide-angle end | | intermediate focal length | | telephoto end |
| F | 5.24 | ~ | 15.00 | ~ | 29.75 |
| FNO | 3.1 | ~ | 4.4 | ~ | 5.7 |
| ω | −39.10 | ~ | −14.61 | ~ | −7.51 |

| [Lens parameters] | | | | |
|---|---|---|---|---|
| Surface Number | r | d | nd | νd |
| 1 | 23.0699 | 1.2000 | 1.903660 | 31.31 |
| 2 | 16.3328 | 5.4000 | 1.603000 | 65.47 |
| 3 | 391.4407 | (d3 = variable) | | |
| 4 | Flare cut stop FS | −0.2000 | | |
| 5* | 30.6357 | 1.0000 | 1.851350 | 40.10 |
| 6 | 5.0364 | 2.9000 | | |
| 7 | −20.4922 | 1.0000 | 1.754999 | 52.32 |
| 8 | 6.9457 | 0.4000 | | |
| 9* | 6.9097 | 2.1000 | 1.821140 | 24.06 |
| 10 | 69.7311 | 0.3000 | | |
| 11 | Flare cut stop FS | (d11 = variable) | | |
| 12 | aperture stop S | 0.3000 | | |
| 13 | 5.1369 | 1.3000 | 1.772500 | 49.61 |
| 14 | 6.6563 | 0.1000 | | |

TABLE 2-continued

| | | | | |
|---|---|---|---|---|
| 15* | 4.8548 | 1.0000 | 1.821140 | 24.06 |
| 16 | 3.0055 | 3.3000 | 1.496970 | 82.42 |
| 17* | −19.3974 | 0.2000 | | |
| 18 | Flare cut stop FS | 1.2384 | | |
| 19 | 18.5170 | 1.0000 | 1.883000 | 40.77 |
| 20 | 11.0890 | (d20 = variable) | | |
| 21 | 19.3250 | 1.5000 | 1.516800 | 64.12 |
| 22 | 392.2566 | (d22 = variable) | | |
| 23 | ∞ | 0.8000 | 1.516800 | 64.12 |
| 24 | ∞ | 0.5000 | | |
| 25 | ∞ | 0.5000 | 1.516800 | 64.12 |
| 26 | ∞ | (Bf) | | |

[Aspherical data]

Fifth surface

K = 7.4979, A4 = 9.95360E−05, A6 = −2.23550E−06, A8 = 0.00000E−00, A10 = 0.00000E−00

Ninth surface

K = −0.7381, A4 = 1.56750E−04, A6 = −3.38830E−05, A8 = 4.21200E−06, A10 = −1.57770E−07

Fifteenth surface

K = 0.7718, A4 = −1.25460E−03, A6 = −7.44420E−05, A8 = 2.90110E−06, A10 = −8.20110E−07

Seventeenth surface

K = −100.0000, A4 = 4.69770E−04, A6 = 1.77220E−04, A8 = 0.00000E−00, A10 = 0.00000E−00

[Variable distance during focusing]

| | Infinite distance | | | Close distance | | |
|---|---|---|---|---|---|---|
| F, β | 5.24000 | 15.00000 | 29.75200 | −0.05000 | −0.05000 | −0.05000 |
| D0 | ∞ | ∞ | ∞ | 92.0615 | 266.9210 | 520.2787 |
| d3 | 1.13151 | 12.92049 | 20.87896 | 1.13151 | 12.92049 | 20.87896 |
| d11 | 8.12363 | 2.00299 | 0.55279 | 8.12363 | 2.00299 | 0.55279 |
| d20 | 2.33991 | 2.18605 | 10.61960 | 1.44311 | 0.76822 | 7.58541 |
| d22 | 1.32158 | 7.14378 | 5.21850 | 2.21838 | 8.56162 | 8.25269 |
| Bf | 2.06299 | 2.06299 | 2.06299 | 2.06299 | 2.06299 | 2.06299 |
| TL | 40.81808 | 52.15477 | 65.17130 | 40.81808 | 52.15477 | 65.17129 |

[Vibration proof lens group moving amount and image surface moving amount during vibration proof correction]

| | | | | | | |
|---|---|---|---|---|---|---|
| F, β | 5.24000 | 15.00000 | 29.75200 | −0.05000 | −0.05000 | −0.05000 |
| Lens | ±0.135 | ±0.109 | ±0.104 | ±0.143 | ±0.111 | ±0.107 |
| Image Surface | ±0.110 | ±0.186 | ±0.262 | ±0.110 | ±0.186 | ±0.262 |

[Zoom lens group data]

| Group No. | First surface of group | Focal length of group |
|---|---|---|
| G1 | 1 | 50.44305 |
| G2 | 5 | −5.57648 |
| G3 | 13 | 8.22766 |
| G4 | 21 | 39.27736 |

[Conditional expressions]

(1) f30/f34 = −0.246
(2) fG3F/(F34 × N3n) = −0.128
(3) (Fw × F30)/Ft$^2$ = 0.049
(4) d33/d30 = 0.405

As the data table in Table 2 shows, the zoom lens ZL according to the present example satisfies all the above conditional expression (1) to (4).

Figure 6A:
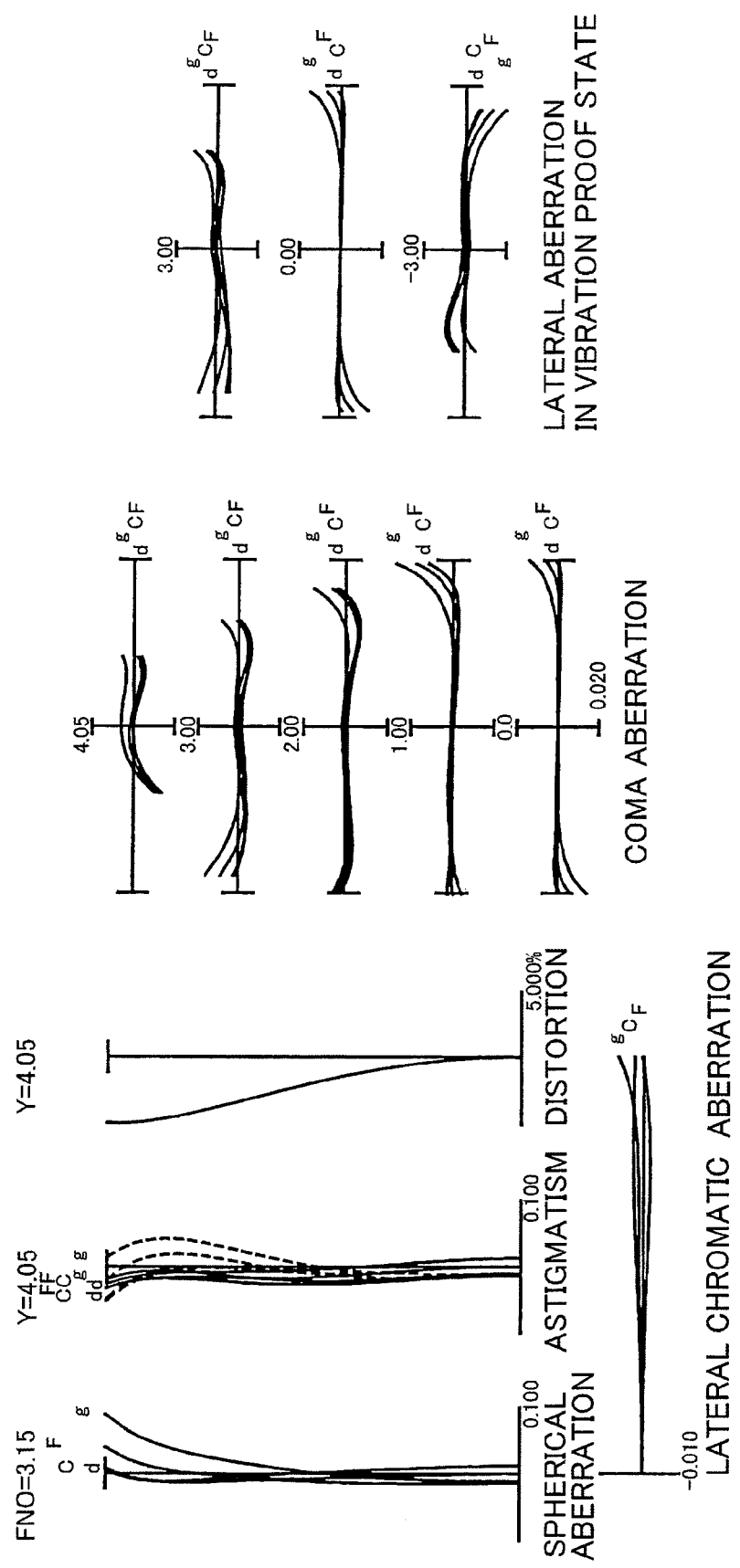
FIG. 6A is a case of a wide-angle end state.
Figure 6B:
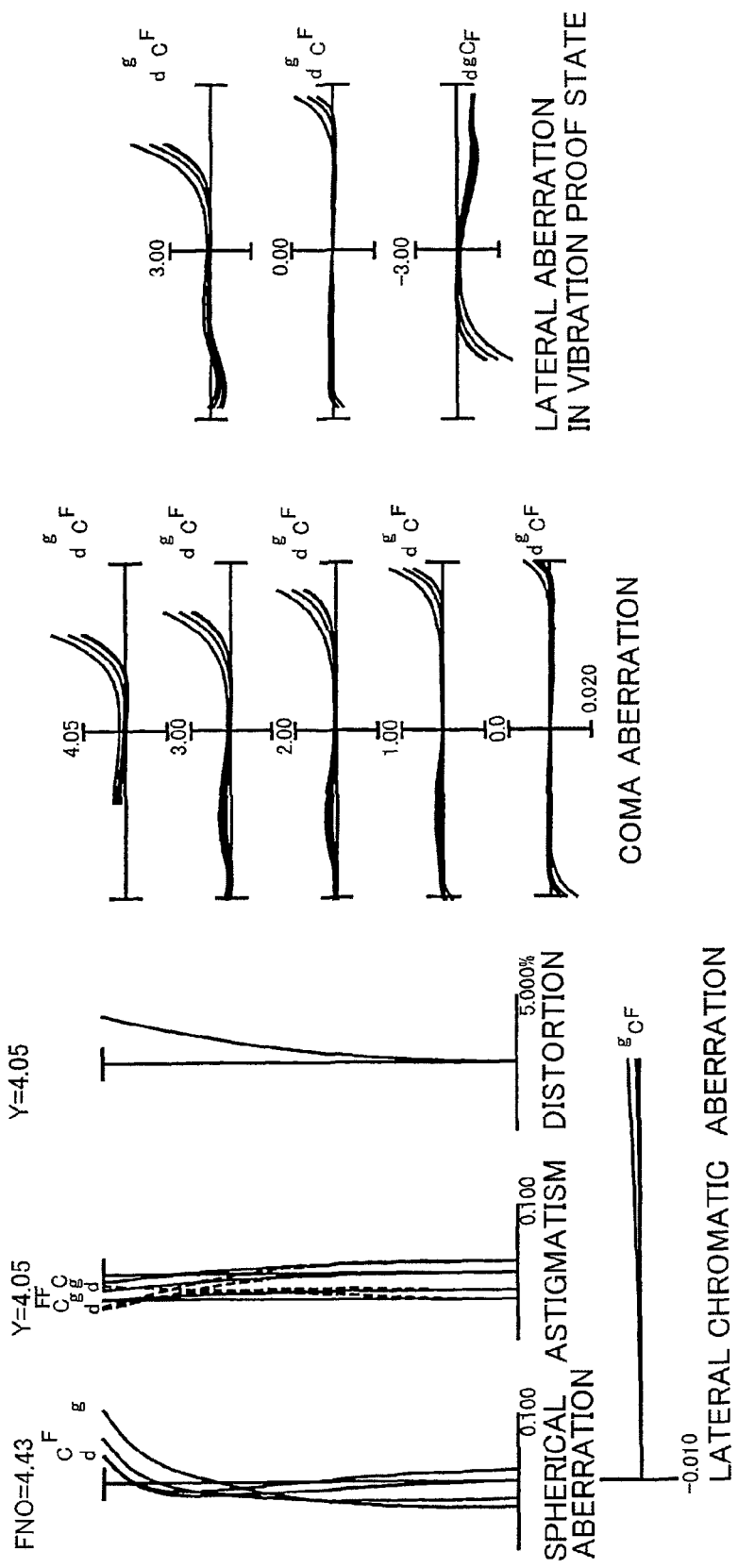
FIG. 6B is a case of an intermediate focal length state.
Figure 7A:
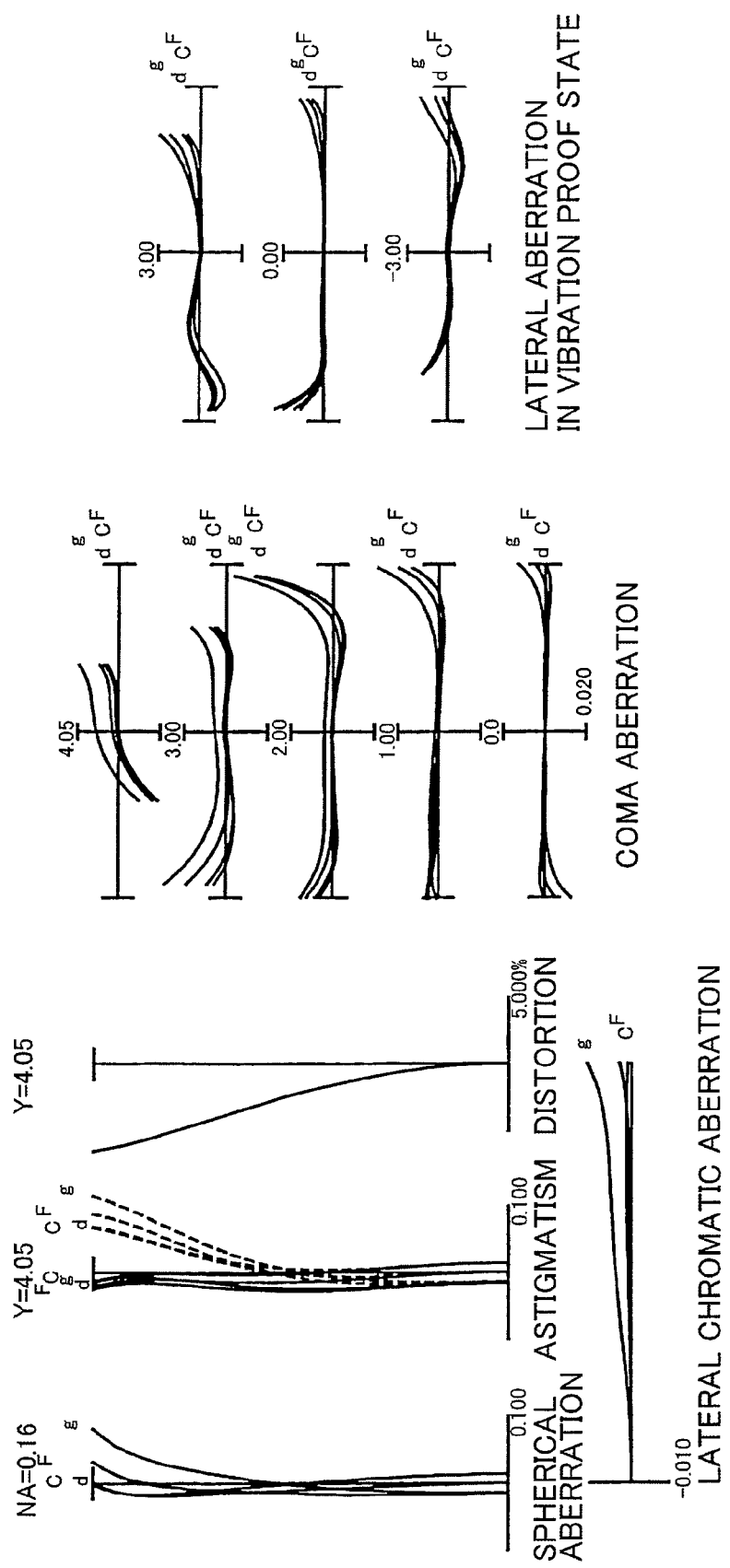
FIG. 7A is a case of a wide-angle end state.
Figure 7B:
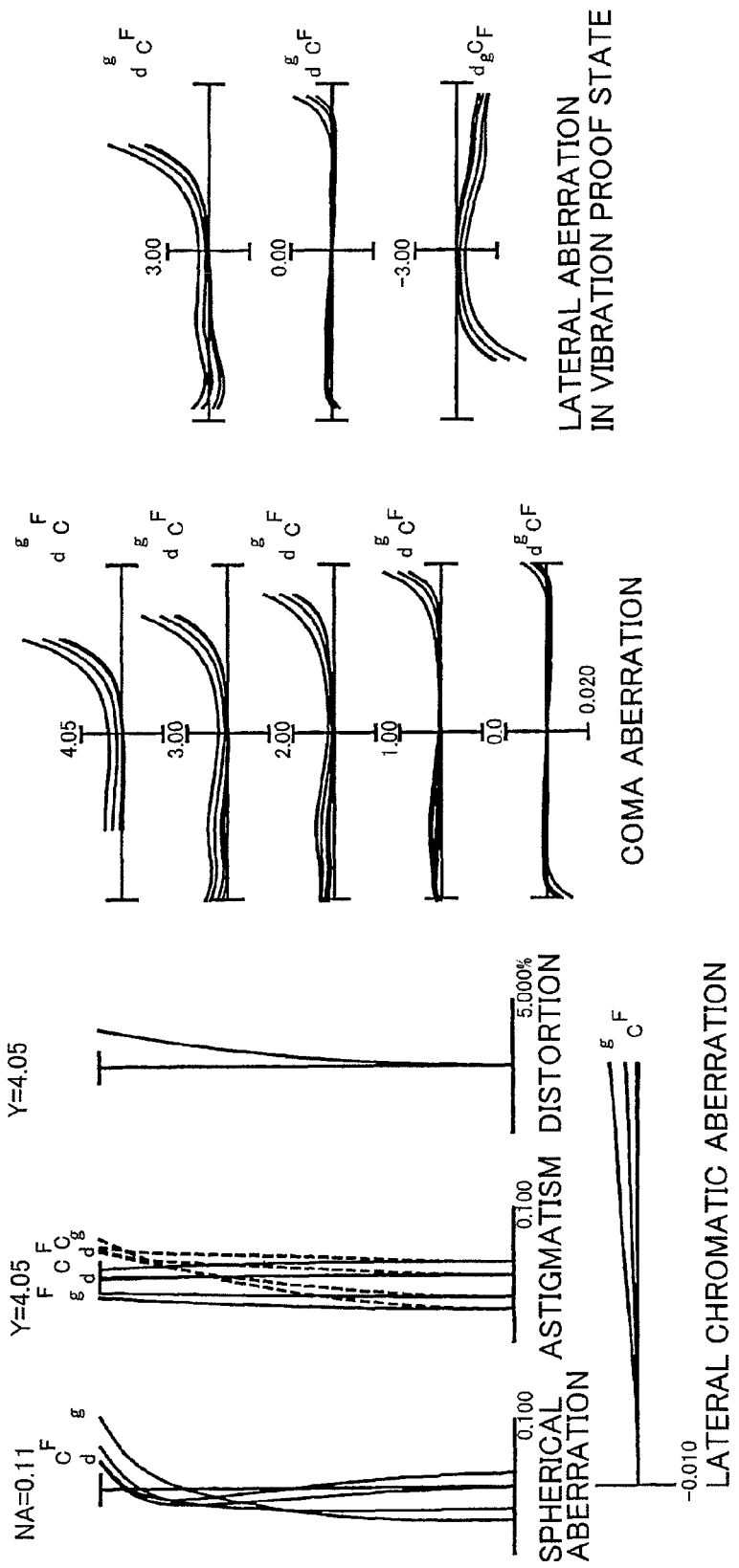
FIG. 7B is a case of an intermediate focal length state.
Figure 7C:
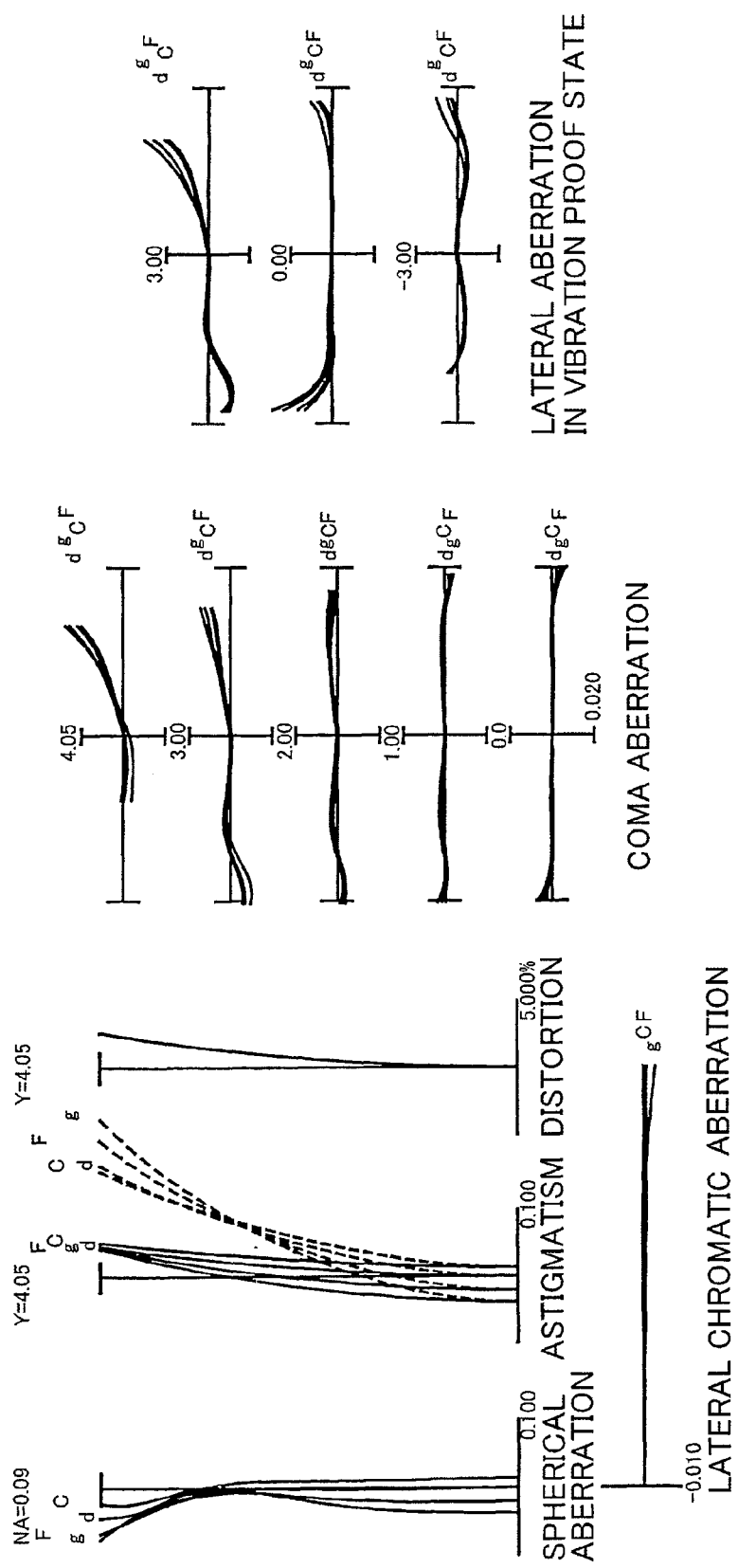
FIG. 7C is a case of a telephoto end state.

FIG. 6 are graphs showing various aberrations of the zoom lens in an infinite focusing state and lateral aberrations in the vibration proof state according to the second example, where FIG. 6A is a case of the wide-angle end state (F=5.24 mm), FIG. 6B is a case of the intermediate focal length state (F=15.00 mm), and FIG. 6C is a case of the telephoto end state (F=29.75 mm). FIG. 7 are graphs showing various aberrations in a close distance focusing state and lateral aberrations in the vibration proof state according to the second example, where FIG. 7A is a case of the wide-angle end state (Rw=133 mm), FIG. 7B is a case of the intermediate focal length state (Rm=319 mm), and FIG. 7C is a case of the telephoto end state (Rt=585 mm).

As each aberration graph shows, in the zoom lens ZL according to the second example, various aberrations are well corrected both in the case of each focal length state from the wide-angle end to telephoto end in the infinite focusing state, and in the case of each focal length state from the wide-angle end to telephoto end in the close distance focusing state, and excellent image formation performance is implemented.

By equipping the zoom lens ZL of the second example, excellent optical performance can be insured for a digital single-lens reflex camera (optical apparatus, see FIG. 1).

Third Example

Figure 8:
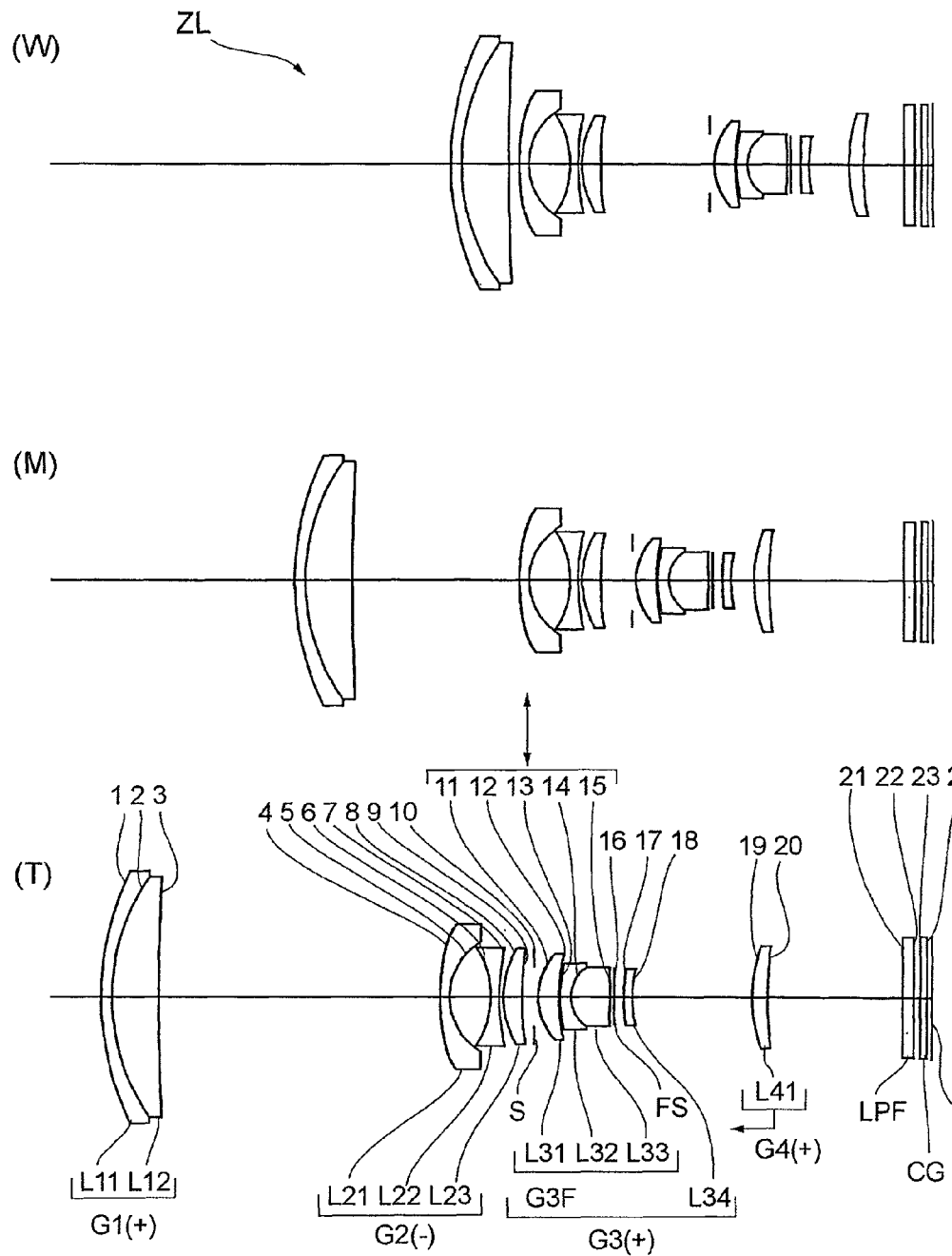
FIG. 8 are cross-sectional views depicting a configuration of a zoom lens according to a third example, where (W) shows a wide-angle end state in an infinity focusing state, (M) shows an intermediate focal length state in the infinity focusing state, and (T) is a telephoto end state in the infinity focusing state.

The third example will now be described with reference to FIG. 8 to FIG. 10, and Table 3. FIG. 8 shows the configuration of the zoom lens ZL according to the third example, where the change of focal length state from the wide-angle end state (W) to the telephoto end state (T) via the intermediate focal length state (M), that is, the movement of each lens group during zooming, is shown.

Table 3 shows each data of the third example. The surface numbers 1 to 24 in Table 3 correspond to the surfaces 1 to 24 in FIG. 8. In the third example, the object side lens surface of the negative meniscus lens L21, image side lens surface of the positive meniscus lens L23, object side lens surface of the positive meniscus lens L31, and image side lens surface of the biconvex lens L33, in other words, lens surfaces of the fourth surface, ninth surface, eleventh surface and fifteenth surface, are all formed to be an aspherical shape.

In the tables, d3 is an axial air distance between the first lens group G1 and the second lens group G2, d9 is an axial air distance between the second lens group G2 and the aperture stop S, d18 is an axial air distance between the third lens group G3 and the fourth lens group G4, and d20 is an axial air distance between the fourth lens group G4 and the low pass filter LPF. These axial air distances d3, d9, d18 and d20 change during zooming.

TABLE 3

[All parameters]

| | Wide-angle end | | intermediate focal length | | telephoto end |
|---|---|---|---|---|---|
| F | 5.24 | ~ | 15.00 | ~ | 29.75 |
| FNO | 3.1 | ~ | 4.4 | ~ | 5.7 |
| ω | −39.32 | ~ | −14.76 | ~ | −7.66 |

[Lens parameters]

| Surface Number | r | d | nd | νd |
|---|---|---|---|---|
| 1 | 21.7401 | 0.8000 | 1.903660 | 31.31 |
| 2 | 16.0416 | 3.4000 | 1.603000 | 65.47 |
| 3 | 180.6875 | (d3 = variable) | | |
| 4* | 19.4855 | 0.7000 | 1.851350 | 40.10 |
| 5 | 4.8000 | 3.0000 | | |
| 6 | −6.9420 | 0.6000 | 1.755000 | 52.29 |
| 7 | 16.5264 | 0.3000 | | |
| 8 | 7.1421 | 1.4000 | 1.821140 | 24.06 |
| 9* | 82.7970 | (d9 = variable) | | |
| 10 | aperture stop S | 0.3000 | | |
| 11* | 4.5916 | 1.5000 | 1.768020 | 49.23 |
| 12 | 13.8049 | 0.1000 | | |
| 13 | 9.8148 | 0.8000 | 1.803840 | 33.89 |
| 14 | 2.6725 | 2.9000 | 1.592010 | 67.05 |
| 15* | −21.6333 | 0.3000 | | |
| 16 | Flare cut stop FS | 0.7000 | | |
| 17 | 22.2291 | 0.6000 | 1.883000 | 40.77 |
| 18 | 9.8358 | (d18 = variable) | | |
| 19 | 11.4427 | 1.1000 | 1.516800 | 64.12 |
| 20 | 27.1787 | (d20 = variable) | | |
| 21 | ∞ | 0.8000 | 1.516800 | 64.12 |
| 22 | ∞ | 0.5000 | | |
| 23 | ∞ | 0.5000 | 1.516800 | 64.12 |
| 24 | ∞ | (Bf) | | |

[Aspherical Data]

Fourth surface

K = 10.4162, A4 = 1.94090E−04, A6 = −2.59290E−06, A8 = 0.00000E−00, A10 = 0.00000E−00

Ninth surface

K = −100.0000, A4 = 9.84400E−04, A6 = 4.51250E−05, A8 = −4.23140E−06, A10 = 2.01510E−07

Eleventh surface

K = −0.2282, A4 = −9.88550E−05, A6 = 1.21650E−05, A8 = 0.00000E−00, A10 = 0.00000E−00

Fifteenth surface

K = −100.0000, A4 = 8.59580E−04, A6 = 1.42440E−04, A8 = 0.00000E−00, A10 = 0.00000E−00

TABLE 3-continued

[Variable distance during focusing]

| | Infinite distance | | | Close distance | | |
|---|---|---|---|---|---|---|
| F, β | 5.24000 | 15.00000 | 29.75200 | −0.05000 | −0.05000 | −0.05000 |
| D0 | ∞ | ∞ | ∞ | 94.2415 | 274.9204 | 540.9099 |
| d3 | 0.78497 | 12.19482 | 20.65552 | 0.78497 | 12.19482 | 20.65552 |
| d9 | 7.95277 | 2.22802 | 0.84738 | 7.95277 | 2.28802 | 0.84738 |
| d18 | 3.04423 | 1.70126 | 8.73999 | 2.21095 | 0.44328 | 6.33156 |
| d20 | 2.96445 | 9.99251 | 10.03384 | 3.79772 | 11.25049 | 12.44227 |
| Bf | 0.40631 | 0.40631 | 0.40631 | 0.40631 | 0.40631 | 0.40631 |
| TL | 35.45274 | 46.82291 | 60.98303 | 35.45273 | 46.82291 | 60.98303 |

[Zoom lens group data]

| Group No. | First surface of group | Focal length of group |
|---|---|---|
| G1 | 1 | 49.90959 |
| G2 | 4 | −5.45518 |
| G3 | 11 | 7.80739 |
| G4 | 19 | 37.35259 |

[Conditional Expressions]

(1) $f30/f34 = -0.382$
(2) $fG3F/(F34 \times N3n) = -0.186$
(3) $(fw \times F30)/Ft^2 = 0.046$
(4) $d33/d30 = 0.420$ As the data table in Table 3 shows, the zoom lens ZL according to the present example satisfies all the above conditional expressions (1) to (4).

Figure 9A:
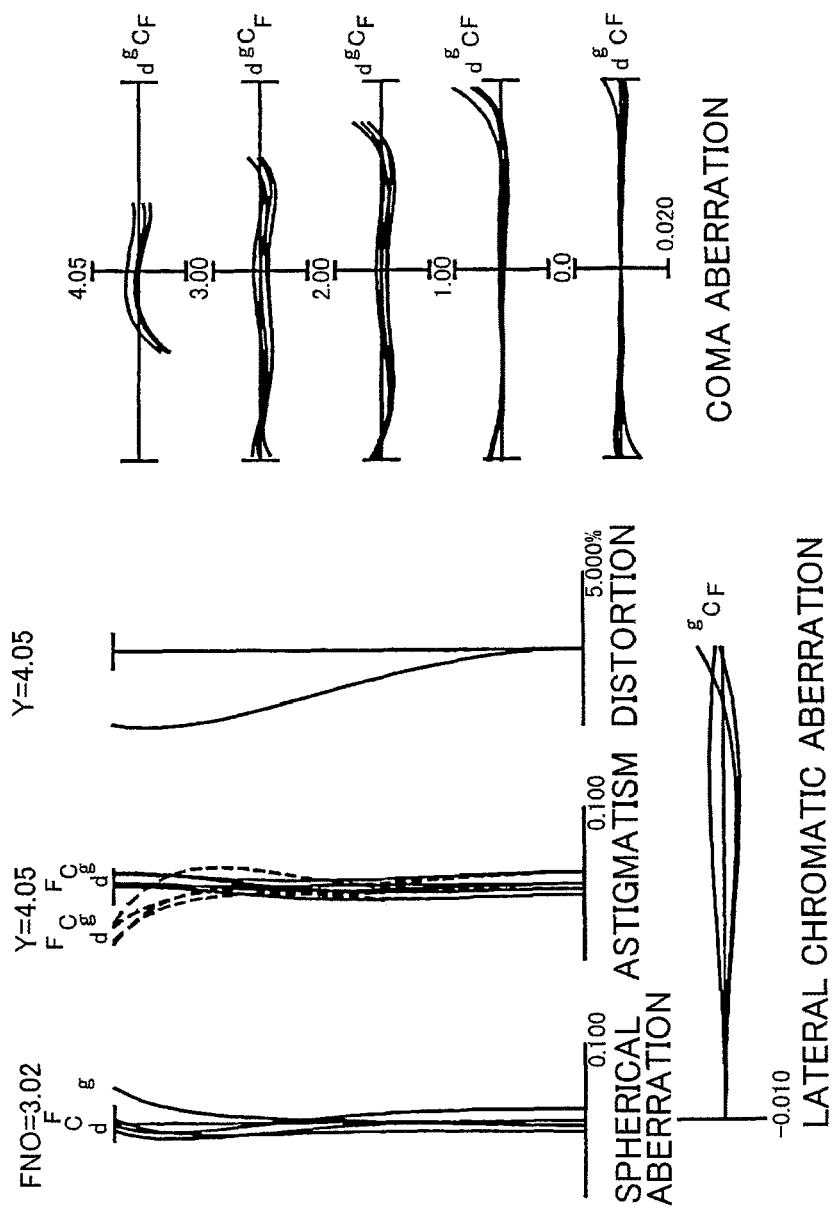
FIG. 9A is a case of a wide-angle end state.
Figure 9B:
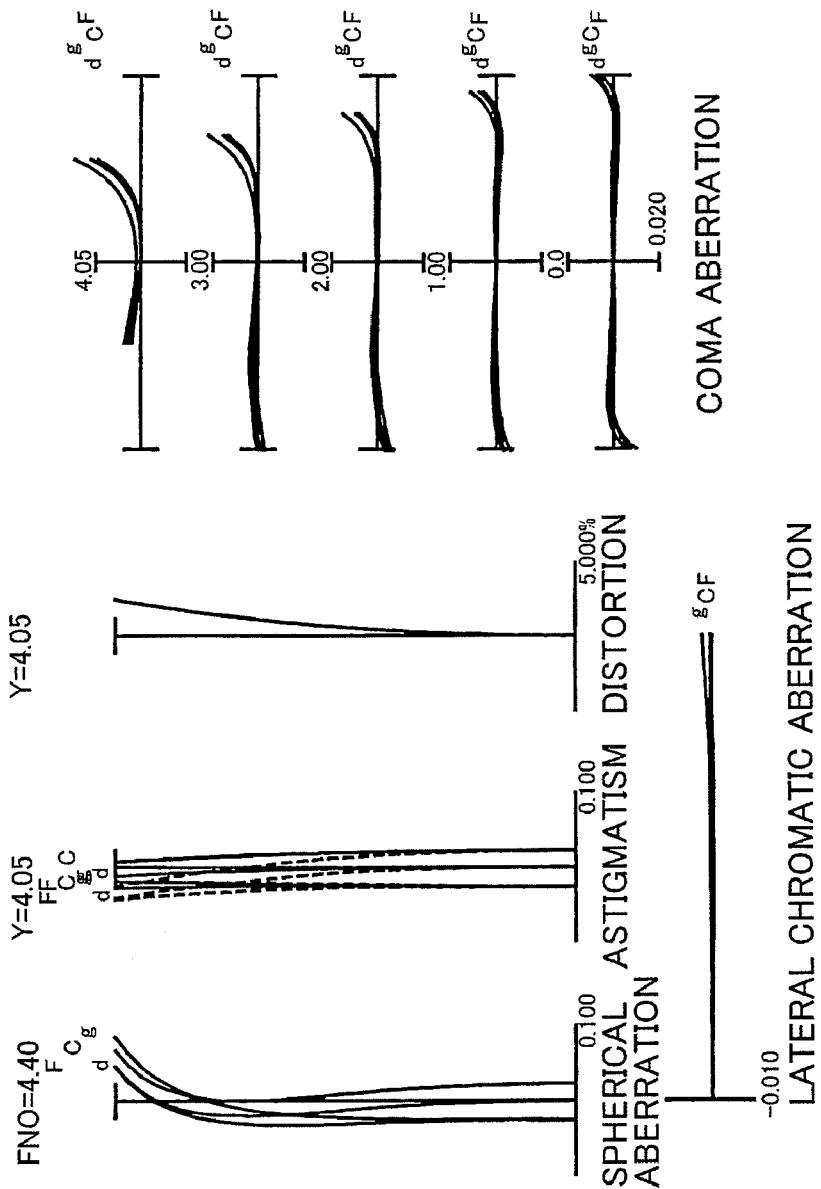
FIG. 9B is a case of an intermediate focal length state.
Figure 9C:
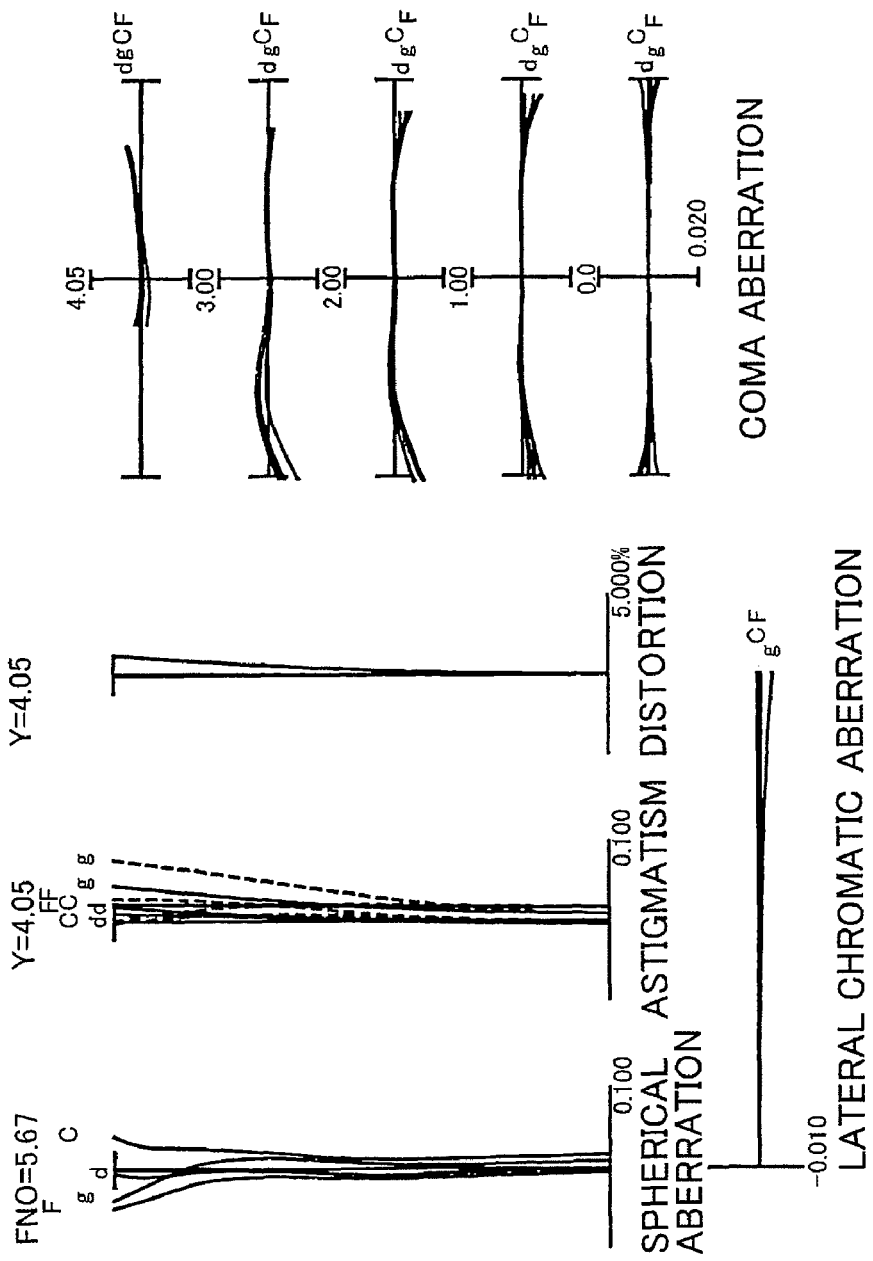
FIG. 9C is a case of a telephoto end state.
Figure 10A:
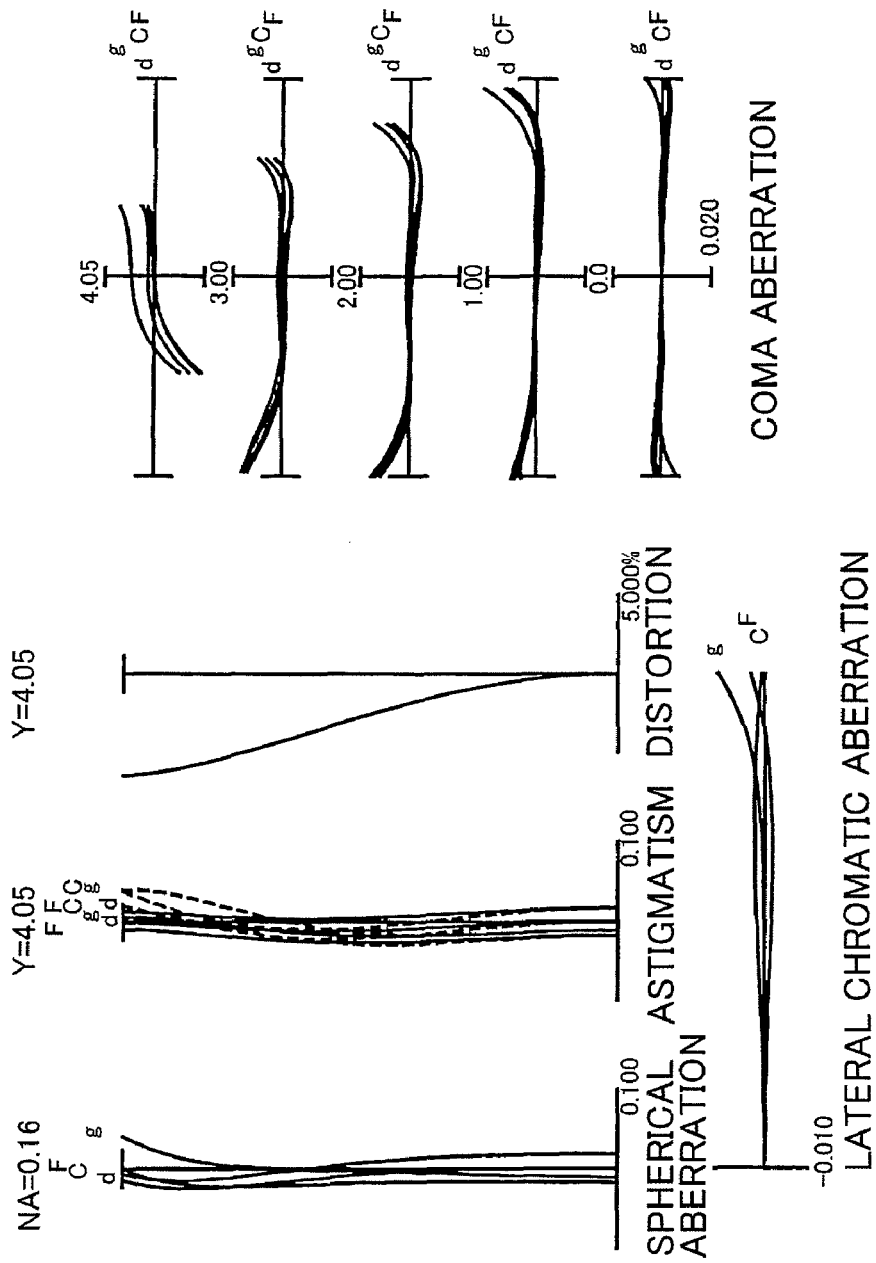
FIG. 10A is a case of a wide-angle end state.
Figure 10B:
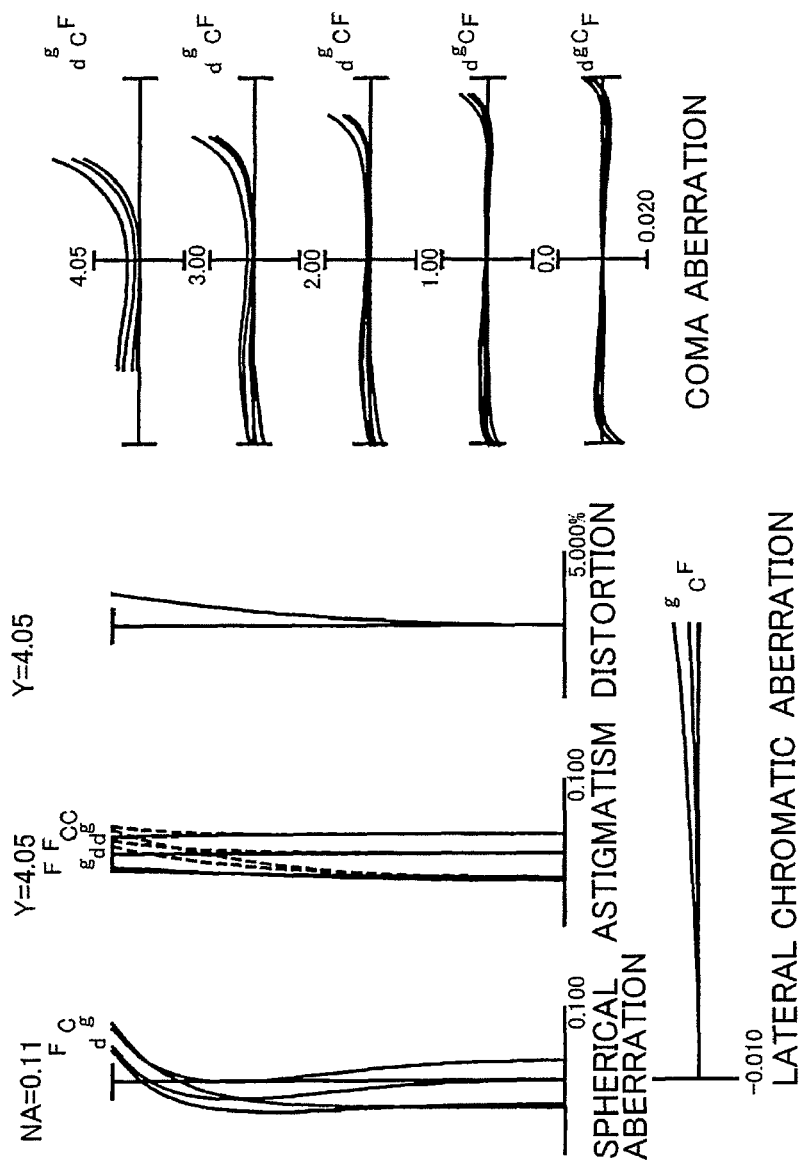
FIG. 10B is a case of an intermediate focal length state.
Figure 10C:
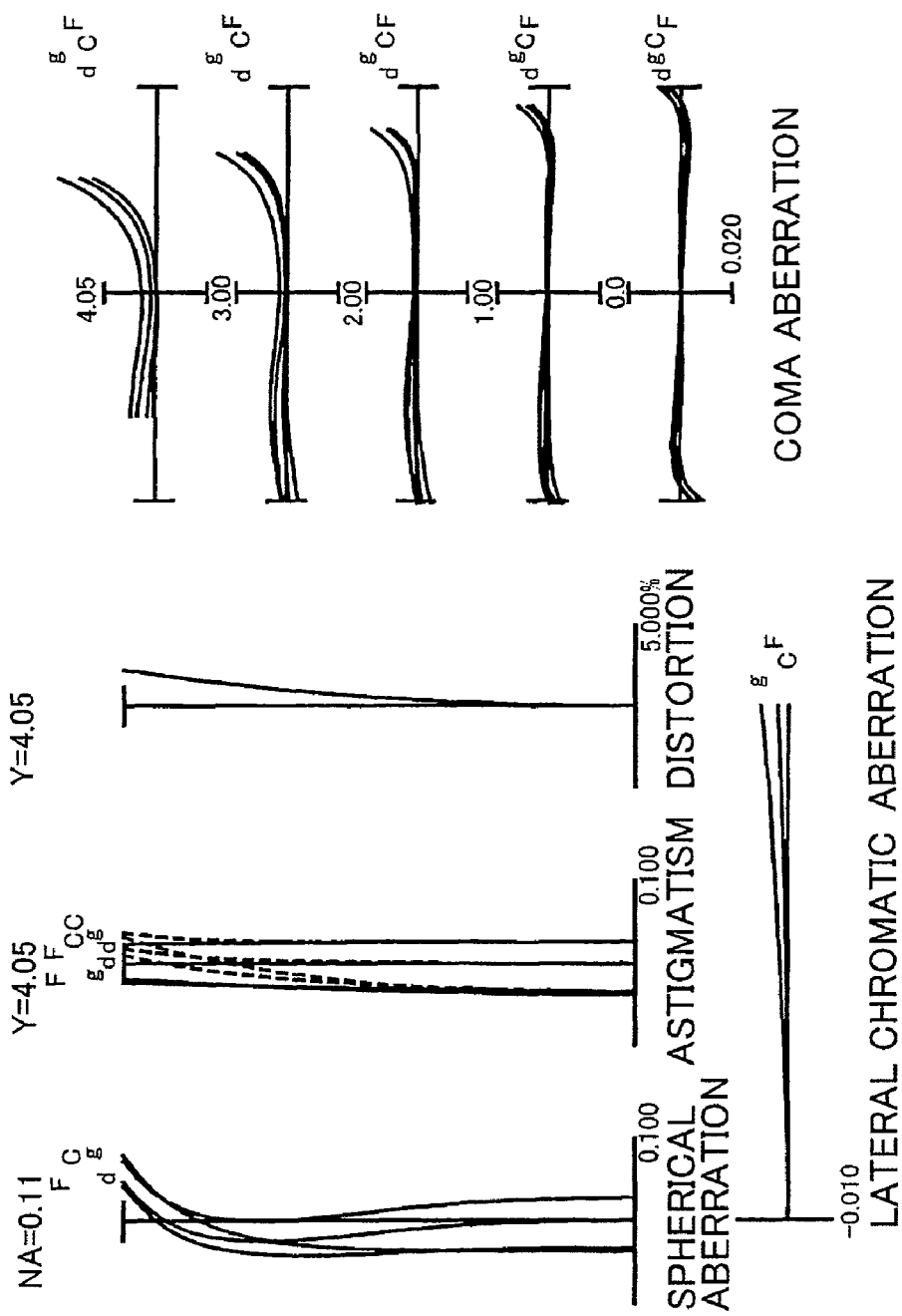
FIG. 10C is a case of a telephoto end state.

FIG. 9 are graphs showing various aberrations of the zoom lens in an infinite focusing state and the lateral aberrations in the vibration proof state according to the third example, where FIG. 9A is a case of the wide-angle end state (F=5.24 mm), FIG. 9B is a case of the intermediate focal length state (F=15.00 mm) and FIG. 9C is a case of the telephoto end state (F=29.75 mm). FIG. 10 are graphs showing various aberrations in a close distance focusing state and lateral aberrations in the vibration proof state according to the third example, where FIG. 10A is a case of the wide-angle end state (Rw=130 mm), FIG. 10B is a case of the intermediate focal length state (Rm=322 mm), and FIG. 10C is a case of the telephoto end state (Rt=602 mm).

As each aberration graphs shows, in the zoom lens ZL according to the third example, various aberrations are well corrected both in the case of each focal length state from the wide-angle end to telephoto end in the infinite focusing state, and in the case of each focal length state from the wide-angle end to telephoto end in the close distance focusing state, and excellent image formation performance is implemented.

By equipping the zoom lens ZL of the third example, excellent optical performance can be insured for a digital single-lens reflex camera (optical apparatus, see FIG. 1).

Fourth Example

The fourth example will now be described with reference to FIG. 11 to FIG. 13, and Table 4. FIG. 11 shows the configuration of the zoom lens ZL according to the fourth example, where a change of focal length state from the wide-angle end state (W) to the telephoto end state (T) via the intermediate focal length state (M), that is, the movement of each lens group during zooming, is shown.

Table 4 shows each data of the fourth example. The surface numbers 1 to 24 in Table 4 correspond to the surfaces 1 to 24 in FIG. 11. In the fourth example, the object side lens surface of the negative meniscus lens L21, image side lens surface of the positive meniscus lens L23, object side lens surface of the positive meniscus lens L31, and image side lens surface of the biconvex lens L33, in other words, lens surfaces of the fourth surface, ninth surface, eleventh surface and fifteenth surface, are all formed to be an aspherical shape.

In the tables, d3 is an axial air distance between the first lens group G1 and the second lens group G2, d9 is an axial air distance between the second lens group G2 and the aperture stop S, d18 is an axial air distance between the third lens group G3 and the fourth lens group G4, and d20 is an axial air distance between the fourth lens group and the low pass filter LPF. These axial air distances d3, d9, d18 and d20 change during zooming.

TABLE 4

[All parameters]

| | Wide-angle end | | intermediate focal length | | telephoto end |
|---|---|---|---|---|---|
| F | 5.20 | ~ | 15.00 | ~ | 35.00 |
| FNO | 2.9 | ~ | 4.2 | ~ | 5.8 |
| ω | −39.31 | ~ | −14.78 | ~ | −7.69 |

TABLE 4-continued

[Lens parameters]

| Surface Number | r | d | nd | νd |
|---|---|---|---|---|
| 1 | 22.6580 | 0.9000 | 1.903660 | 31.31 |
| 2 | 16.7546 | 3.6000 | 1.603000 | 65.47 |
| 3 | 173.7035 | (d3 = variable) | | |
| 4* | 21.9913 | 0.8000 | 1.851350 | 40.10 |
| 5 | 5.0876 | 3.2000 | | |
| 6 | −6.8073 | 0.7000 | 1.755000 | 52.29 |
| 7 | 21.2947 | 0.3000 | | |
| 8 | 8.0515 | 1.5000 | 1.821140 | 24.06 |
| 9* | 209.2176 | (d9 = variable) | | |
| 10 | aperture stop S | 0.3000 | | |
| 11* | 4.8173 | 1.7000 | 1.743300 | 49.32 |
| 12 | 10.9922 | 0.1000 | | |
| 13 | 6.8149 | 0.8000 | 1.903660 | 31.31 |
| 14 | 2.8338 | 3.1000 | 1.592010 | 67.05 |
| 15* | −25.9491 | 0.3000 | | |
| 16 | Flare cut stop FS | 0.7000 | | |
| 17 | 18.7998 | 0.7000 | 1.883000 | 40.77 |
| 18 | 9.2180 | (d18 = variable) | | |
| 19 | 11.1802 | 1.2000 | 1.516800 | 64.12 |
| 20 | 28.5786 | (d20 = variable) | | |
| 21 | ∞ | 0.8000 | 1.516800 | 64.12 |
| 22 | ∞ | 0.5000 | | |
| 23 | ∞ | 0.5000 | 1.516800 | 64.12 |
| 24 | ∞ | (Bf) | | |

[Aspherical Data]

Fourth surface

K = 12.6108, A4 = 1.85220E−04, A6 = −2.26860E−06, A8 = 0.00000E−00, A10 = 0.00000E−00

Ninth surface

K = −100.0000, A4 = 7.77520E−04, A6 = 2.59180E−05, A8 = −2.13670E−06, A10 = 9.21200E−08

Eleventh surface

K = −0.2317, A4 = −9.459990−05, A6 = 6025740E−06, A8 = 0.00000E−00, A10 = 0.00000E−00

Fifteenth surface

K = −100.0000, A4 = 1.03610E−03, A6 = 6.26560E−05, A8 = 0.00000E−00, A10 = 0.00000E−00

[Variable distance during focusing]

| | Infinite distance | | | Close distance | | |
|---|---|---|---|---|---|---|
| F, β | 5.20000 | 15.00000 | 29.75200 | −0.05000 | −0.05000 | −0.05000 |
| D0 | ∞ | ∞ | ∞ | 93.4240 | 273.3649 | 621.7957 |
| d3 | 0.83822 | 12.69829 | 23.53396 | 0.83822 | 12.69829 | 23.53396 |
| d9 | 8.49164 | 2.26178 | 0.68535 | 8.49164 | 2.26178 | 0.68535 |
| d19 | 3.33154 | 1.73374 | 12.46171 | 2.50392 | 0.52898 | 9.55384 |
| d20 | 1.98878 | 9.21679 | 7.74807 | 2.81640 | 10.42155 | 10.65594 |
| Bf | 0.93390 | 0.93390 | 0.93390 | 0.93390 | 0.93390 | 0.93390 |
| TL | 37.28407 | 48.54450 | 67.06299 | 37.28407 | 48.54450 | 67.06299 |

[Zoom lens group data]

| Group No. | First surface of group | Focal length of group |
|---|---|---|
| G1 | 1 | 49.90959 |
| G2 | 4 | −5.45518 |
| G3 | 11 | 7.60000 |
| G4 | 19 | 38.47541 |

[Conditional Expressions]

(1) $f30/f34 = -0.241$
(2) $fG3F/(F34 \times N3n) = -0.120$
(3) $(Fw \times F30)/Ft^2 = 0.045$
(4) $d33/d30 = 0.304$ As the data table in Table 4 shows, the zoom lens ZL according to the present example, satisfies all the above conditional expression (1) to (4).

Figure 12A:
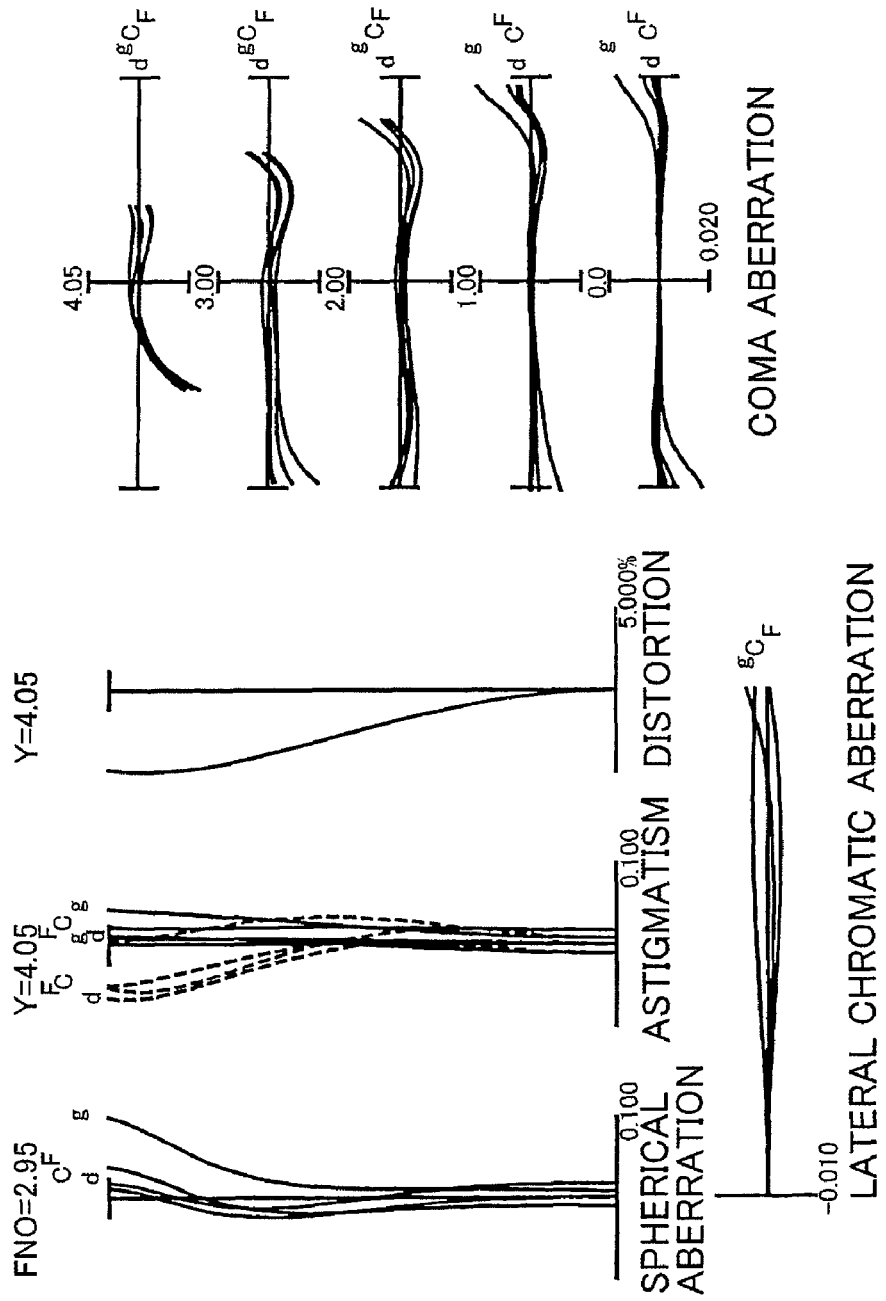
FIG. 12A is a case of a wide-angle end state.
Figure 12B:
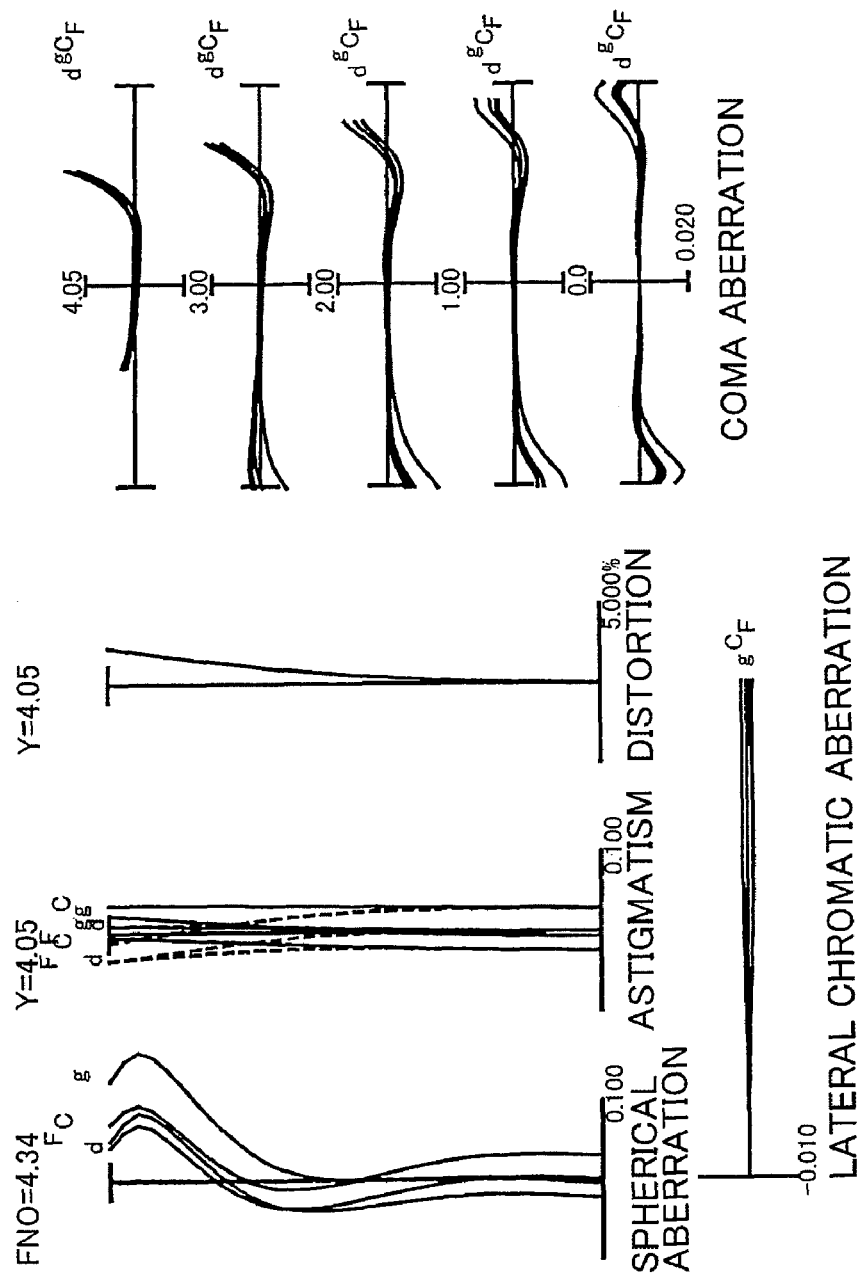
FIG. 12B is a case of an intermediate focal length state.
Figure 12C:
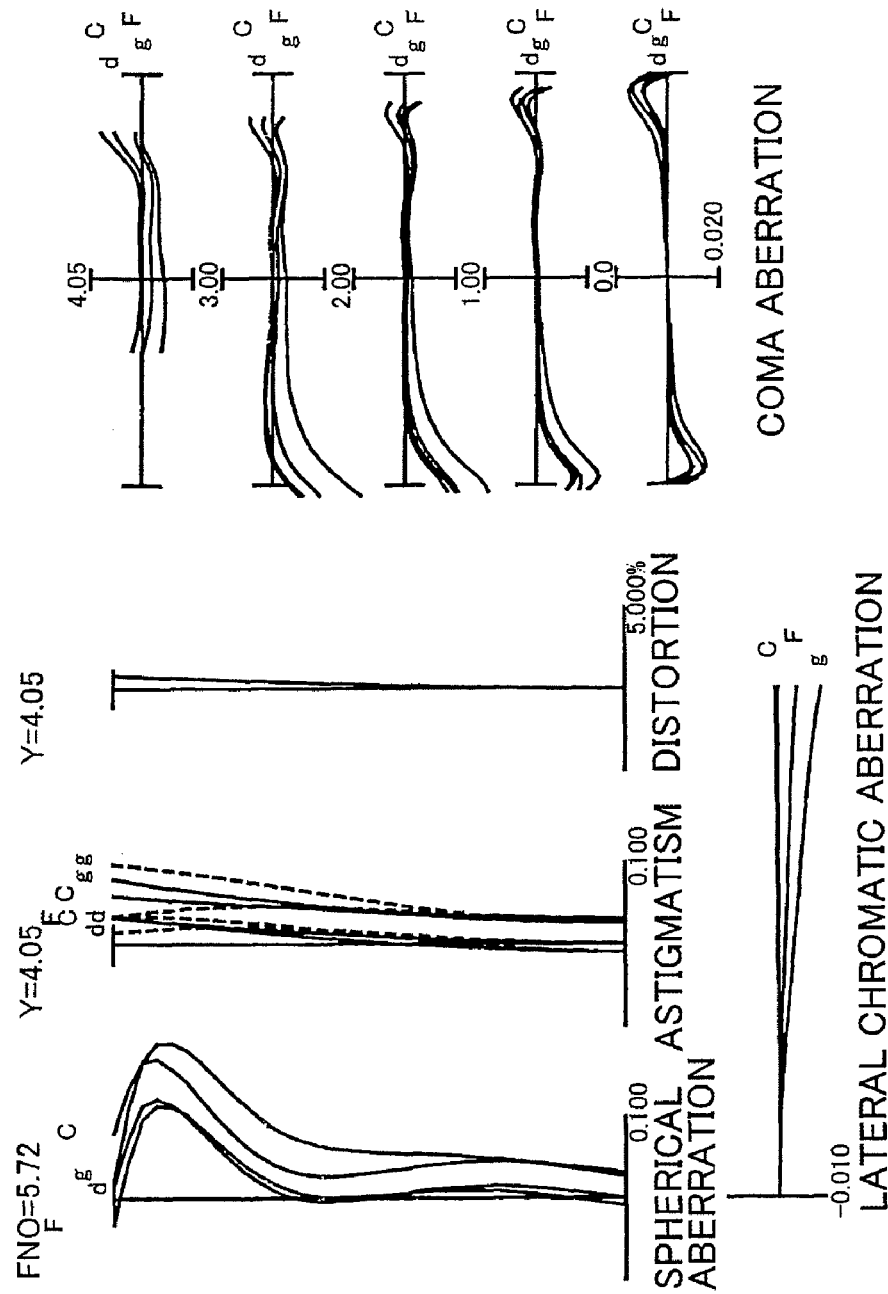
FIG. 12C is a case of a telephoto end state.
Figure 13A:
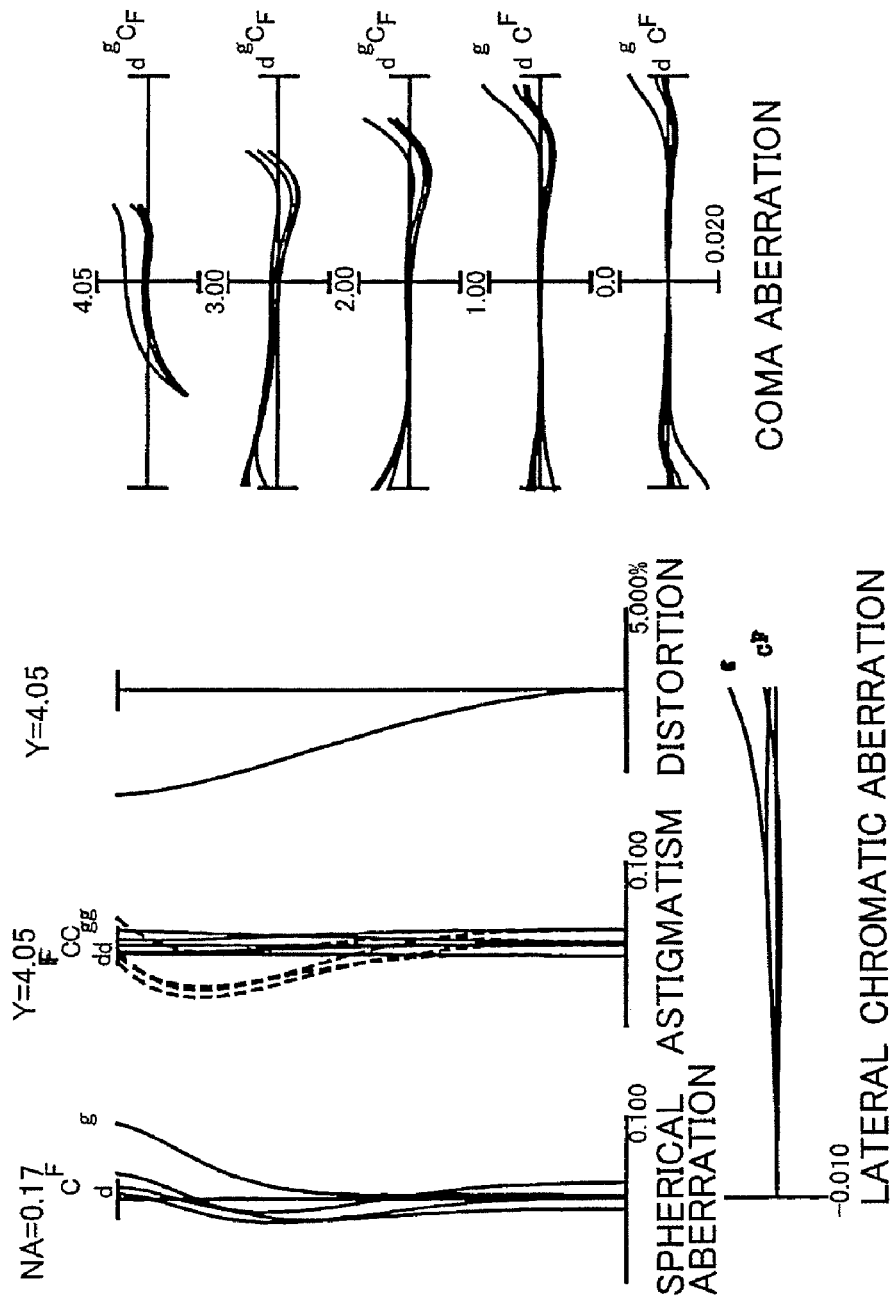
FIG. 13A is a case of a wide-angle end state.
Figure 13B:
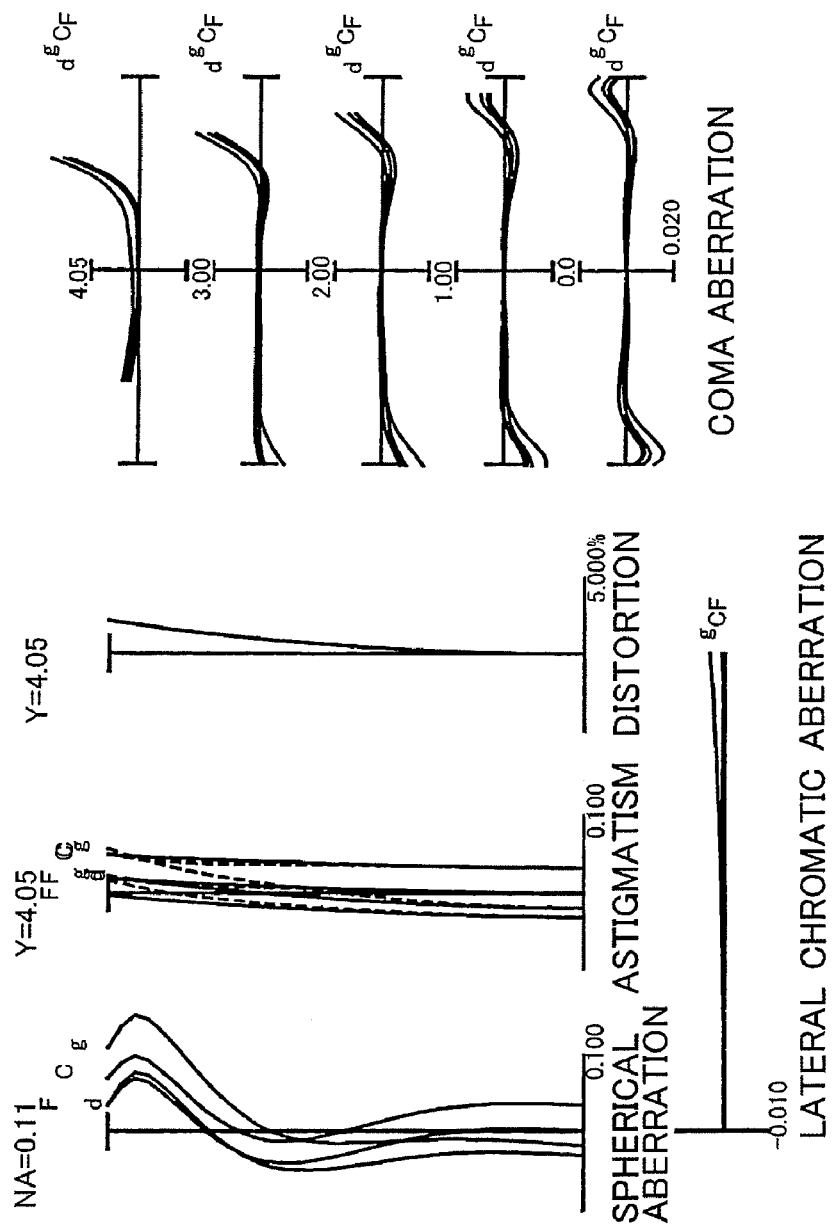
FIG. 13B is a case of an intermediate focal length state.
Figure 13C:
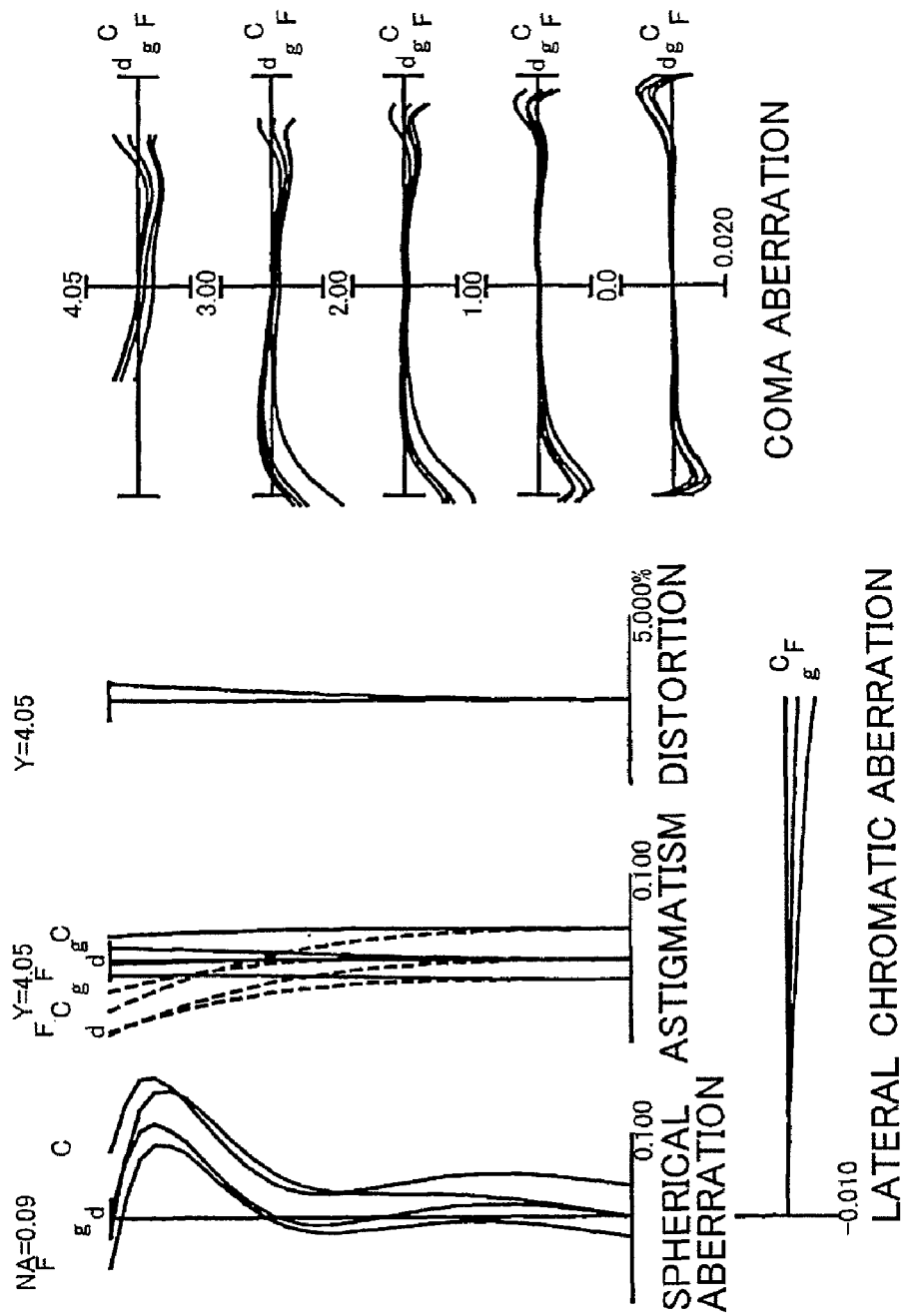
FIG. 13C is a case of a telephoto end state.

FIG. 12 are graphs showing various aberrations of the zoom lens in an infinite focusing state and the lateral aberrations in the vibration proof state according to the fourth example, where FIG. 12A is a case of the wide-angle end state (F=5.20 mm), FIG. 12B is a case of the intermediate focal length state (F=15.00 mm), and FIG. 12C is a case of the telephoto end state (F=29.75 mm). FIG. 13 are graphs showing various aberrations in a close distance focusing state and lateral aberrations in the vibration proof state according to the fourth example, where FIG. 13A is a case of the wide-angle end state (Rw=131 mm), FIG. 13B is a case of the intermediate focal length state (Rm=322 mm), and FIG. 13C is a case of the telephoto end state (Rt=689 mm).

As each aberration graph shows, in the zoom lens ZL according to the fourth example, various aberrations are well corrected both in the case of each focal length state from the wide-angle end to telephoto end in the infinite focusing state, and in the case of each focal length state from the wide-angle end to telephoto end in the close distance focusing state, and excellent image formation performance is implemented.

By equipping the zoom lens ZL of the fourth example, excellent optical performance can be insured for a digital single-lens reflex camera (optical apparatus, see FIG. 1).

Fifth Example

The fifth example will now be described with reference to FIG. 14 to FIG. 16, and Table 5. FIG. 14 shows the configuration of the zoom lens ZL according to the fifth example, where the change of focal length state from the wide-angle end state (W) to the telephoto end state (T) via the intermediate focal length state (M), that is, the movement of each lens group during zooming, is shown.

Table 5 shows each data of the fifth example. The surface numbers 1 to 24 in Table 5 correspond to the surfaces 1 to 24 in FIG. 14. In the fifth example, the object side lens surface of the negative meniscus lens L21, image side lens surface of the positive meniscus lens L23, the object side lens surface of the positive meniscus lens L31, the image side lens surface of the biconvex lens L33, in other words, lens surfaces of the fourth surface, ninth surface, eleventh surface and fifteenth surface are all formed to be an aspherical shape.

In the tables, d3 is an axial air distance between the first lens group G1 and the second lens group G2, d9 is an axial air distance between the second lens group G2 and the aperture stop S, d18 is an axial air distance between the third lens group G3 and the fourth lens group G4, and d20 is an axial air distance between the fourth lens group and the low pass filter LPF. These axial air distances d3, d9, d18 and d20 change during zooming.

TABLE 5

[All parameters]

| | Wide-angle end | | intermediate focal length | | telephoto end |
|---|---|---|---|---|---|
| F | 5.20 | ~ | 15.00 | ~ | 29.75 |
| FNO | 3.1 | ~ | 4.5 | ~ | 5.9 |
| ω | −39.35 | ~ | −14.78 | ~ | −7.68 |

[Lens parameters]

| Surface Number | r | d | nd | νd |
|---|---|---|---|---|
| 1 | 20.9332 | 0.8000 | 1.903660 | 31.31 |
| 2 | 15.6096 | 3.4000 | 1.603000 | 65.47 |
| 3 | 132.9284 | (d3 = variable) | | |
| 4* | 21.5411 | 0.7000 | 1.851350 | 40.10 |
| 5 | 4.8000 | 3.0000 | | |
| 6 | −6.6897 | 0.6000 | 1.755000 | 52.29 |
| 7 | 17.5831 | 0.3000 | | |
| 8 | 7.1922 | 1.4000 | 1.821140 | 24.06 |
| 9* | 148.9436 | (d9 = variable) | | |
| 10 | aperture stop S | 0.3000 | | |
| 11* | 5.2502 | 1.5000 | 1.768020 | 49.23 |
| 12 | 12.4615 | 0.1000 | | |
| 13 | 6.7844 | 0.8000 | 2.000690 | 25.46 |
| 14 | 3.2207 | 2.9000 | 1.617200 | 54.00 |
| 15* | −20.3248 | 0.3000 | | |
| 16 | Flare cut Stop FS | 0.7000 | | |
| 17 | 13.8399 | 0.6000 | 1.883000 | 40.77 |
| 18 | 6.8992 | (d18 = variable) | | |
| 19 | 11.2782 | 1.1000 | 1.516800 | 64.12 |
| 20 | 35.2359 | (d20 = variable) | | |
| 21 | ∞ | 0.8000 | 1.516800 | 64.12 |
| 22 | ∞ | 0.5000 | | |
| 23 | ∞ | 0.5000 | 1.516800 | 64.12 |
| 24 | ∞ | (Bf) | | |

[Aspherical Data]

Fourth surface

K = 13.5658, A4 = 2.52830E−04, A6 = −2.78780E−06, A8 = 0.00000E−00,
A10 = 0.00000E−00

TABLE 5-continued

Ninth surface

K = −100.0000, A4 = 9.90800E−04, A6 = 5.50150E−05, A8 = −5.44920E−06,
A10 = 2.55520E−07
Eleventh surface K = −0.4153, A4 = 6.82330E−05, A6 = 1.63960E−05, A8 = 0.00000E−00,
A10 = 0.00000E−00
Fifteenth surface K = −100.0000, A4 = 2.62350E−04, A6 = 1.66560E−04, A8 = 0.00000E−00,
A10 = 0.00000E−00

[Variable distance during focusing]

|  | Infinite distance | | | Close distance | | |
|---|---|---|---|---|---|---|
| F, β | 5.20000 | 15.00000 | 29.75200 | −0.05000 | −0.05000 | −0.05000 |
| D0 | ∞ | ∞ | ∞ | 94.3368 | 275.1432 | 536.4708 |
| d3 | 0.72810 | 12.20929 | 21.07791 | 0.72810 | 12.20929 | 21.07791 |
| d9 | 8.17997 | 2.36105 | 1.11642 | 8.17997 | 2.36105 | 1.11642 |
| d18 | 2.87007 | 1.52418 | 9.47367 | 2.17479 | 0.42630 | 7.32129 |
| d20 | 3.13770 | 10.14586 | 9.82036 | 3.83298 | 11.24374 | 11.97274 |
| Bf | 0.70245 | 0.70246 | 0.70243 | 0.70270 | 0.70271 | 0.70267 |
| TL | 35.91830 | 47.24285 | 62.49080 | 35.91855 | 47.24310 | 62.49104 |

[Zoom lens group data]

| Group No. | First surface of group | Focal length of group |
|---|---|---|
| G1 | 1 | 49.90959 |
| G2 | 4 | −5.45518 |
| G3 | 11 | 8.00000 |
| G4 | 19 | 31.60191 |

[Conditional Expressions]

(1) f30/f34 = −0.493
(2) fG3F/(F34 × N3n) = −0.220
(3) (Fw × F30)/Ft$^2$ = 0.047
(4) d33/d30 = 0.420

As the data table in Table 5 shows, the zoom lens ZL according to the present example satisfies all the above conditional expressions (1) to (4).

Figure 15A:
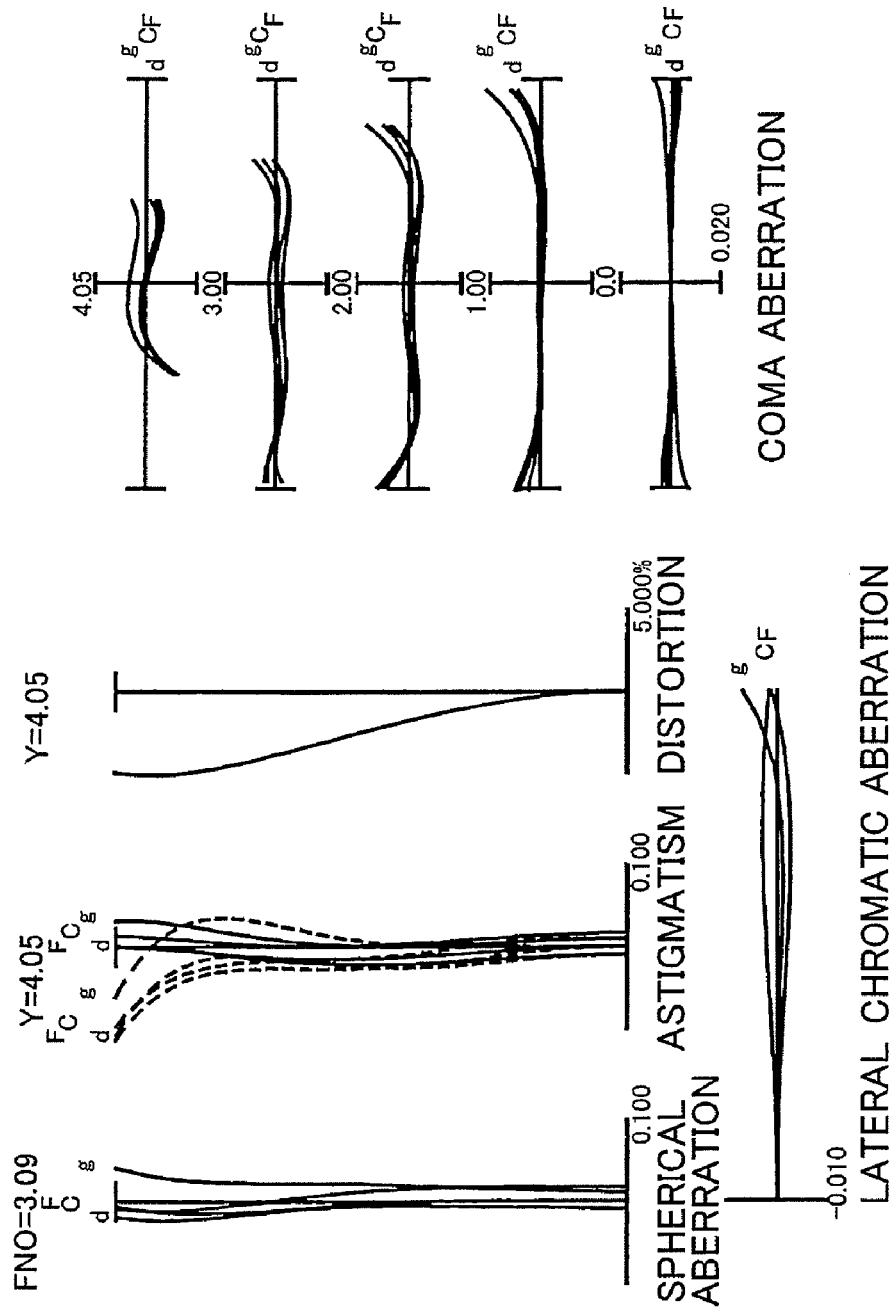
FIG. 15A is a case of a wide-angle end state.
Figure 15B:
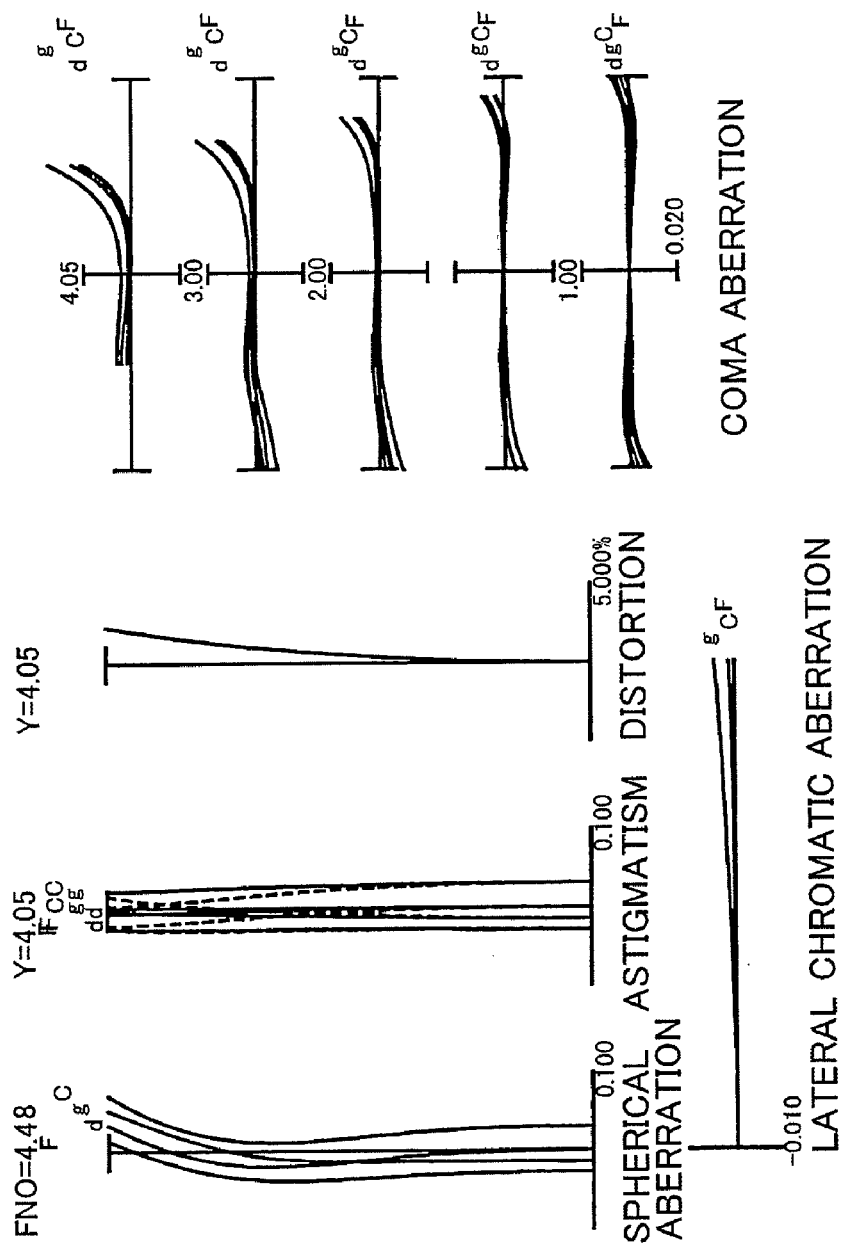
FIG. 15B is a case of an intermediate focal length state.
Figure 15C:
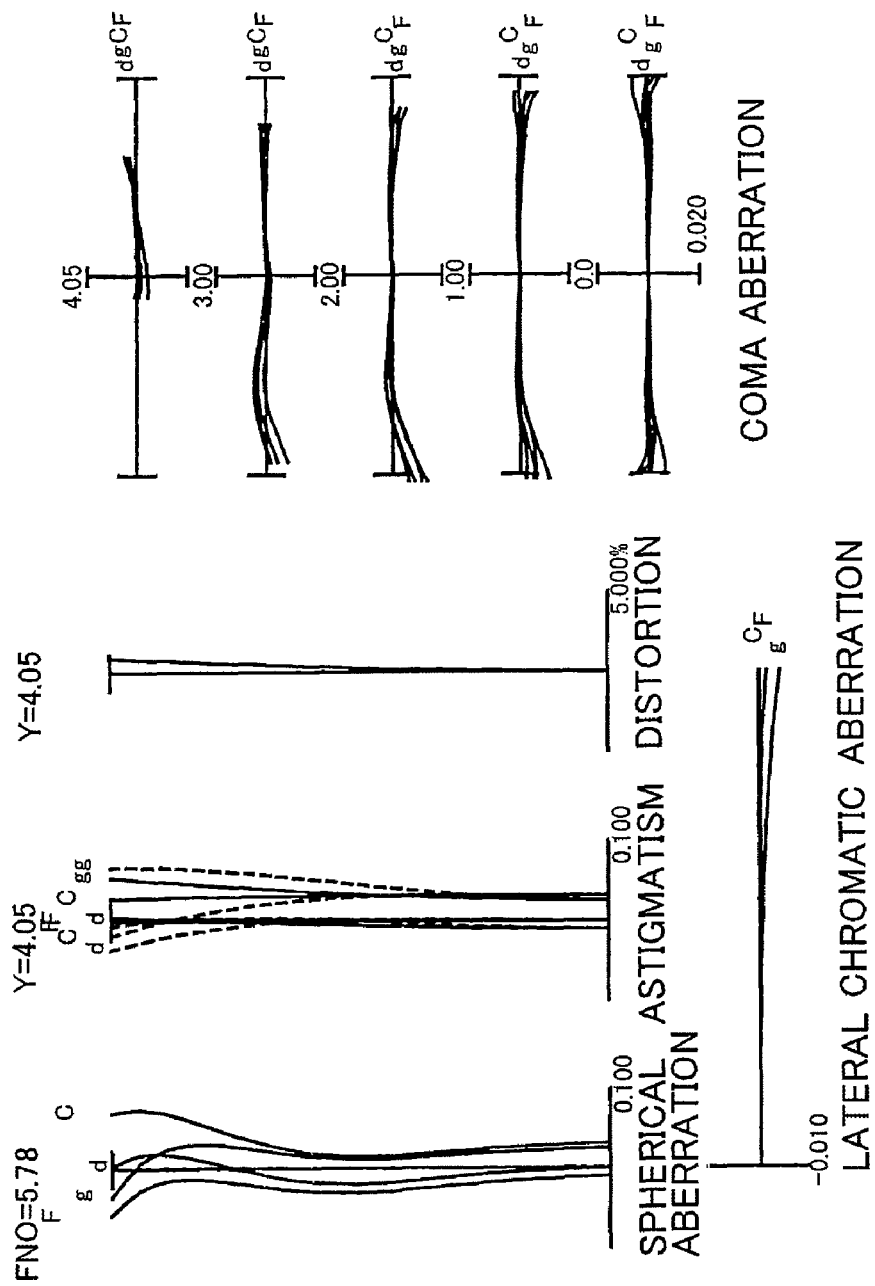
FIG. 15C is a case of a telephoto end state.
Figure 16A:
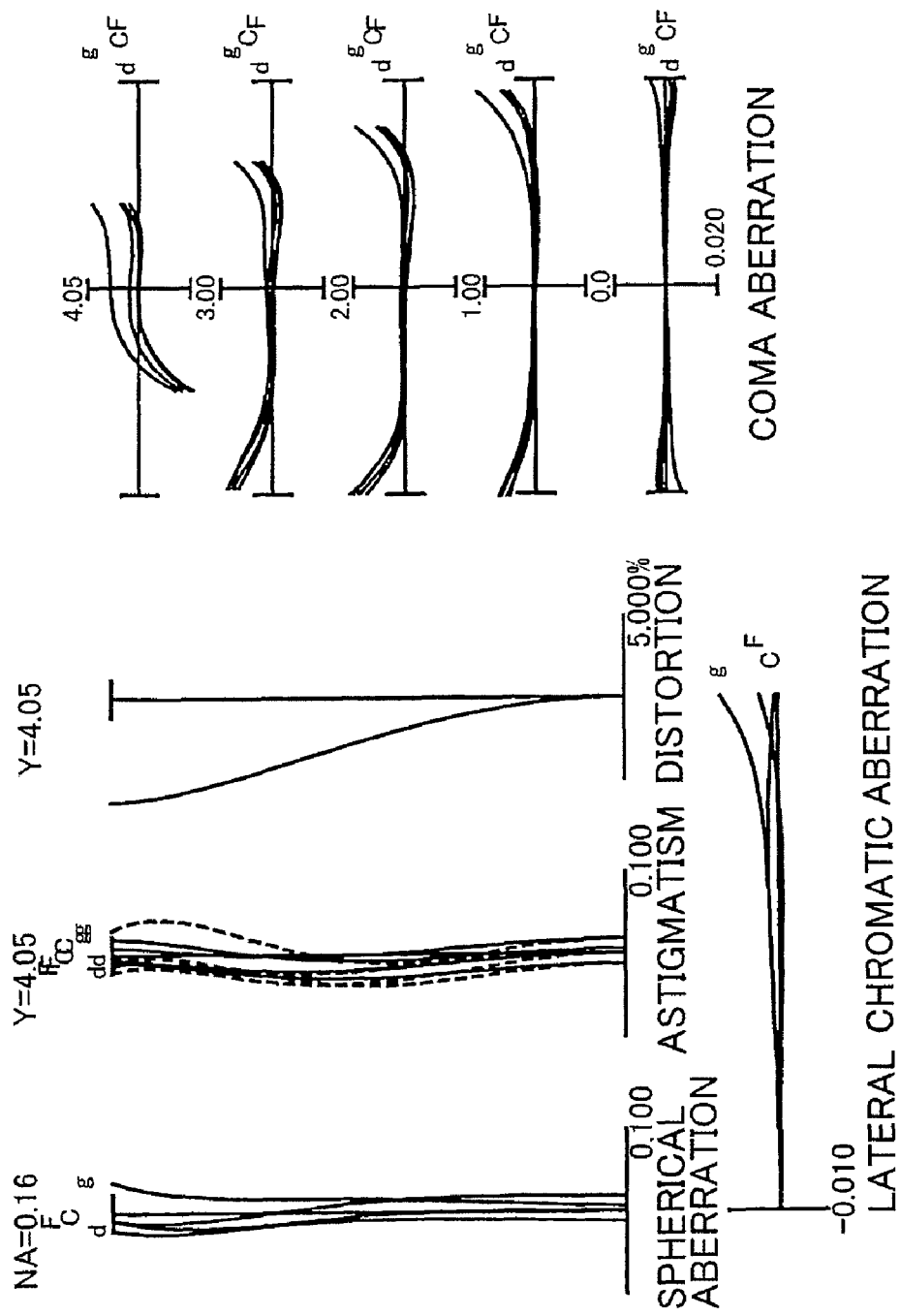
FIG. 16A is a case of a wide-angle end state.
Figure 16B:
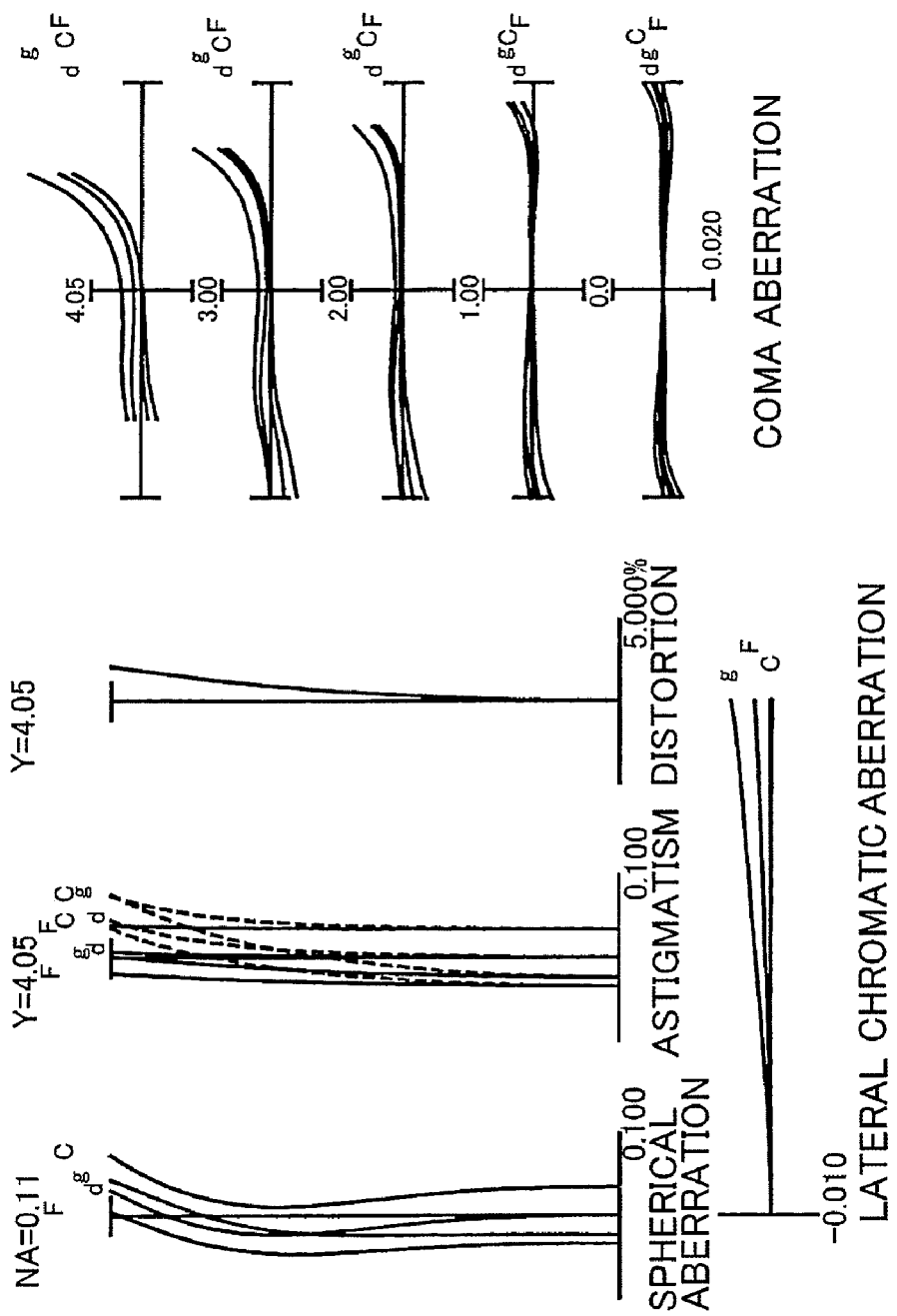
FIG. 16B is a case of an intermediate focal length state.
Figure 16C:
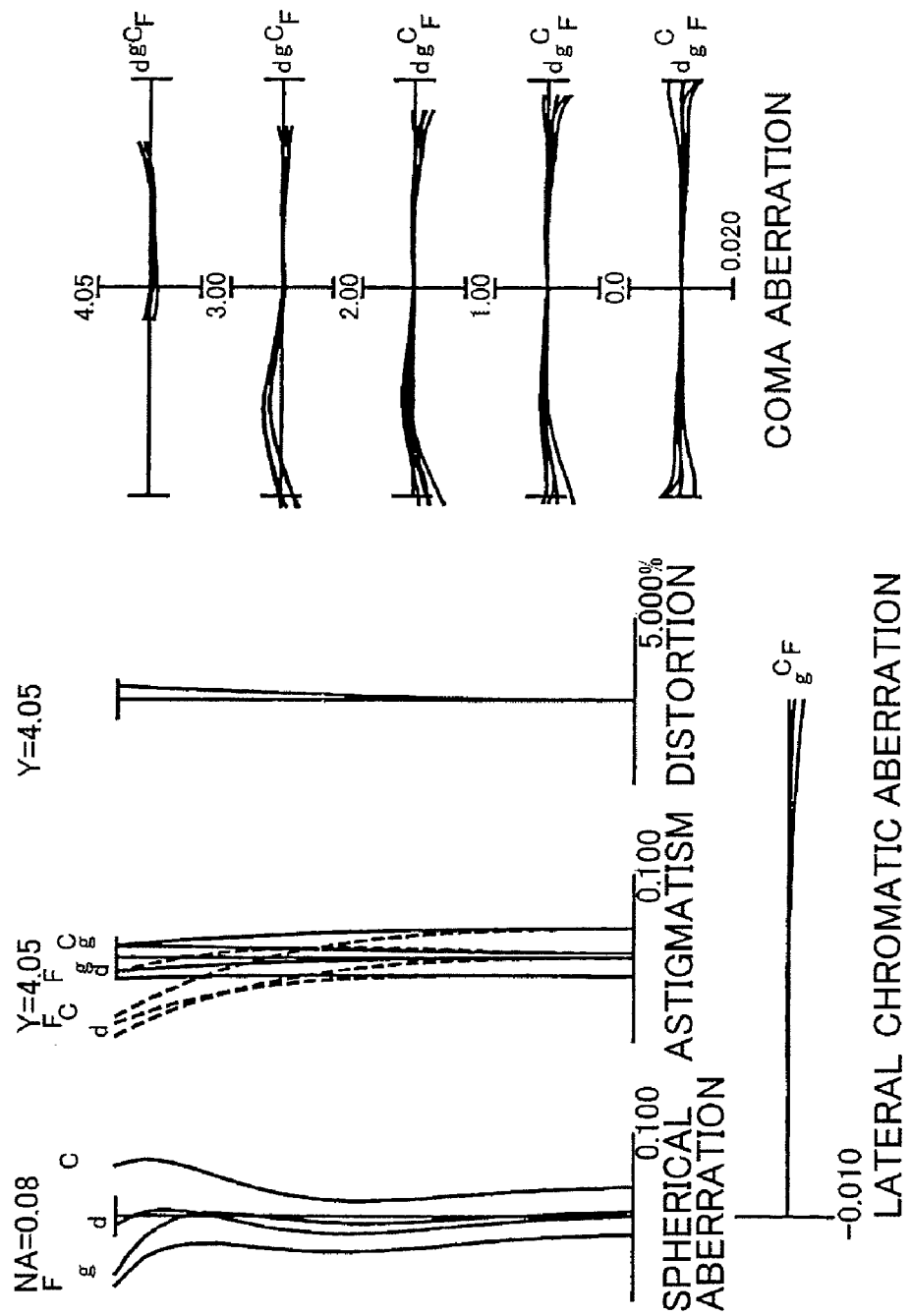
FIG. 16C is a case of a telephoto end state.

FIG. 15 are graphs showing various aberrations of the zoom lens in an infinite focusing state and the lateral aberrations in the vibration proof state according to the fifth example, where FIG. 15A is a case of the wide-angle end state (F=5.20 mm), FIG. 15B is a case of the intermediate focal length state (F=15.00 mm), and FIG. 15C is a case of the telephoto end state (F=35.00 mm). FIG. 16 are graphs showing various aberrations in a close distance focusing state and lateral aberrations in the vibration proof state according to the fifth example, where FIG. 16A is a case of the wide-angle end state (Rw=131 mm), FIG. 16B is a case of the intermediate focal length state (Rm=322 mm), and FIG. 16C is a case of the telephoto end state (Rt=689 mm).

As each aberration graph shows, in the zoom lens ZL according to the fifth example, various aberrations are well corrected both in the case of each focal length state from the wide-angle end to telephoto end in the infinite focusing state, and in the case of each focal length state from the wide-angle end to telephoto end in the close distance focusing state, and excellent image formation performance is implemented.

By equipping the zoom lens ZL of the fifth example, excellent optical performance can be insured for a digital single-lens reflex camera (optical apparatus, see FIG. 1).

Sixth Example

Figure 17:
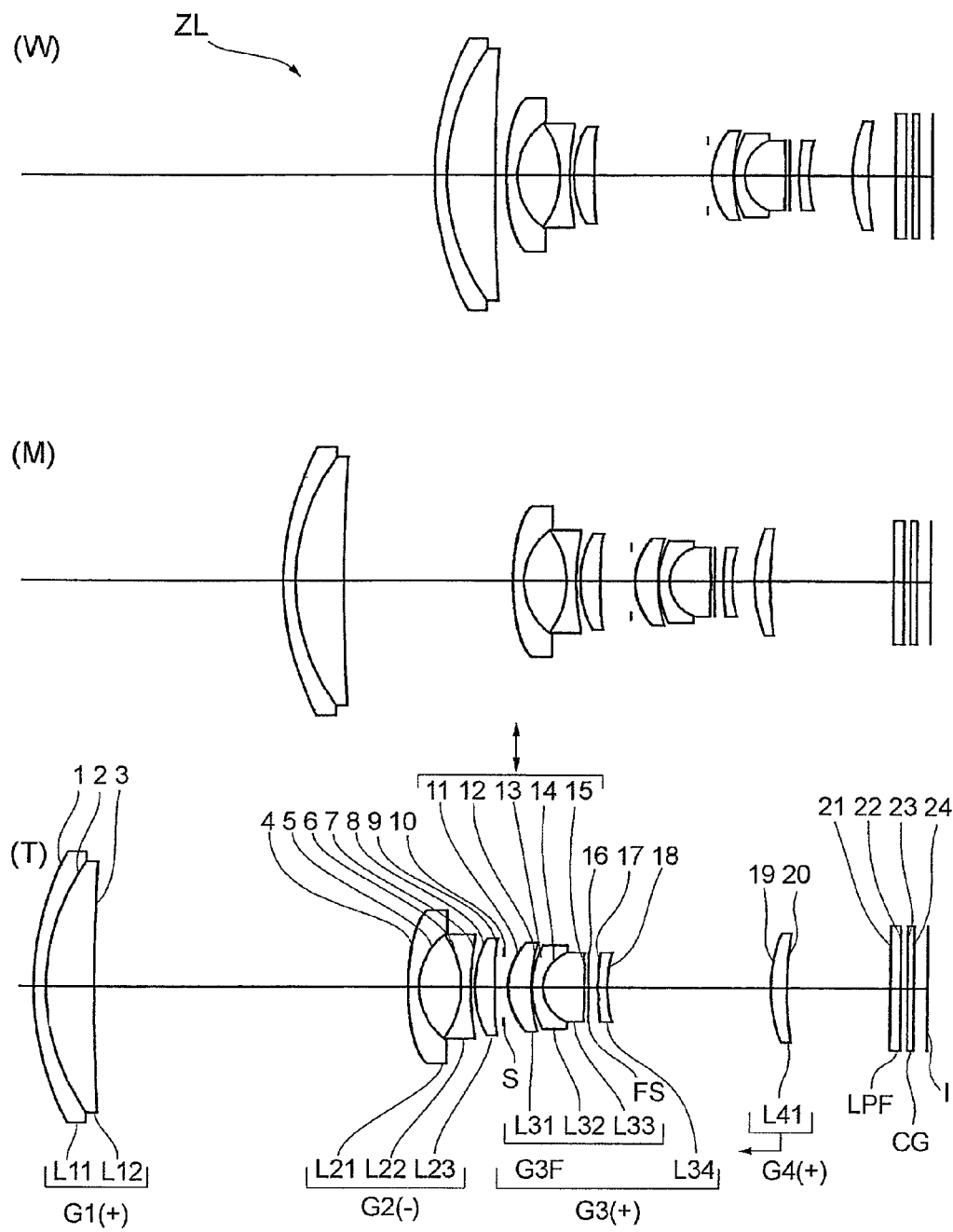
FIG. 17 are cross-sectional views depicting a configuration of a zoom lens according to a sixth example, where (W) shows a wide-angle end state in an infinity focusing state, (M) shows an intermediate focal length state in the infinity focusing state, and (T) is a telephoto end state in the infinity focusing state.

The sixth example will now be described with reference to FIG. 17 to FIG. 19, and Table 6. FIG. 17 shows the configuration of the zoom lens ZL according to the sixth example, where the change of focal length state from the wide-angle end state (W) and the telephoto end state (T) via the intermediate focal length state (M), that is, the movement of each lens group during zooming, is shown.

Table 6 shows each data of the sixth example. The surface numbers 1 to 24 in Table 6 correspond to the surfaces 1 to 24 in FIG. 17. In the sixth example, the object side lens surface of the negative meniscus lens L21, image side lens surface of the positive meniscus lens L23, object side lens surface of the positive meniscus lens L31, and image side lens surface of the biconvex lens L33, in other words, lens surfaces of the fourth surface, ninth surface, eleventh surface and fifteenth surface, are all formed to be an aspherical shape.

In the tables, d3 is an axial air distance between the first lens group G1 and the second lens group G2, d9 is an axial air distance between the second lens group G2 and the aperture stop S, d18 is an axial air distance between the third lens group G3 and the fourth lens group G4, and d20 is an axial air distance between the fourth lens group and the low pass filter LPF. These axial air distances d3, d9, d18 and d20 change during zooming.

TABLE 6

[All parameters]

|  | Wide-angle end | | intermediate focal length | | telephoto end |
| --- | --- | --- | --- | --- | --- |
| F | 5.20 | ~ | 15.00 | ~ | 35.00 |
| FNO | 2.9 | ~ | 4.2 | ~ | 5.8 |
| ω | −39.27 | ~ | −14.79 | ~ | −6.53 |

[Lens parameters]

| Surface Number | r | d | nd | νd |
| --- | --- | --- | --- | --- |
| 1 | 22.6580 | 0.9000 | 1.903660 | 31.31 |
| 2 | 16.7546 | 3.6000 | 1.603000 | 65.47 |
| 3 | 173.7135 | (d3 = variable) | | |
| 4* | 21.9913 | 0.8000 | 1.851350 | 40.10 |
| 5 | 5.0876 | 3.2000 | | |
| 6 | −6.8073 | 0.7000 | 1.755000 | 52.29 |
| 7 | 21.2947 | 0.3000 | | |
| 8 | 8.0515 | 1.5000 | 1.821140 | 24.06 |
| 9* | 209.2176 | (d9 = variable) | | |
| 10 | aperture stop S | 0.3000 | | |
| 11* | 4.8173 | 1.7000 | 1.743300 | 49.32 |
| 12 | 10.9922 | 0.1000 | | |
| 13 | 6.8149 | 0.8000 | 1.903660 | 31.31 |
| 14 | 2.8338 | 3.1000 | 1.592010 | 67.05 |
| 15* | −25.9491 | 0.3000 | | |
| 16 | Flare cut stop FS | 0.7000 | | |
| 17 | 18.7998 | 0.7000 | 1.883000 | 40.77 |
| 18 | 9.2180 | (d18 = variable) | | |
| 19 | 11.1802 | 1.2000 | 1.516800 | 64.12 |
| 20 | 28.5786 | (d20 = variable) | | |
| 21 | ∞ | 0.8000 | 1.516800 | 64.12 |
| 22 | ∞ | 0.5000 | | |
| 23 | ∞ | 0.5000 | 1.516800 | 64.12 |
| 24 | ∞ | (Bf) | | |

[Aspherical Data]

Fourth surface

K = 12.6108, A4 = 1.85220E−04, A6 = −2.26860E−06, A8 = 0.00000E−00, A10 = 0.00000E−00

Ninth surface

K = −100.0000, A4 = 7.77520E−04, A6 = 2.59180E−05, A8 = −2.13670E−06, A10 = 9.21200E−08

Eleventh surface

K = −0.2317, A4 = −9.45990E−05, A6 = 6.25740E−06, A8 = 0.00000E−00, A10 = 0.00000E−00

Fifteenth surface

K = −100.0000, A4 = 1.03610E−03, A6 = 6.26560E−05, A8 = 0.00000E−00, A10 = 0.00000E−00

[Variable distance during focusing]

|  | Infinite distance | | | Close distance | | |
| --- | --- | --- | --- | --- | --- | --- |
| F, β | 5.20000 | 15.00000 | 29.75200 | −0.05000 | −0.05000 | −0.05000 |
| D0 | ∞ | ∞ | ∞ | 93.4240 | 273.3649 | 621.7957 |
| d3 | 0.83822 | 12.69829 | 23.53397 | 0.83822 | 12.69829 | 23.53397 |
| d9 | 8.49164 | 2.26178 | 0.68535 | 8.49164 | 2.26178 | 0.68535 |
| d18 | 3.33154 | 1.73374 | 12.46170 | 2.50391 | 0.52898 | 9.55383 |
| d20 | 1.98878 | 9.21679 | 7.74807 | 2.81640 | 10.42155 | 10.65594 |
| Bf | 0.93390 | 0.93390 | 0.93390 | 0.93390 | 0.93390 | 0.93390 |
| TL | 37.28407 | 48.54449 | 67.06298 | 37.28407 | 48.54449 | 67.06298 |

[Zoom lens group data]

| Group No. | First surface of group | Focal length of group |
| --- | --- | --- |
| G1 | 1 | 52.51005 |
| G2 | 4 | −5.66394 |
| G3 | 11 | 8.03479 |
| G4 | 19 | 34.71946 |

TABLE 6-continued

[Conditional Expressions]

(1) f30/f34 = −0.379
(2) fG3F/(F34 × N3n) = −0.182
(3) (Fw × F30)/Ft² = 0.034
(4) d33/d30 = 0.419

As the data table in Table 6 shows, the zoom lens ZL according to the present example satisfies all the above conditions (1) to (4).

Figure 18A:
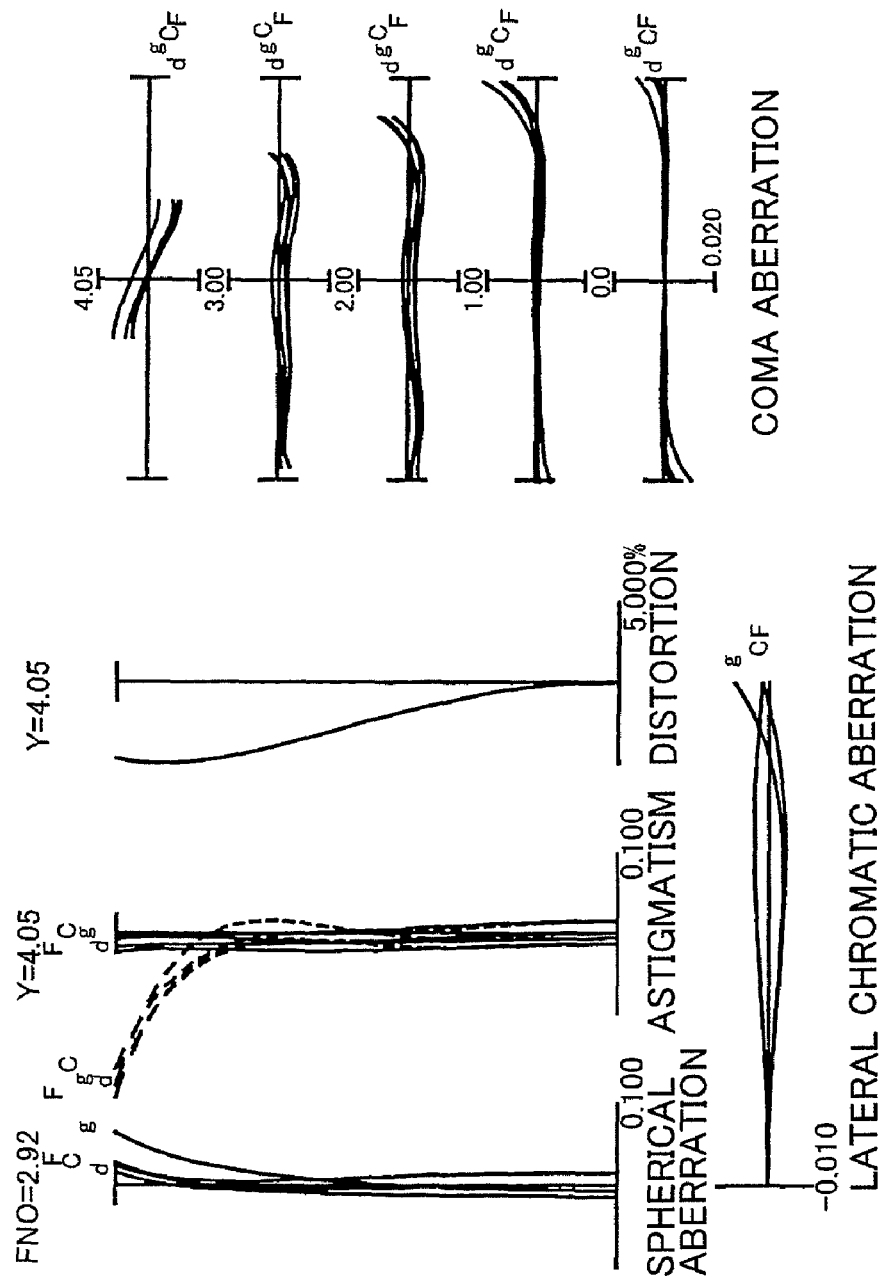
FIG. 18A is a case of a wide-angle end state.
Figure 18B:
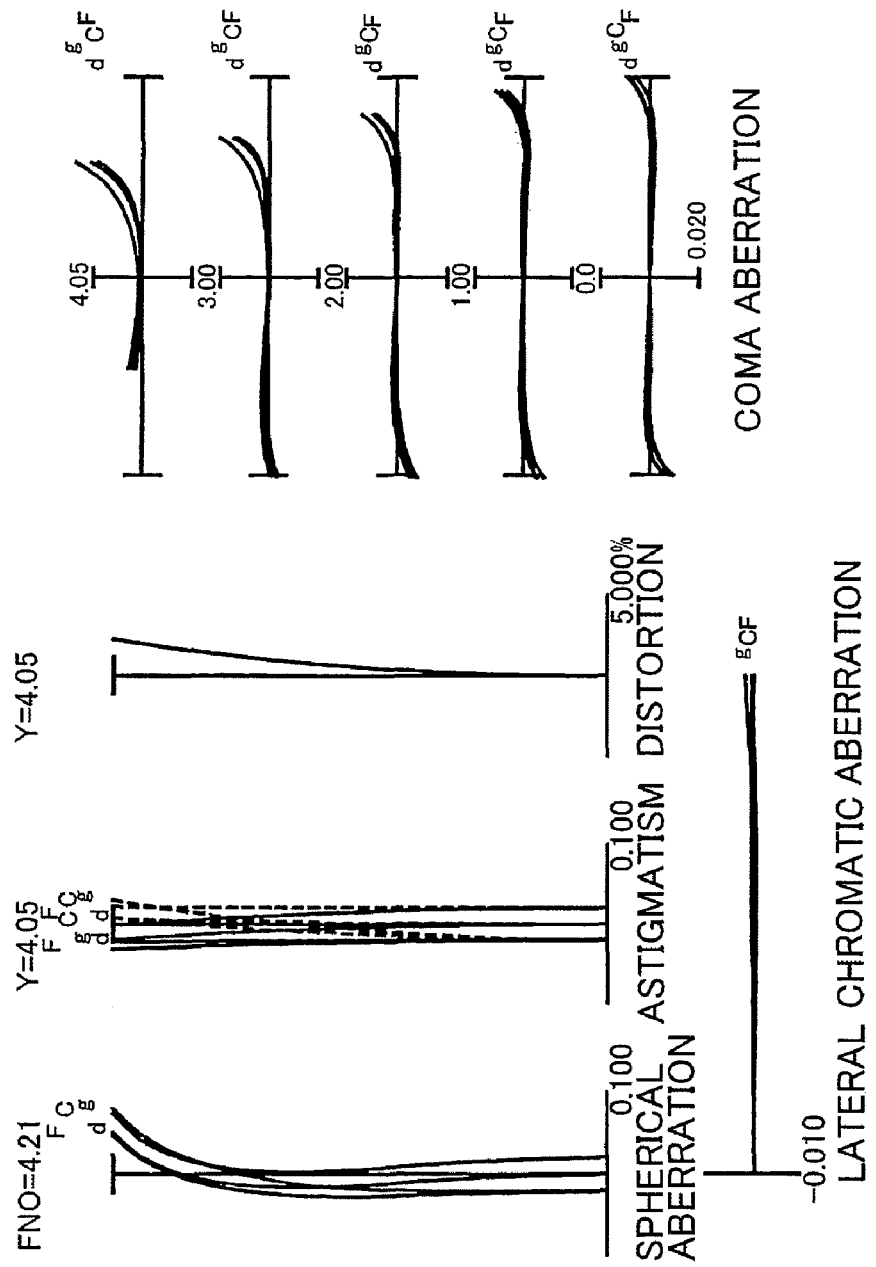
FIG. 18B is a case of an intermediate focal length state.
Figure 18C:
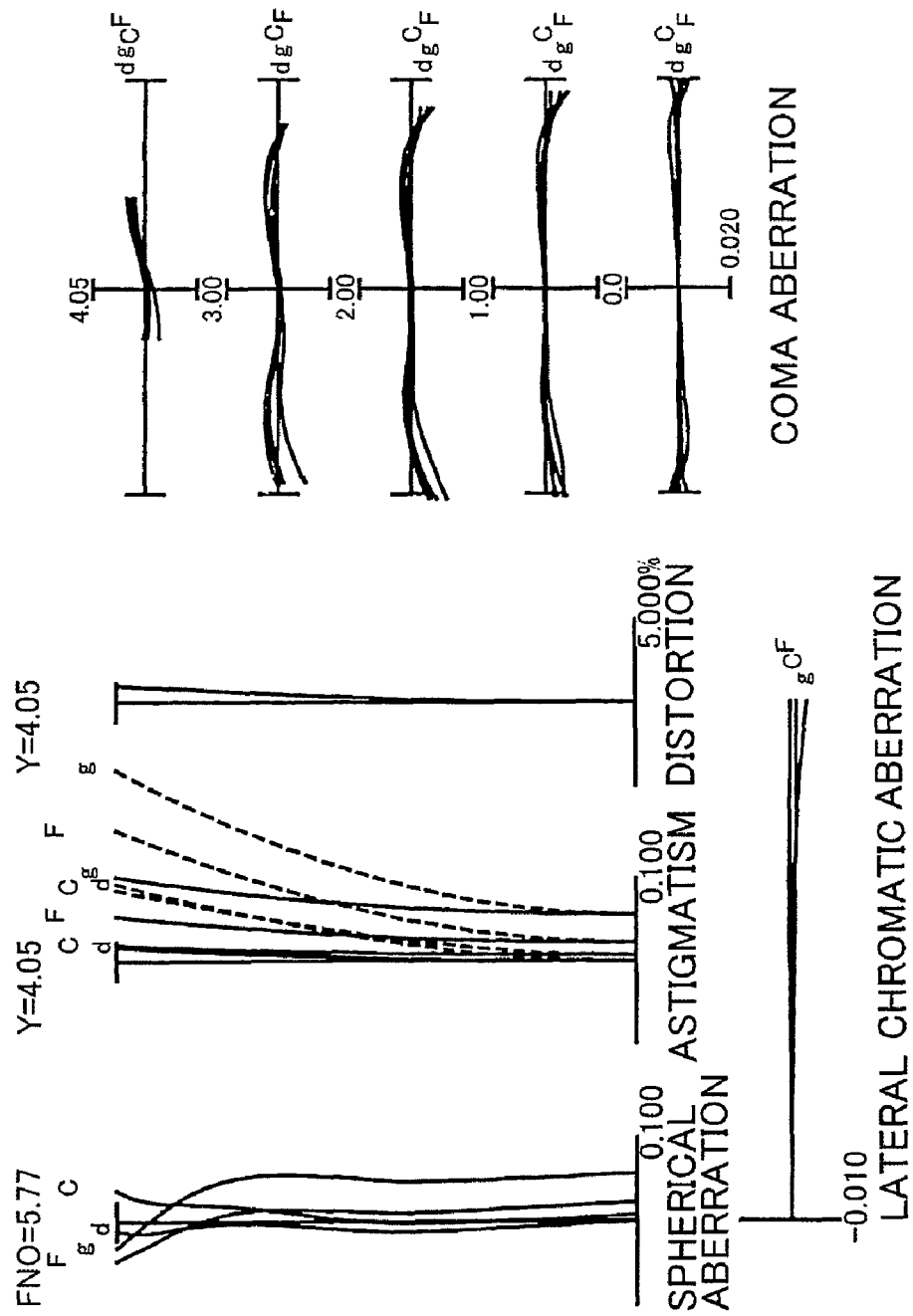
FIG. 18C is a case of a telephoto end state.
Figure 19A:
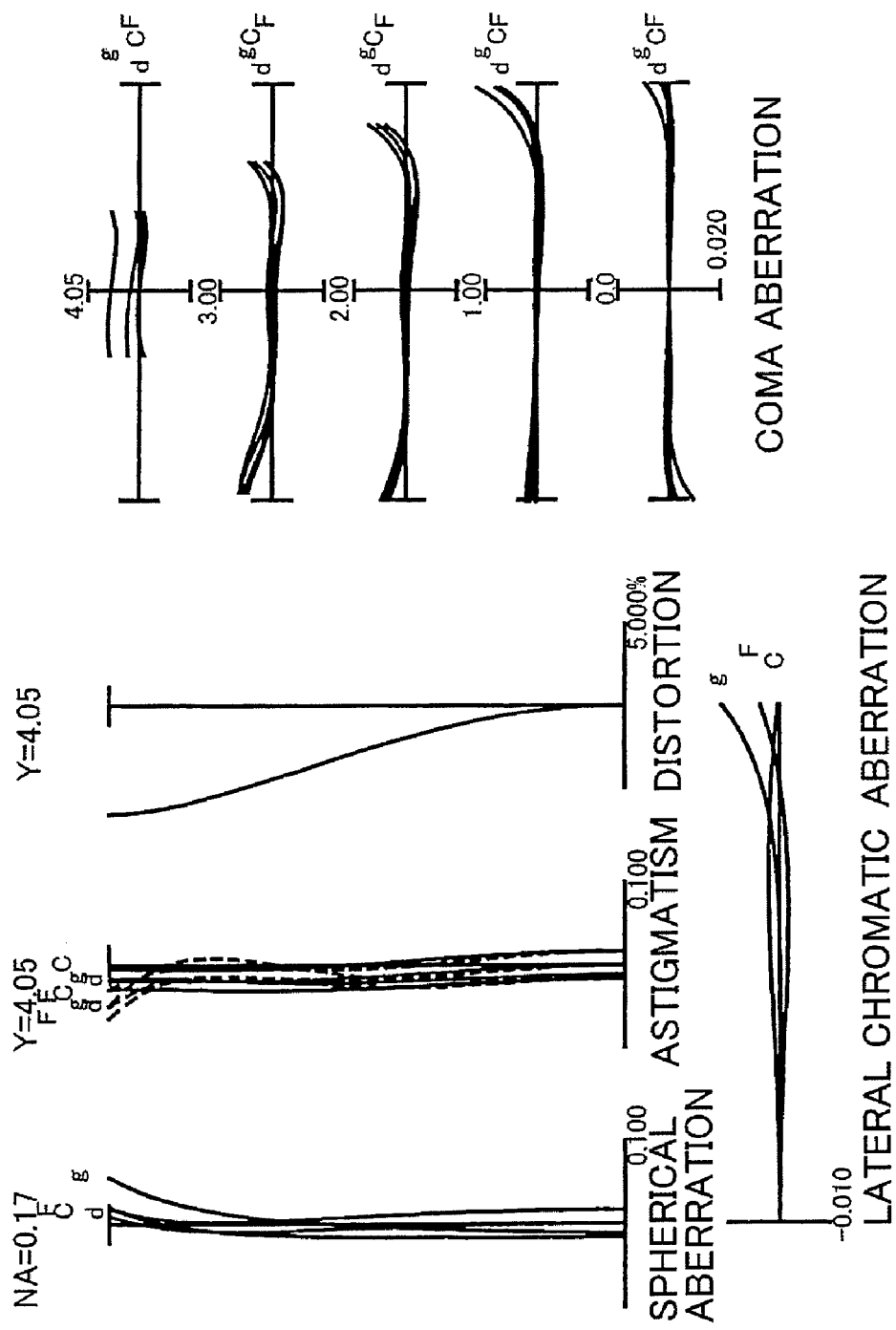
FIG. 19A is a case of a wide-angle end state.
Figure 19B:
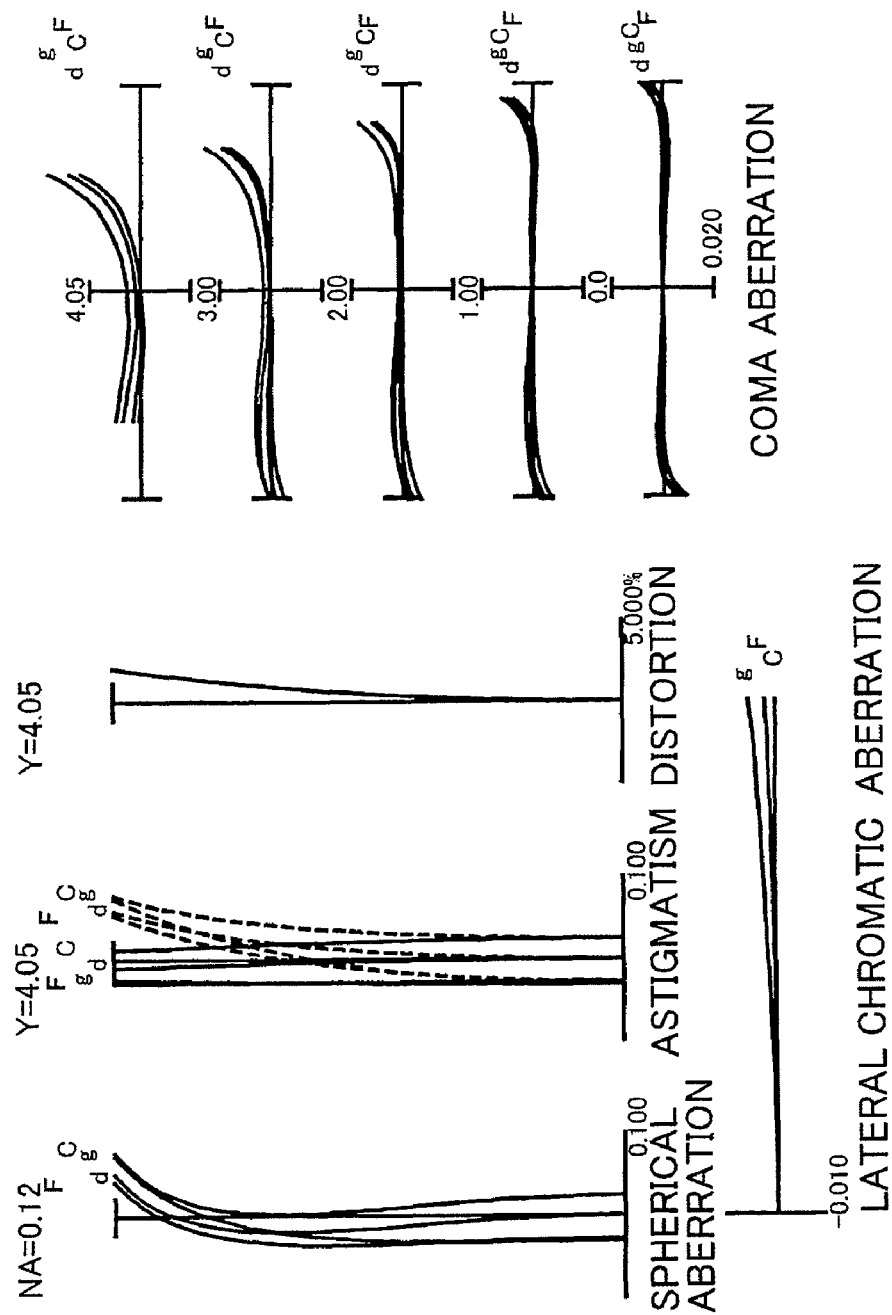
FIG. 19B is a case of an intermediate focal length state.
Figure 19C:
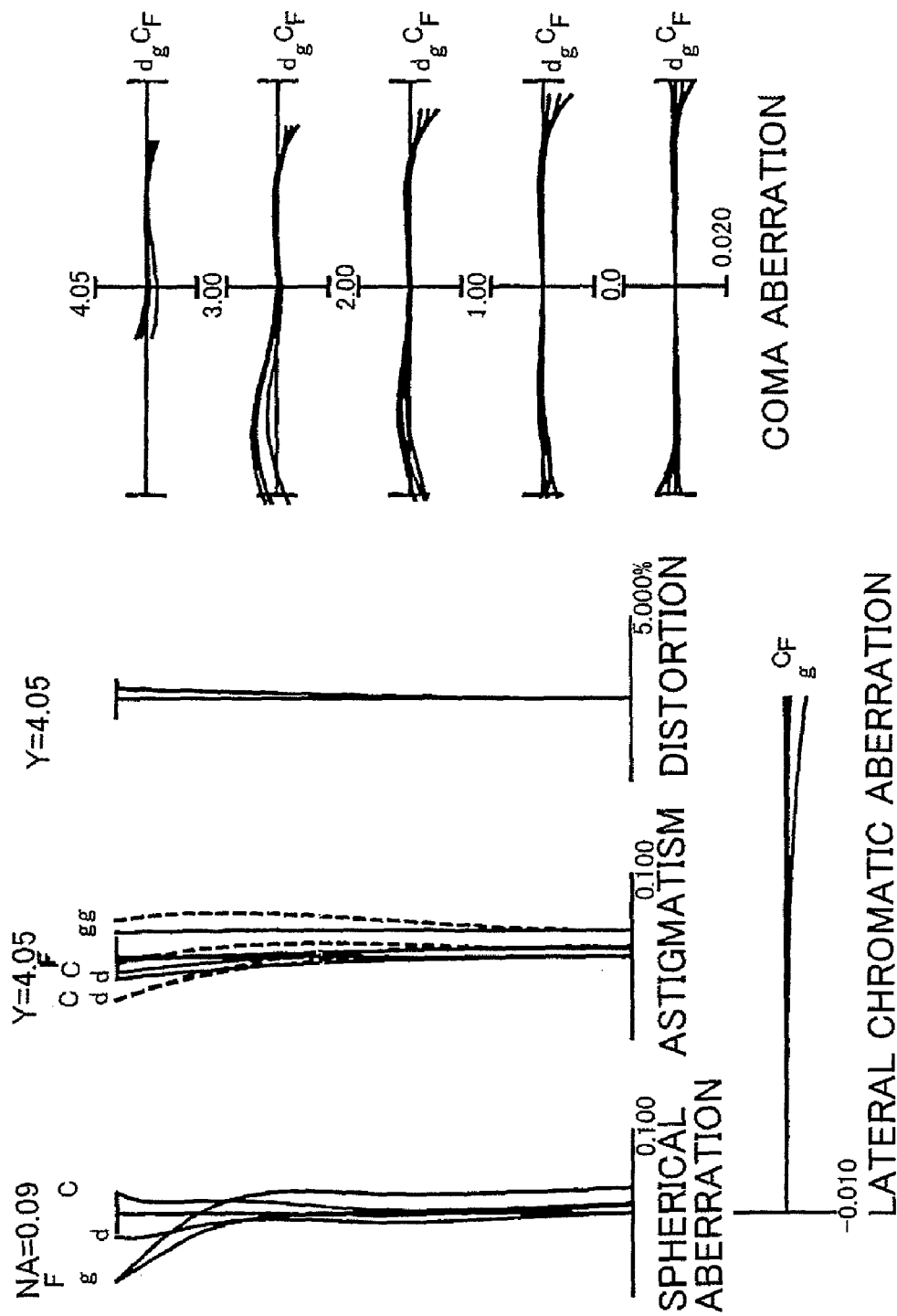
FIG. 19C is a case of a telephoto end state.

FIG. 18 are graphs showing various aberrations of the zoom lens in an infinite focusing state and the lateral aberrations in the vibration proof state according to the sixth example, where FIG. 18A is a case of the wide-angle end state (F=5.20 mm), FIG. 18B is a case of the intermediate focal length state (F=15.00 mm), and FIG. 18C is a case of the telephoto end state (F=35.00 mm). FIG. 19 are graphs showing various aberrations of the zoom lens in a close distance focusing state and lateral aberrations in the vibration proof state according to the sixth example, where FIG. 19A is a case of the wide-angle end state (Rw=131 mm), FIG. 19B is a case of the intermediate focal length state (Rm=322 mm), and FIG. 19C is a case of the telephoto end state (Rt=689 mm).

As each aberration graph shows, in the zoom lens ZL according to the sixth example, various aberrations are well corrected both in the case of each focal length state from the wide-angle end to telephoto end in the infinite focusing state, and in the case of each focal length state from the wide-angle end to telephoto end in the close distance focusing state, and excellent image formation performance is implemented.

By equipping the zoom lens ZL of the sixth example, excellent optical performance can be insured for a digital single-lens reflex camera (optical apparatus, see FIG. 1).

Second Group of Embodiments

The second group of embodiments will now be described. This group includes the later mentioned seventh to eleventh examples.

In the zoom lens ZL having the configuration described with reference to FIG. 1, it is preferable to satisfy the following expression (5)

$$-0.15 < F2/F1 < -0.05 \quad (5)$$

where F1 is a focal length of the first lens group G1, and F2 is a focal length of the second lens group G2.

The above conditional expression (5) specifies an appropriate ratio of the focal length F1 of the first lens group G1 and the focal length F2 of the second lens group G2. In this conditional expression (5), if the ratio is less than the lower limit value, the chromatic aberration at the telephoto end increases, which is not desirable. On the other hand, if the ratio is higher than the upper limit value in the conditional expression (5), the curvature of field in the wide-angle end state negatively increases, which is not desirable. Also the fluctuation of the spherical aberration due to power change increases, which is also not desirable. In order to make the effects of the present embodiment certain, it is preferable that the lower limit value of the conditional expression (5) is −0.14. Also to make the effects of the present embodiment certain, it is preferable that the upper limit value of the conditional expression (5) is −0.07.

In the zoom lens ZL, it is preferable to satisfy the following expression (6)

$$0.57 < F4/F1 < 1.30 \quad (6)$$

where F1 is a focal length of the first lens group G1, and F4 is a focal length of the fourth lens group G4.

The above conditional expression (6) specifies an appropriate ratio of the focal length F1 of the first lens group G1 and the focal length F4 of the fourth lens group G4. In this conditional expression (6), if the ratio is less than the lower limit value, the chromatic aberration at the telephoto end increases, which is not desirable. On the other hand, if the ratio is higher than the upper limit value in the conditional expression (6), the curvature of field in the wide-angle end state negatively increases, which is not desirable. Also in the fluctuation of the spherical aberration due to zooming (power change) increases, which is also not desirable. In order to make the effects of the present embodiment certain, it is preferable that the lower limit value of the conditional expression (6) is 0.60. Also to make the effects of the present embodiment certain, it is preferable that the upper limit value of the conditional expression (6) is 1.10.

In order to decrease the total thickness of the first lens group G1 so as to decrease the lens length in the wide-angle end state in the zoom lens ZL, it is preferable to increase the refractive index of glass to be used for the first lens group G1, and increase the radius of curvature of the lens surface. In order to enable good aberration correction, it is preferable to satisfy the following expression (7).

$$1.85 < i\, N11 < 2.30 \quad (7)$$

where N11 is a refractive index of the negative meniscus lens L11 of the first lens group G1.

The above conditional expression (7) specifies an appropriate range of the refractive index N11 of the negative meniscus lens L11 of the first lens group G1. In this conditional expression (7), if the range is less than the lower limit value, the aspherical aberration correction with keeping the total lens thickness thin becomes difficult in the first lens group G1, which is not desirable. On the other hand, if the range is higher than the upper limit value in the conditional expression (7), the chromatic aberration at the telephoto end increases, which is not desirable. In order to make the effects of the present embodiment certain, it is desirable that the lower limit value of the conditional expression (7) is 1.88. Also to make the effects of the present embodiment certain, it is preferable that the upper limit value of the conditional expression (7) is 2.15.

In the zoom lens ZL, in the positive lens L12 of the first lens group G1, it is preferable to satisfy the following expression (8)

$$-0.15 < R12F/R12I < 0.25 \quad (8)$$

where R12F is a radius of curvature of the object side lens surface, and R12I is a radius of curvature of the image side lens surface.

The above conditional expression (8) specifies an appropriate ratio of the radius of curvature R12F at the object side and the radius of curvature R12I at the image side of the lens surface constituting the positive lens L12 of the first lens group G1. In this conditional expression (8), if the ratio is less than the lower limit value, the curvature of field in the wide-angle end state increases toward the negative side, which is not desirable. On the other hand, if the ratio is higher than the upper limit value in the conditional expression (8), the chromatic aberration at the telephoto end increases, which is not desirable. In order to make the effects of the present embodiment certain, it is preferable that the lower limit value of the conditional expression (8) is −0.13. Also to make the effects of the present embodiment certain, it is preferable that the upper limit value of the conditional expression (8) is 0.23.

In the zoom lens ZL, in the positive lens L23 of the second lens group G2, it is preferable to satisfy the following expression (9)

$$-0.15 < R23F/R23I < 0.30 \quad (9)$$

where R23F is the radius of curvature of the object side lens surface, and R23I is the radius of curvature of the image side lens surface.

The above conditional expression (9) specifies an appropriate ratio of the radius of curvature R23F of the object side, and the radius of curvature R23I of the image side of the lens surface constituting the positive lens L23 of the second lens group G2. In this conditional expression (9), if the ratio is less than the lower limit value, the curvature of field in the wide-angle end state increases toward the negative side, which is not desirable. On the other hand, if the ratio is higher than the upper limit value in the conditional expression (9), the chromatic aberration difference at the telephoto end increases, which is not desirable. In order to make the effects of the present embodiment certain, it is preferable that the lower limit value of the conditional expression (9) is −0.14. Also to make the effects of the present embodiment certain, it is preferable that the upper limit value of the conditional expression (9) is 0.27.

Examples in the Second Group

Concrete examples of the second group of embodiments will now be described with reference to the accompanying drawings. The configuration of zoom lens ZL (lens system) according to each example is the same as the above mentioned first group of embodiments, and therefore description thereof is omitted.

Table 7 to Table 11 shown below are tables of respective data on the seventh to eleventh examples. In all the tables, values corresponding to the above conditional expression (5) to (9) are also shown.

Seventh Example

The seventh example will now be described with reference to FIG. 20 to FIG. 22, and Table 7. FIG. 20 shows the configuration of the zoom lens ZL according to the seventh example, wherein the change of the focal length state from the wide-angle end state (W) to the telephoto end state (T) via the intermediate focal length state (M), that is, the movement of each lens group during zooming, is shown.

Table 7 shows each data of the seventh example. The surface numbers 1 to 24 in Table 7 correspond to the surfaces 1 to 24 in FIG. 20. In the seventh example, the object side lens surface of the negative meniscus lens L21, image side lens surface of the positive meniscus lens L23, object side lens surface of the positive meniscus lens L31, and image side lens surface of the biconvex lens L33, in other words, the lens surface of the fourth surface, ninth surface, eleventh surface and fifteenth surface, are formed to be an aspherical shape.

In the tables, d3 is an axial air distance between the first lens group G1 and the second lens group G2, d9 is an axial air distance between the second lens group G2 and the aperture stop S, d18 is an axial air distance between the third lens group G3 and the fourth lens group G4, and d20 is an axial air distance between the fourth lens group G4 and the low pass filter LPF. These axial air distances d3, d9, d18 and d20 change during zooming.

TABLE 7

| [All parameters] | | | | | |
|---|---|---|---|---|---|
| | Wide-angle end | | intermediate focal length | | telephoto end |
| F | 5.20 | ~ | 15.00 | ~ | 29.75 |
| FNO | 3.0 | ~ | 4.4 | ~ | 5.7 |
| ω | −39.32 | ~ | −14.78 | ~ | −7.68 |

| [Lens parameters] | | | | |
|---|---|---|---|---|
| Surface Number | r | d | nd | νd |
| 1 | 21.3725 | 0.8000 | 1.903660 | 31.31 |
| 2 | 15.7730 | 3.4000 | 1.603000 | 65.47 |
| 3 | 159.6044 | (d3 = variable) | | |
| 4* | 20.6225 | 0.7000 | 1.851350 | 40.10 |
| 5 | 4.8000 | 3.0000 | | |
| 6 | −6.8565 | 0.6000 | 1.755000 | 52.29 |
| 7 | 17.0023 | 0.3000 | | |
| 8 | 7.3490 | 1.4000 | 1.821140 | 24.06 |
| 9* | 154.8042 | (d9 = variable) | | |
| 10 | aperture stop S | 0.3000 | | |
| 11* | 4.6153 | 1.5000 | 1.768020 | 49.23 |
| 12 | 11.0713 | 0.1000 | | |
| 13 | 7.2985 | 0.8000 | 1.903660 | 31.31 |
| 14 | 2.8000 | 2.9000 | 1.592010 | 67.05 |
| 15* | −20.7158 | 0.3000 | | |
| 16 | Flare cut stop FS | 0.7000 | | |
| 17 | 17.5815 | 0.6000 | 1.883000 | 40.77 |
| 18 | 8.7426 | (d18 = variable) | | |
| 19 | 11.0019 | 1.1000 | 1.516800 | 64.12 |

TABLE 7-continued

| | | | | | |
|---|---|---|---|---|---|
| 20 | 24.7103 | (d20 = variable) | | | |
| 21 | ∞ | 0.8000 | | 1.516800 | 64.12 |
| 22 | ∞ | 0.5000 | | | |
| 23 | ∞ | 0.5000 | | 1.516800 | 64.12 |
| 24 | ∞ | (Bf) | | | |

[Aspherical Data]

Fourth surface

K = 11.8959, A4 = 2.18410E−04, A6 = −2.69740E−06, A8 = 0.00000E+00,
A10 = 0.00000E+00

Ninth surface

K = −100.0000, A4 = 9.20510E−04, A6 = 4.77340E−05, A8 = −4.83050E−06,
A10 = 2.35060E−07

Eleventh surface

K = −0.4635, A4 = 1.74700E−04, A6 = 2.29920E−05, A8 = 0.00000E+00,
A10 = 0.00000E+00

Fifteenth surface

K = −100.0000, A4 = 5.55600E−04, A6 = 1.64610E−04, A8 = 0.00000E+00,
A10 = 0.00000E+00

| | Infinite distance | | | Close distance | | |
|---|---|---|---|---|---|---|
| [Variable distance during focusing] | | | | | | |
| F, β | 5.20000 | 15.00000 | 29.75200 | −0.05000 | −0.05000 | −0.05000 |
| D0 | ∞ | ∞ | ∞ | 94.3045 | 274.9835 | 540.9729 |
| d3 | 0.78498 | 12.19483 | 20.65553 | 0.78498 | 12.19483 | 20.65553 |
| d9 | 7.95930 | 2.23455 | 0.85391 | 7.95930 | 2.23455 | 0.85391 |
| d18 | 3.07965 | 1.73668 | 8.77541 | 2.24637 | 0.47870 | 6.36698 |
| d20 | 2.91543 | 9.94349 | 9.98482 | 3.74870 | 11.20147 | 12.39325 |
| Bf | 0.40631 | 0.40631 | 0.40631 | 0.40631 | 0.40631 | 0.40631 |
| TL | 35.44566 | 46.81584 | 60.97596 | 35.44566 | 46.81583 | 60.97596 |
| [Vibration proof lens group moving amount and image surface moving amount during vibration proof correction] | | | | | | |
| F, β | 5.20000 | 15.00000 | 29.75200 | −0.05000 | −0.05000 | −0.05000 |
| Lens | ±0.055 | ±0.065 | ±0.071 | ±0.055 | ±0.064 | ±0.070 |
| Image Surface | ±0.110 | ±0.186 | ±0.262 | ±0.110 | ±0.186 | ±0.262 |

[Zoom lens group data]

| Group No. | First surface of group | Focal length of group |
|---|---|---|
| G1 | 1 | 49.90959 |
| G2 | 4 | −5.45518 |
| G3 | 11 | 7.80739 |
| G4 | 19 | 37.35259 |

[Conditional Expressions]

(5) F2/F1 = −0.109
(6) F4/F1 = 0.748
(7) N11 = 1.904
(8) R12F/R12R = 0.099
(9) R23F/R23R = 0.047

As the data table in FIG. 7 shows, the zoom lens ZL according to the present example satisfies all the above expression (5) to (9).

Figure 21A:
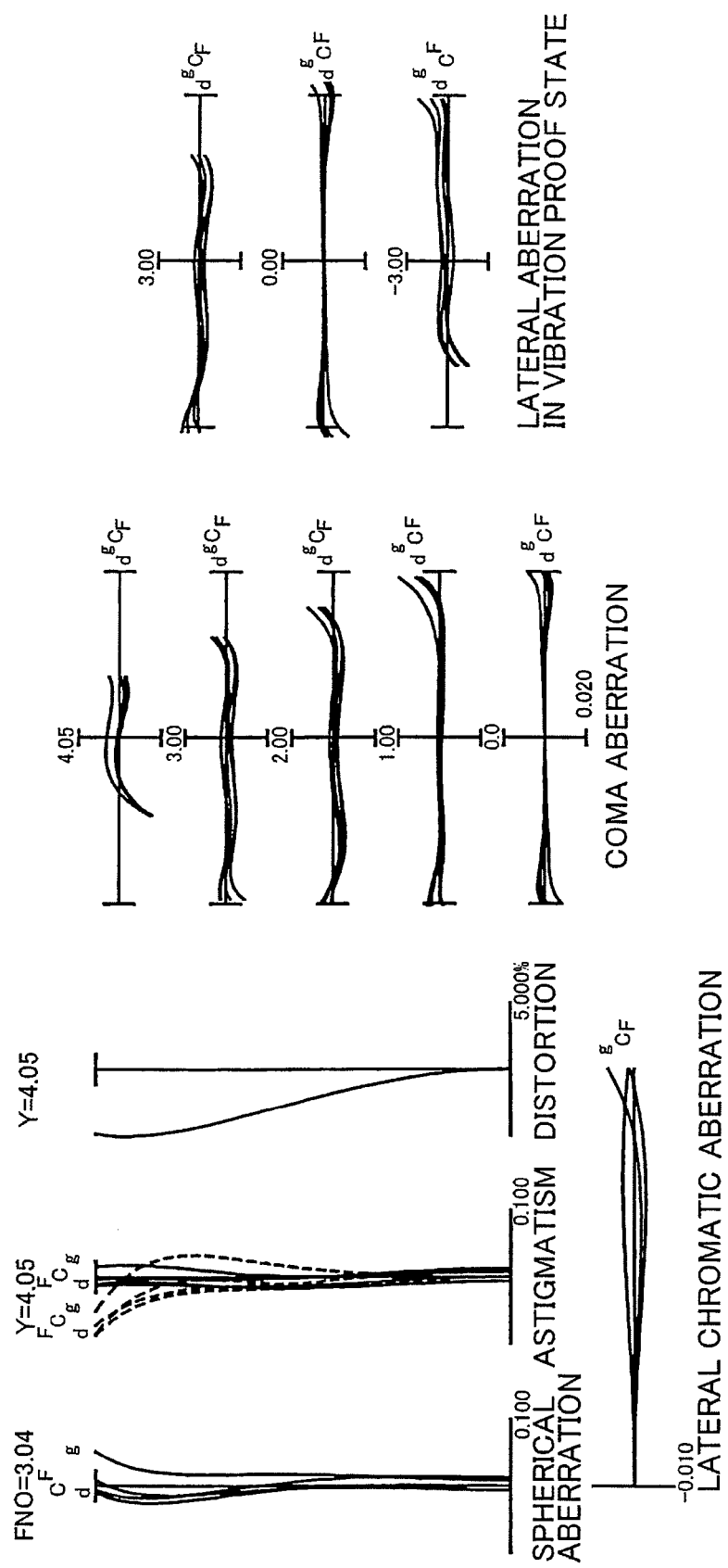
FIG. 21A is a case of a wide-angle end state.
Figure 21B:
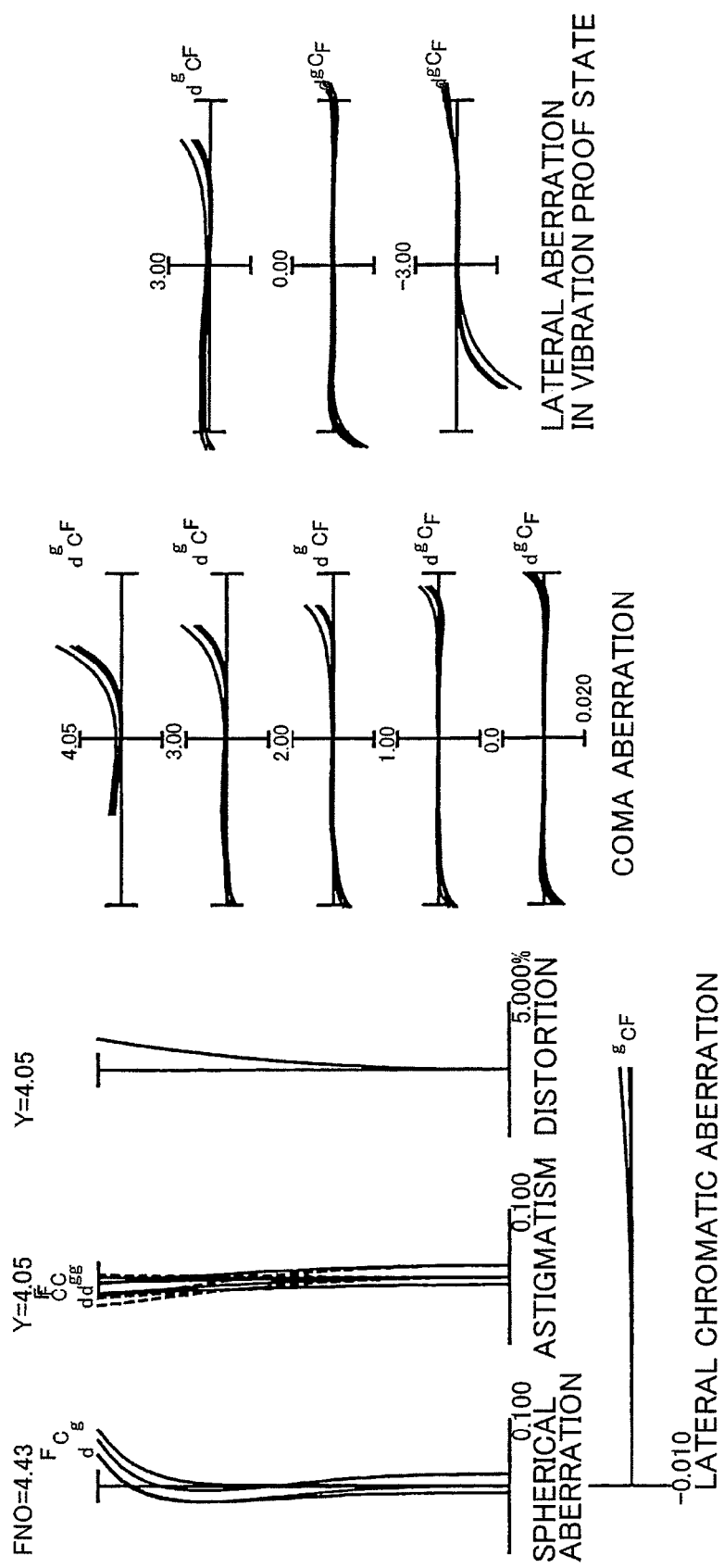
FIG. 21B is a case of an intermediate focal length state.
Figure 21C:
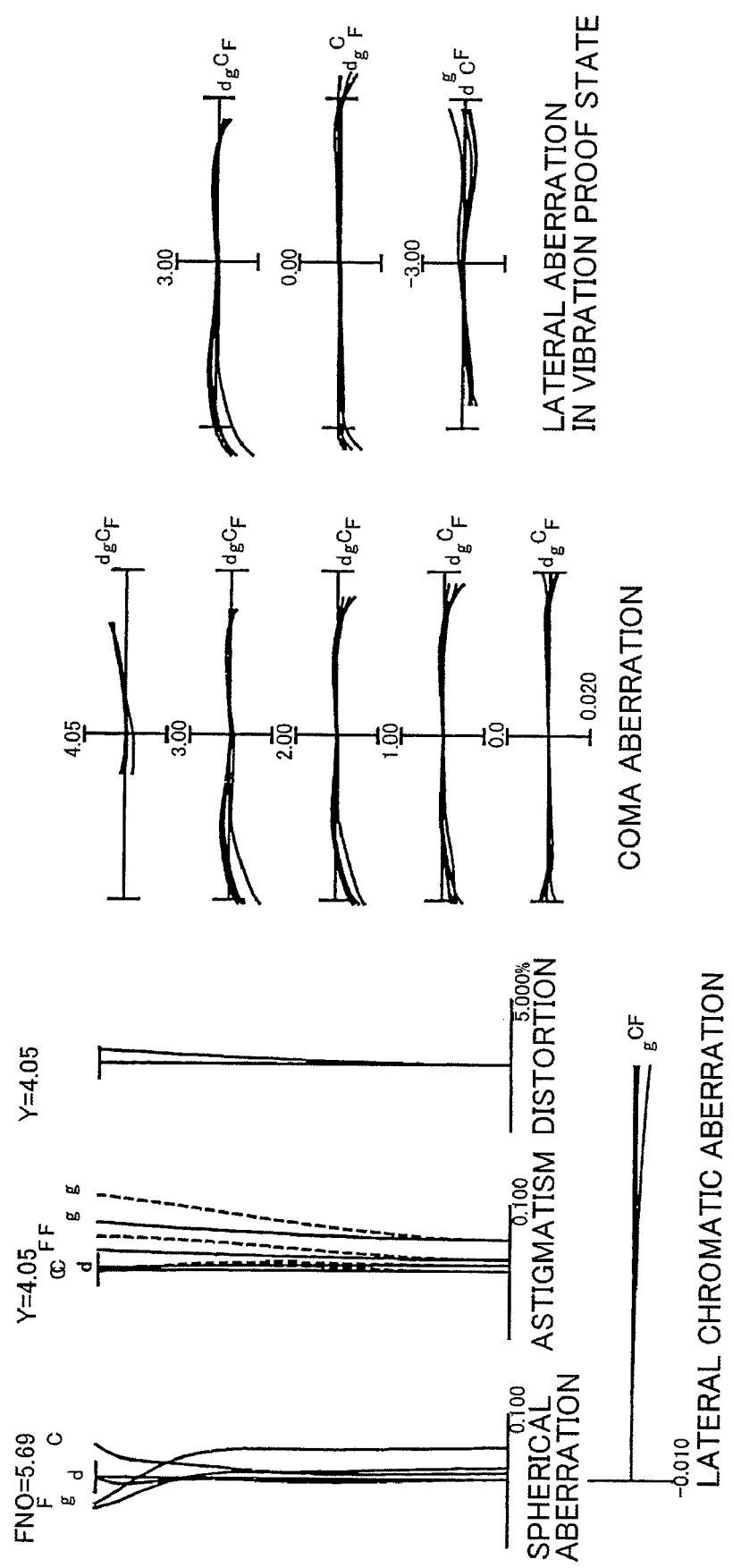
FIG. 21C is a case of a telephoto end state.
Figure 22A:
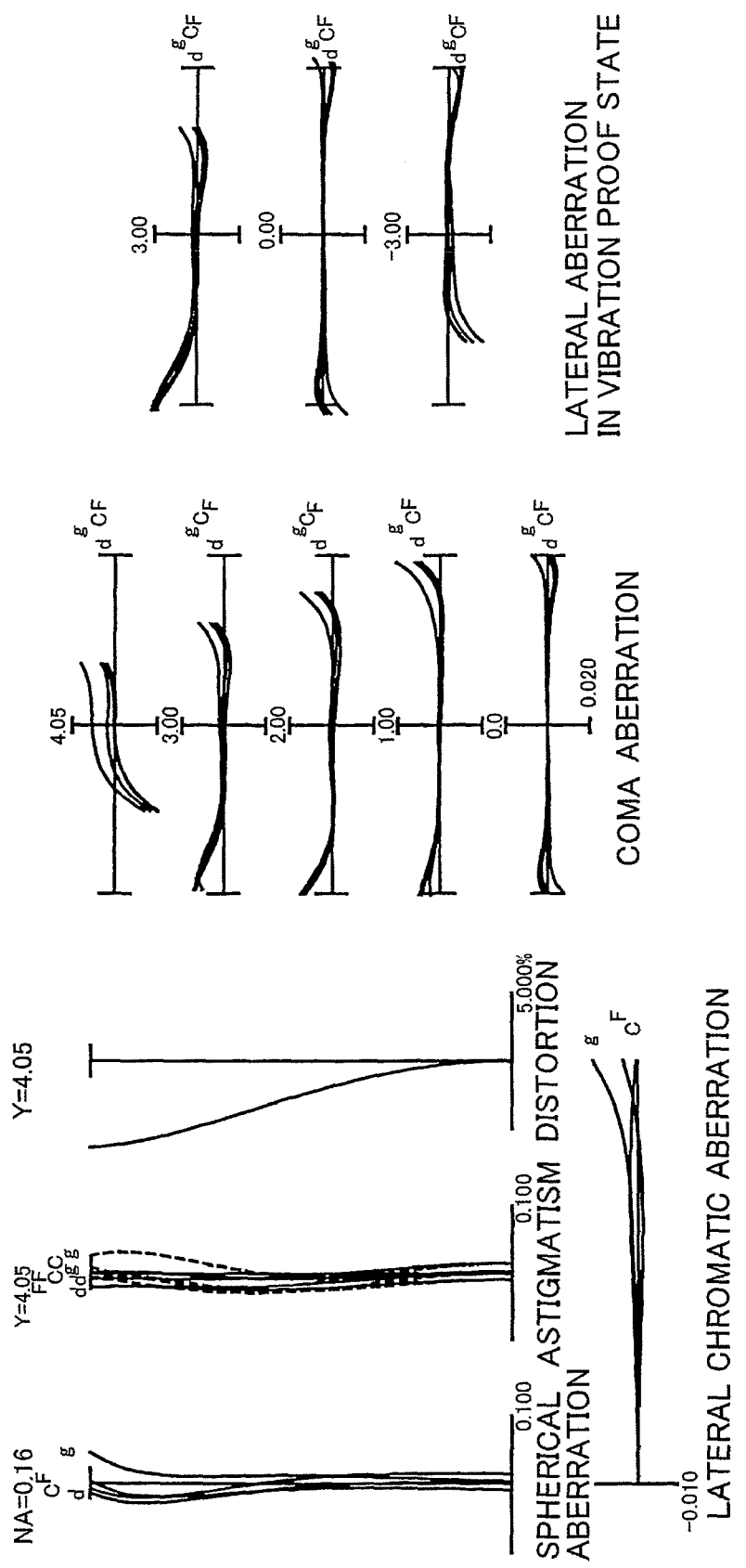
FIG. 22A is a case of a wide-angle end state.
Figure 22B:
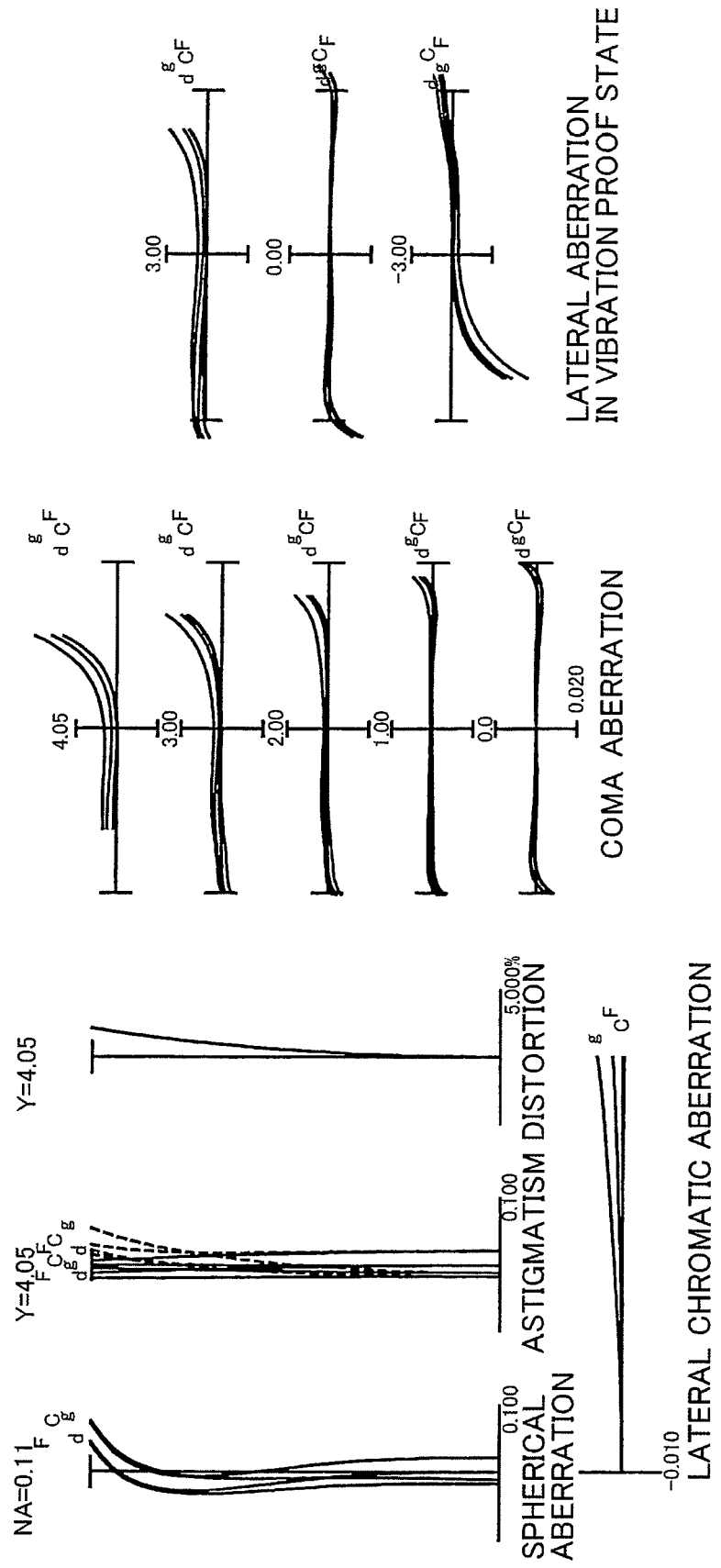
FIG. 22B is a case of an intermediate focal length state.
Figure 22C:
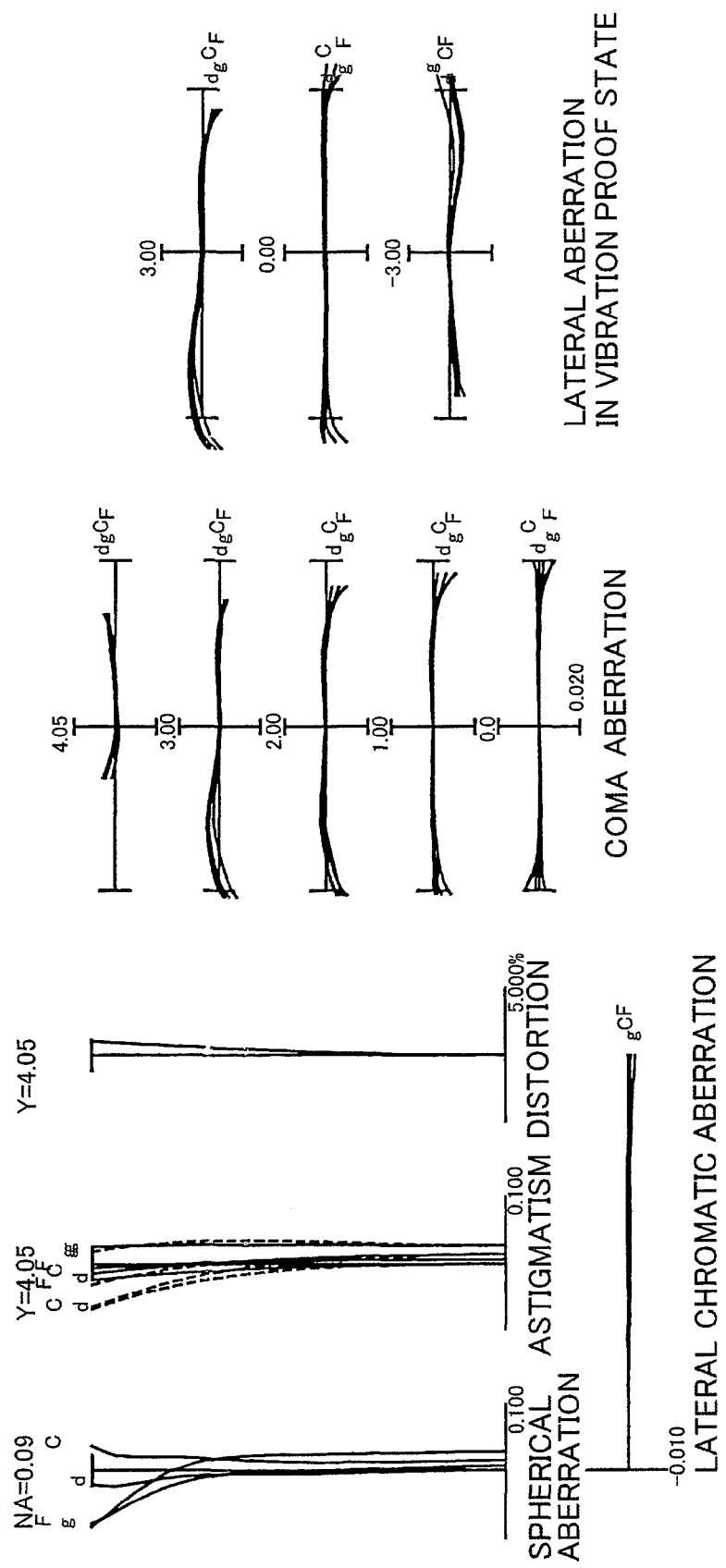
FIG. 22C is a case of a telephoto end state.

FIG. 21 shows graphs showing various aberrations of the zoom lens in an infinite focusing state and lateral aberrations in the vibration proof state according to the seventh example, where FIG. 21A is a case of the wide-angle end state (F=5.20 mm), FIG. 21B is a case of the intermediate focal length state (F=15.00 mm), and FIG. 21C is a case of the telephoto end state (F=29.75 mm). FIG. 22 are graphs showing various aberrations of the zoom lens in a close distance focusing state and lateral aberrations in the vibration proof state according to the seventh example, where FIG. 22A is a case of the wide-angle end state (Rw=130 mm), FIG. 22B is a case of the intermediate focal length state (Rm=322 mm), and FIG. 22C is a case of the telephoto end state (Rt=602 mm).

In each aberration graph, FNO is an F number, Y is an image height, D is a d-line (wavelength: 587.6 nm), G is a g-line (wavelength: 435.6 nm), C is a C-line (wavelength: 656.3 nm), and F is an F-line (wavelength: 486.1 nm). In the aberration graphs to indicate astigmatism, the solid line indicates a sagittal image surface, and a broken line indicates a meridional image surface. In the aberration graph to indicate the lateral chromatic aberration, data is shown based on the d-line. The above description of the aberration graphs is the same for other examples, therefore the description thereof is omitted.

As each aberration graph shows, in the zoom lens ZL according to the seventh example, various aberrations are well corrected both in the case of each focal length state from the wide-angle end to telephoto end in the infinite focusing state, and in the case of each focal length state from the wide-angle end to telephoto end in the close distance focusing state, and excellent image formation performance is implemented.

By equipping the zoom lens ZL of the seventh example, excellent optical performance can be insured for a digital single-lens reflex camera (optical apparatus, see FIG. 1).

Eighth Example

Figure 23:
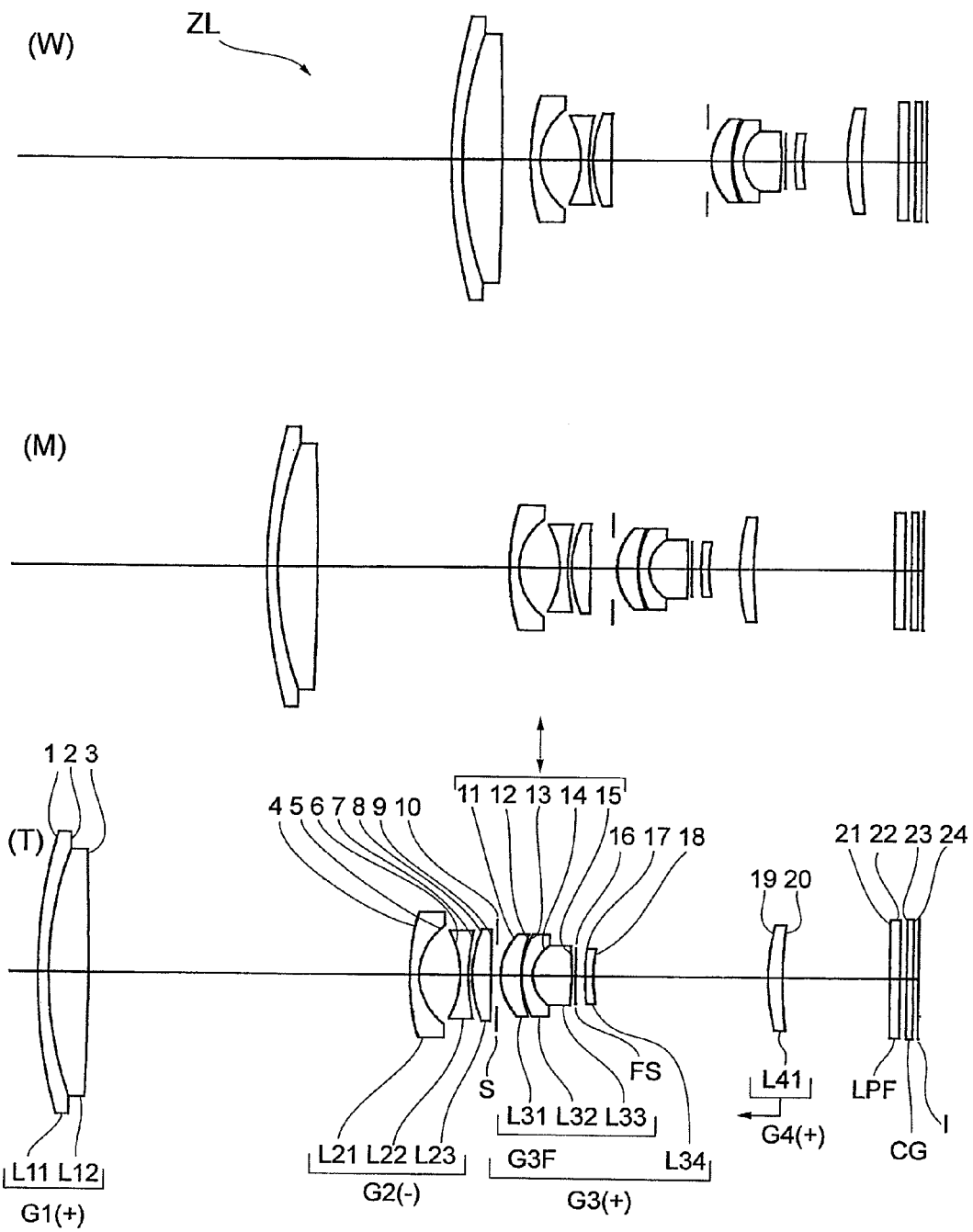
FIG. 23 are cross-sectional views depicting a configuration of a zoom lens according to a eighth example, where (W) shows a wide-angle end state in an infinity focusing state, (M) shows an intermediate focal length state in the infinity focusing state, and (T) is a telephoto end state in the infinity focusing state.

The eighth example will now be described with reference to FIG. 23 to FIG. 25, and Table 8. FIG. 23 shows the configuration of the zoom lens ZL according to the eighth example, wherein the change of the focal length state from the wide-angle end state (W) to the telephoto end state (T) via the intermediate focal length state (M), that is, the movement of each lens group during zooming, is shown.

Table 8 shows each data of the eighth example. The surface numbers 1 to 24 in Table 8 correspond to the surfaces 1 to 24 in FIG. 23. In the eighth example, the object side lens surface of the negative meniscus lens L21, image side lens surface of the positive meniscus lens L23, object side lens surface of the positive meniscus lens L31, and image side lens surface of the biconvex lens L33, in other words, the lens surfaces of the fourth surface, ninth surface, eleventh surface and fifteenth surface are all formed to be an aspherical shape.

In the tables, d3 is an axial air distance between the first lens group G1 and the second lens group G2, d9 is an axial air distance between the second lens group G2 and the aperture stop S, d18 is an axial air distance between the third lens group G3 and the fourth lens group G4, and d20 is an axial air distance between the fourth lens group and the low pass filter LPF. These axial air distances d3, d9, d18 and d20 change during zooming.

TABLE 8

[All parameters]

| | Wide-angle end | | intermediate focal length | | telephoto end |
|---|---|---|---|---|---|
| F | 5.20 | ~ | 15.00 | ~ | 29.75 |
| FNO | 3.0 | ~ | 4.4 | ~ | 5.7 |
| ω | −39.32 | ~ | −14.53 | ~ | −7.50 |

[Lens parameters]

| Surface Number | r | d | nd | vd |
|---|---|---|---|---|
| 1 | 40.6412 | 0.8000 | 2.000690 | 25.46 |
| 2 | 28.2157 | 3.0000 | 1.696800 | 55.52 |
| 3 | −248.3988 | (d3 = variable) | | |
| 4* | 20.3283 | 0.7000 | 1.851350 | 40.10 |
| 5 | 4.7773 | 3.0000 | | |
| 06 | −7.1182 | 0.6000 | 1.755000 | 52.29 |
| 07 | 15.3756 | 0.3000 | | |
| 08 | 8.7760 | 1.4000 | 1.821140 | 24.06 |
| 9* | −67.1622 | (d9 = variable) | | |
| 10 | aperture stop S | 0.3000 | | |
| 11* | 4.3306 | 1.5000 | 1.768020 | 49.23 |
| 12 | 8.1228 | 0.1000 | | |
| 13 | 6.7870 | 0.8000 | 1.903660 | 31.31 |
| 14 | 2.6931 | 2.9000 | 1.592010 | 67.05 |
| 15* | −17.9542 | 0.3000 | | |
| 16 | Flare cut stop FS | 0.7000 | | |
| 17 | 18.1191 | 0.6000 | 1.883000 | 40.77 |
| 18 | 10.8949 | (d18 = variable) | | |
| 19 | 15.5342 | 1.1000 | 1.516800 | 64.12 |
| 20 | 31.5412 | (d20 = variable) | | |
| 21 | ∞ | 0.8000 | 1.516800 | 64.12 |
| 22 | ∞ | 0.5000 | | |
| 23 | ∞ | 0.5000 | 1.516800 | 64.12 |
| 24 | ∞ | (Bf) | | |

[Aspherical Data]

Fourth surface

K = 8.7918, A4 = 8.15820E−05, A6 = −2.43020E−06, A8 = 0.00000E+00, A10 = 0.00000E+00

Ninth surface

K = −100.0000, A4 = 4.68610E−04, A6 = 2.25190E−05, A8 = −1.70990E−06, A10 = 9.88520E−08

Eleventh surface

K = −0.1603, A4 = −2.51830E−04, A6 = 4.91790E−06, A8 = 0.00000E+00, A10 = 0.00000E+00

TABLE 8-continued

Fifteenth surface

K = −49.4719, A4 = 7.76570E−04, A6 = 1.28900E−04, A8 = 0.00000E+00,
A10 = 0.00000E+00

[Variable distance during focusing]

| | Infinite distance | | | Close distance | | |
|---|---|---|---|---|---|---|
| F, β | 5.20000 | 15.00000 | 29.75200 | −0.05000 | −0.05000 | −0.05000 |
| D0 | ∞ | ∞ | ∞ | 94.7476 | 274.2695 | 534.7786 |
| d3 | 2.13790 | 14.42833 | 24.00163 | 2.13790 | 14.42833 | 24.00163 |
| d9 | 7.18427 | 1.67597 | 0.43506 | 7.18427 | 1.67597 | 0.43506 |
| d18 | 3.36244 | 2.29010 | 13.14988 | 2.14708 | 0.59515 | 9.45961 |
| d20 | 2.79157 | 10.64603 | 8.11865 | 4.00693 | 12.34099 | 11.80892 |
| Bf | 0.40633 | 0.40633 | 0.40633 | 0.40633 | 0.40633 | 0.40633 |
| TL | 35.78251 | 49.34677 | 66.01157 | 35.78251 | 49.34677 | 66.01157 |

[Zoom lens group data]

| Group No. | First surface of group | Focal length of group |
|---|---|---|
| G1 | 1 | 60.00000 |
| G2 | 4 | −5.45518 |
| G3 | 11 | 7.64811 |
| G4 | 19 | 57.87425 |

[Conditional Expressions]

(5) F2/F1 = −0.091
(6) F4/F1 = 0.965
(7) N11 = 2.001
(8) R12F/R12R = −0.114
(9) R23F/R23R = −0.131

As the data table in FIG. 8 shows, the zoom lens ZL according to the present embodiment satisfies all the above conditional expressions (5) to (9).

Figure 24A:
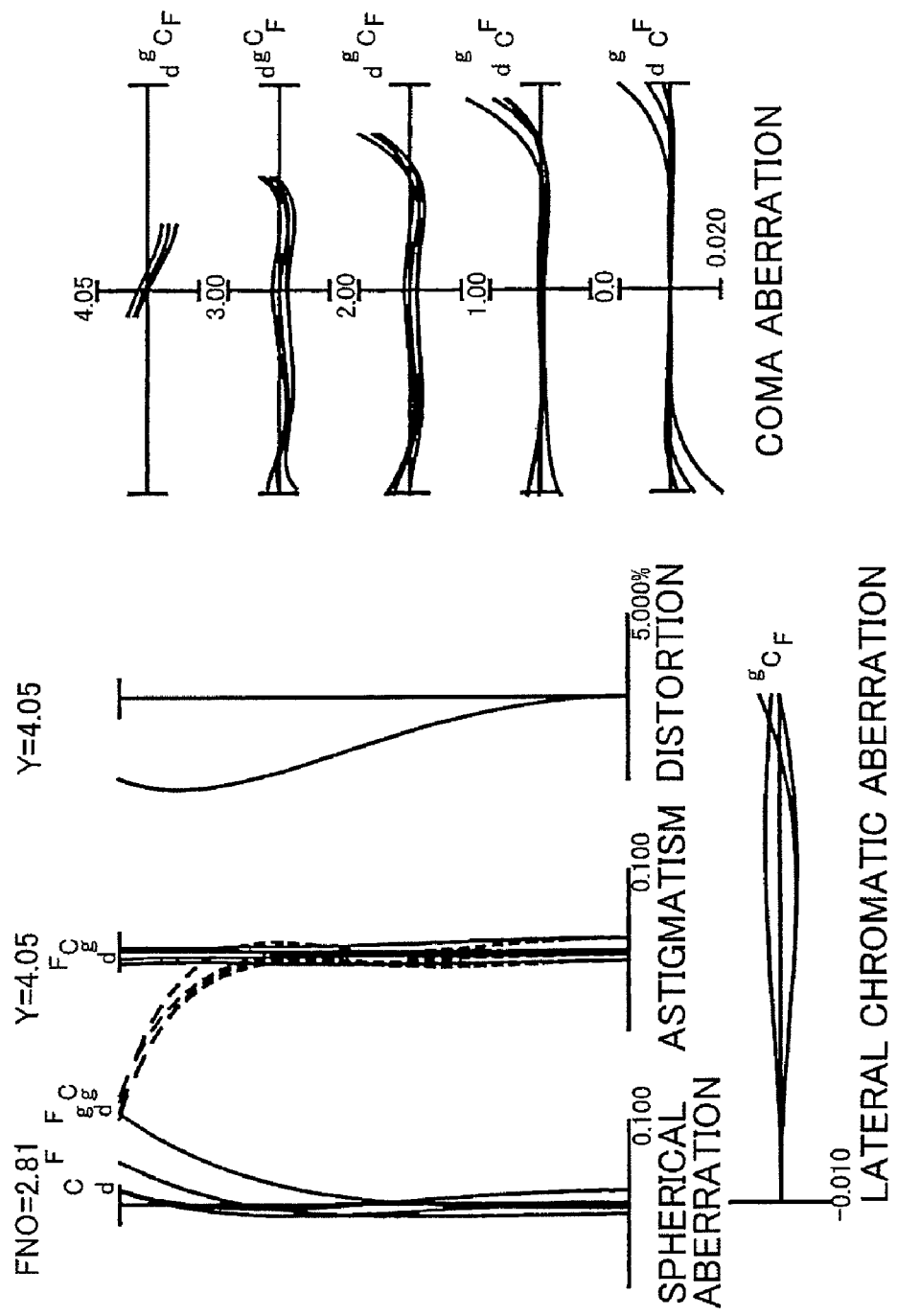
FIG. 24A is a case of a wide-angle end state.
Figure 24B:
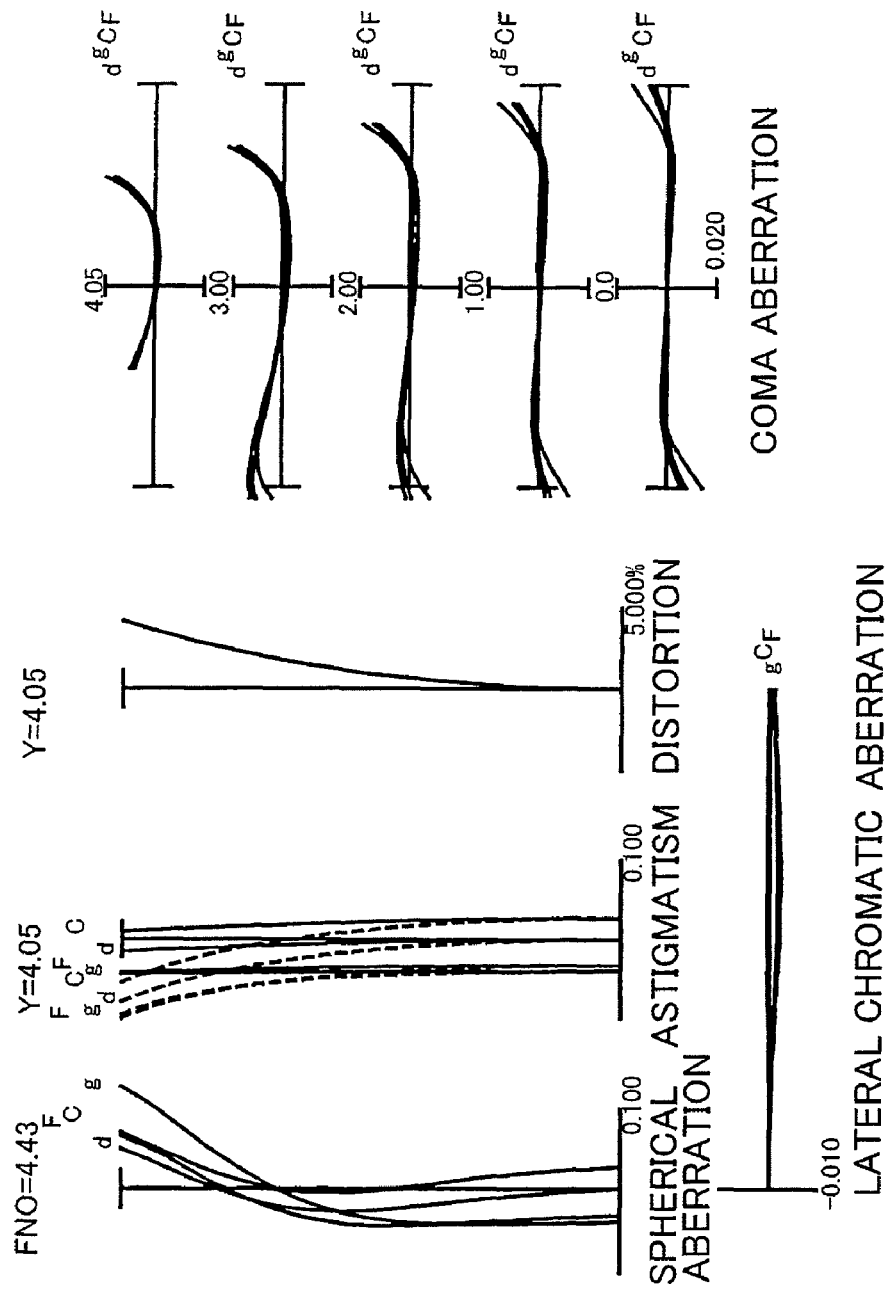
FIG. 24B is a case of an intermediate focal length state.
Figure 24C:
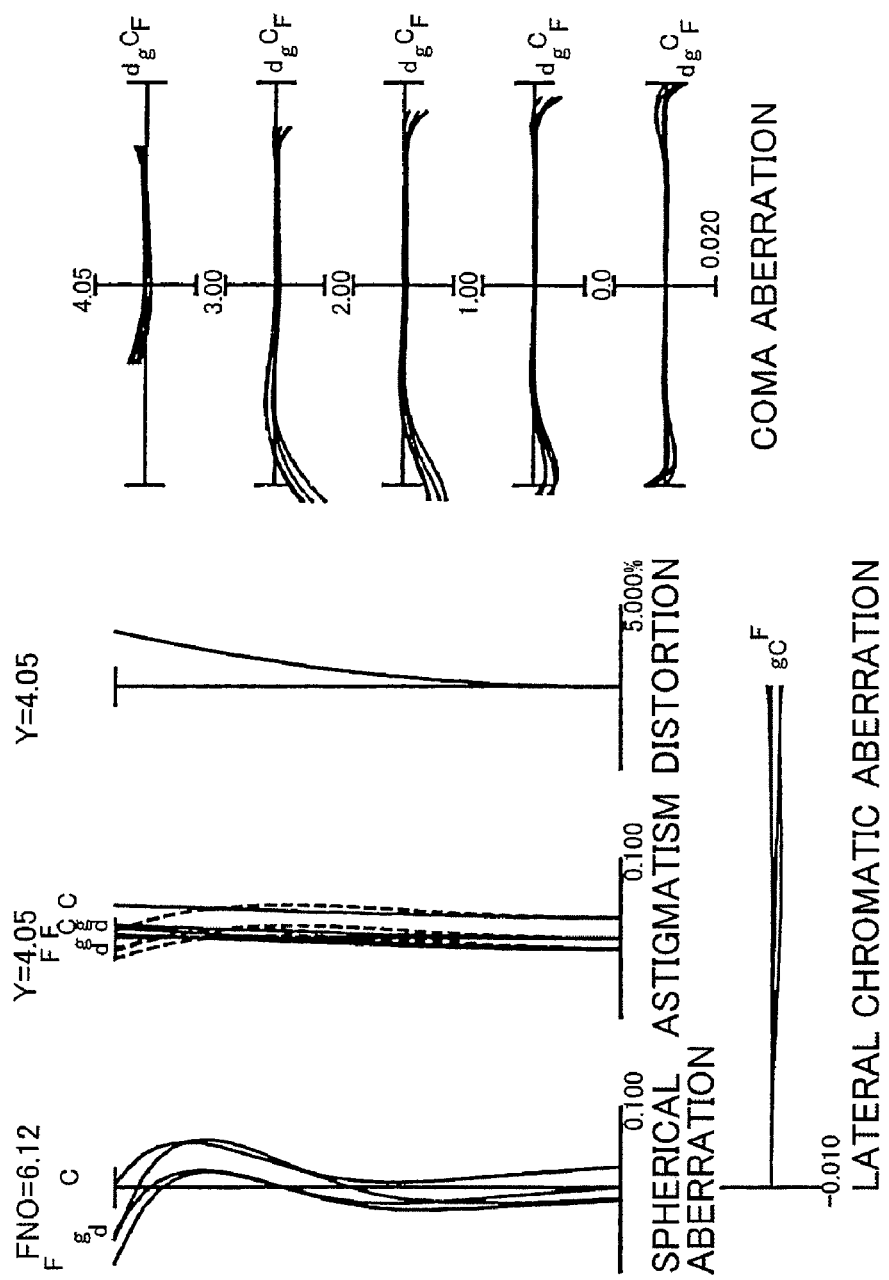
FIG. 24C is a case of a telephoto end state.
Figure 25A:
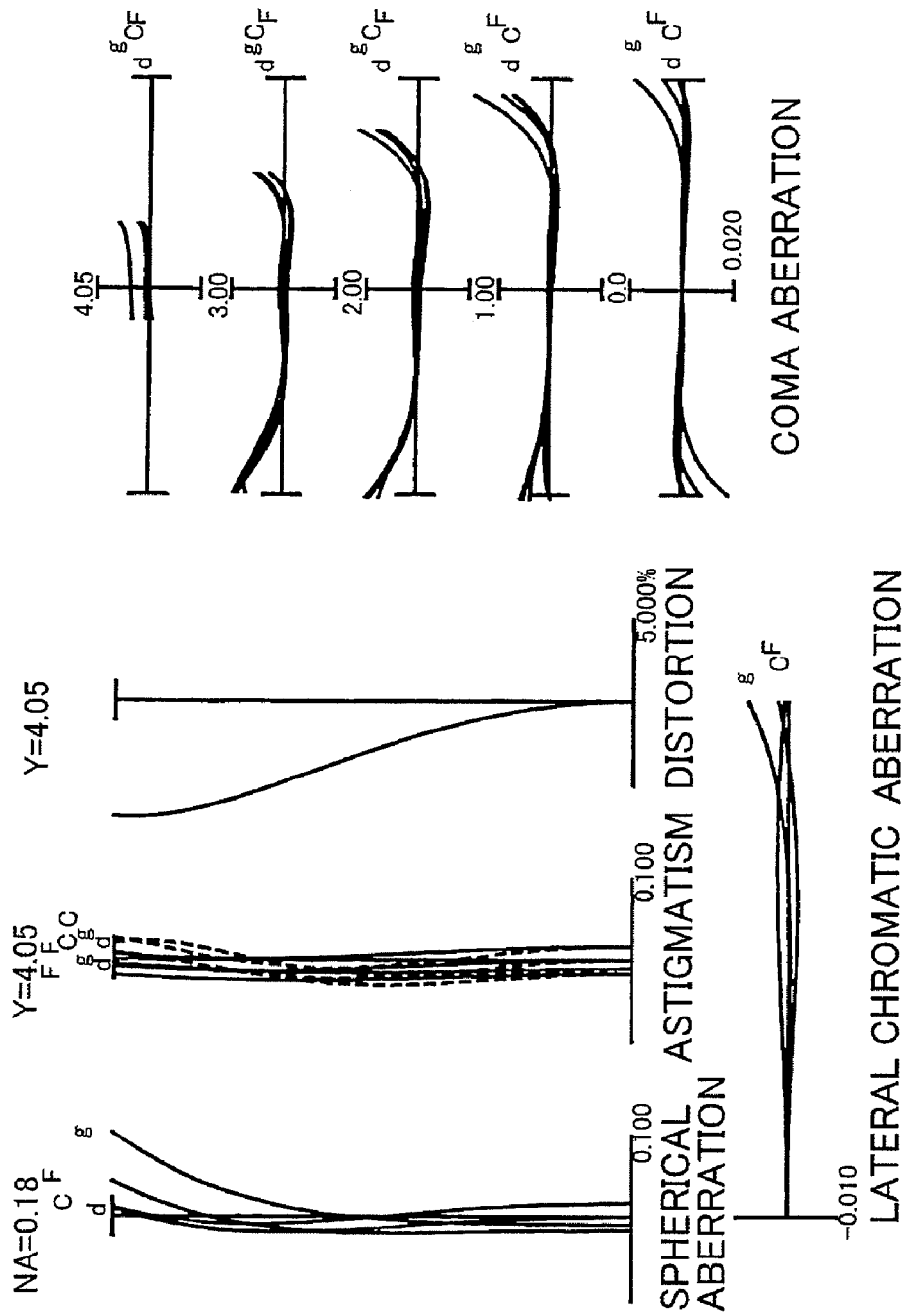
FIG. 25A is a case of a wide-angle end state.
Figure 25B:
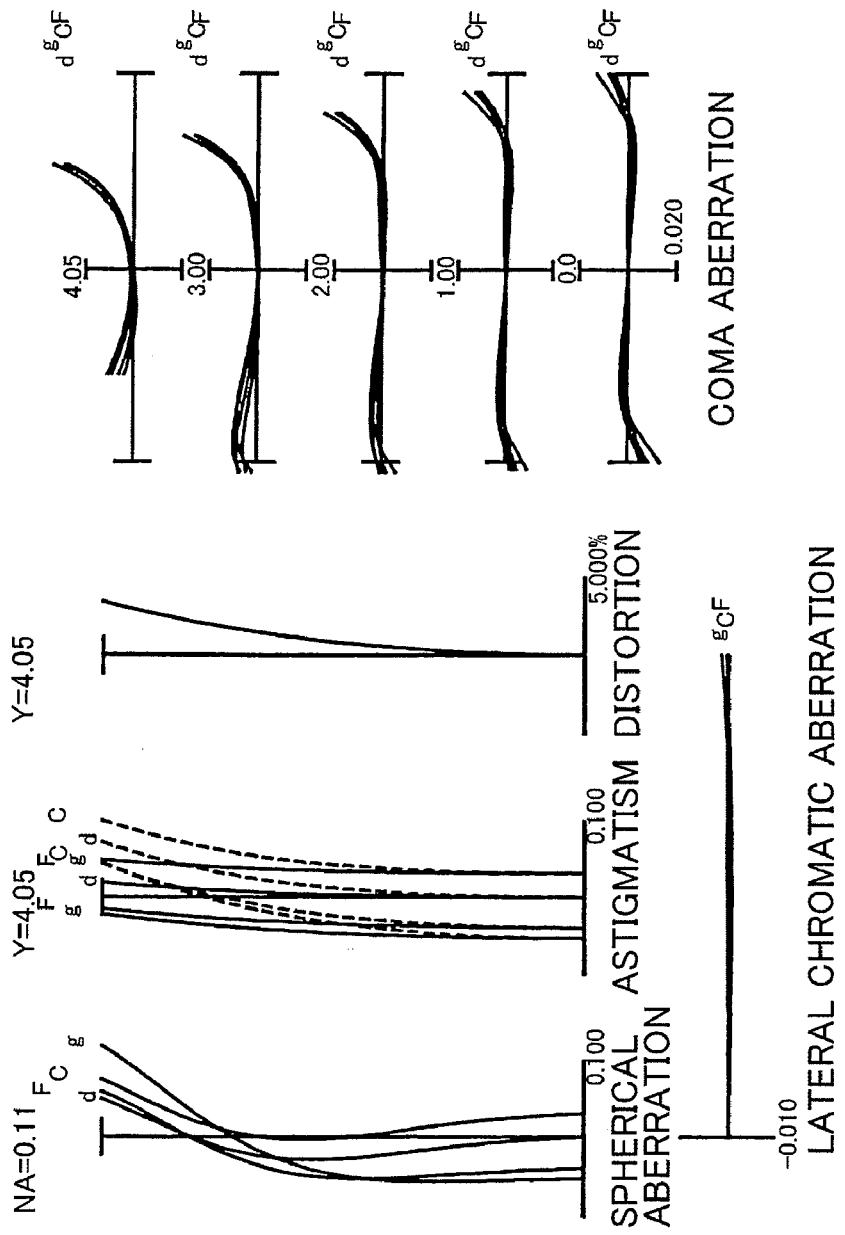
FIG. 25B is a case of an intermediate focal length state.
Figure 25C:
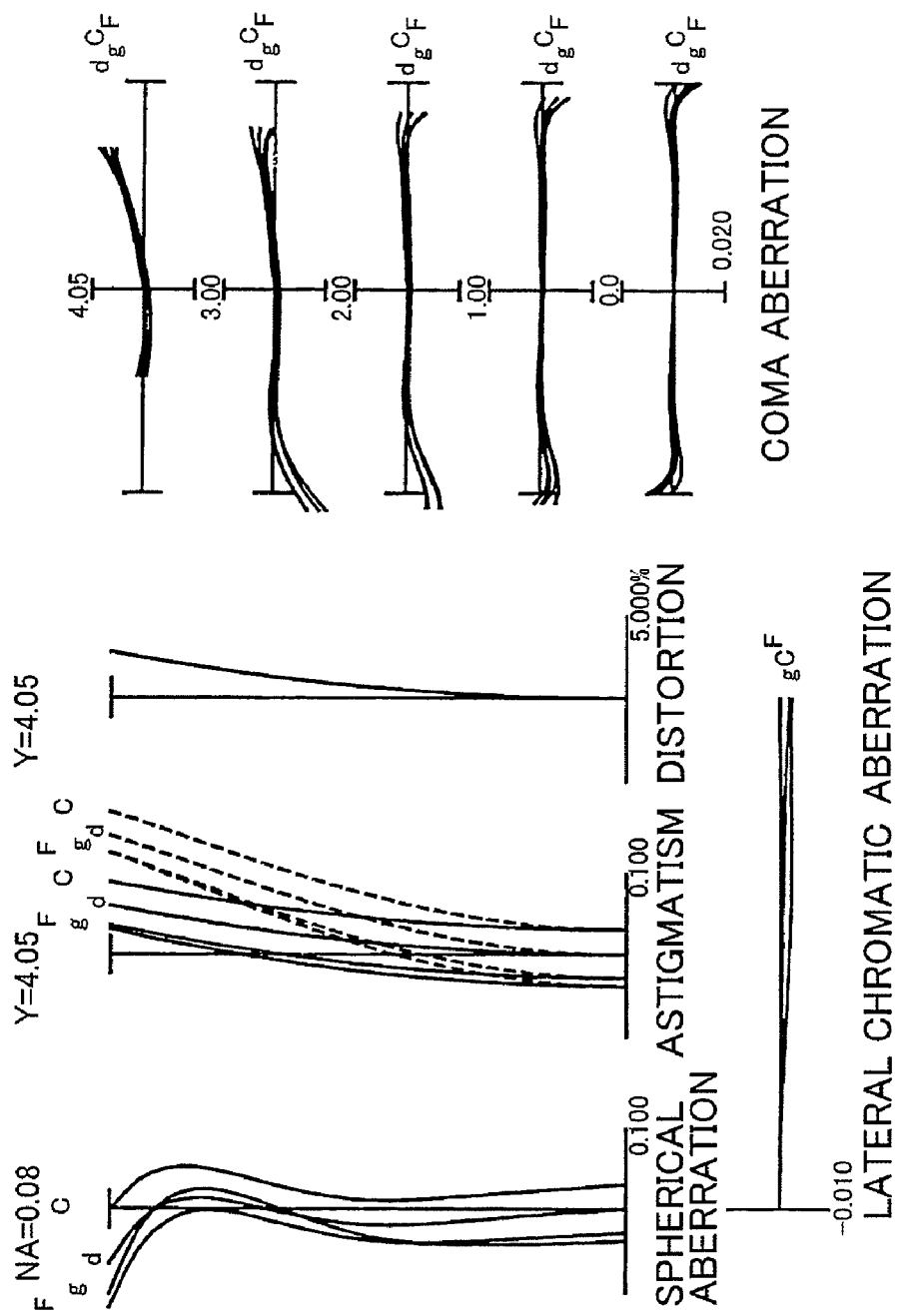
FIG. 25C is a case of a telephoto end state.

FIG. 24 are graphs showing various aberrations of the zoom lens in an infinite focusing state and lateral aberrations in the vibration proof state according to the eighth example, where FIG. 24A is the case of the wide-angle end state (F=5.20 mm), FIG. 24B is a case of the intermediate focal length state (F=15.00 mm), and FIG. 24C is a case of the telephoto end state (F=29.75 mm). FIG. 25 are graphs showing various aberrations of the zoom lens in a close distance focusing state and lateral aberrations in the vibration proof state according to the eighth example, where FIG. 25A is a case of the wide-angle end state (Rw=130 mm), FIG. 25B is a case of the intermediate focal length state (Rm=324 mm), and FIG. 25C is a case of the telephoto end state (Rt=601 mm).

As each aberration graph shows, in the zoom lens ZL according to the eighth example, various aberrations are well corrected in both the case of each focal length state from the wide-angle end to telephoto end in the infinite focusing state, and in the case of each focal length state from the wide-angle end to telephoto end in the close distance focusing state, and excellent image formation performance is implemented.

By equipping the zoom lens ZL of the eighth example, excellent optical performance can be insured for a digital single-lens reflex camera (optical apparatus, see FIG. 1).

Ninth Example

Figure 26:
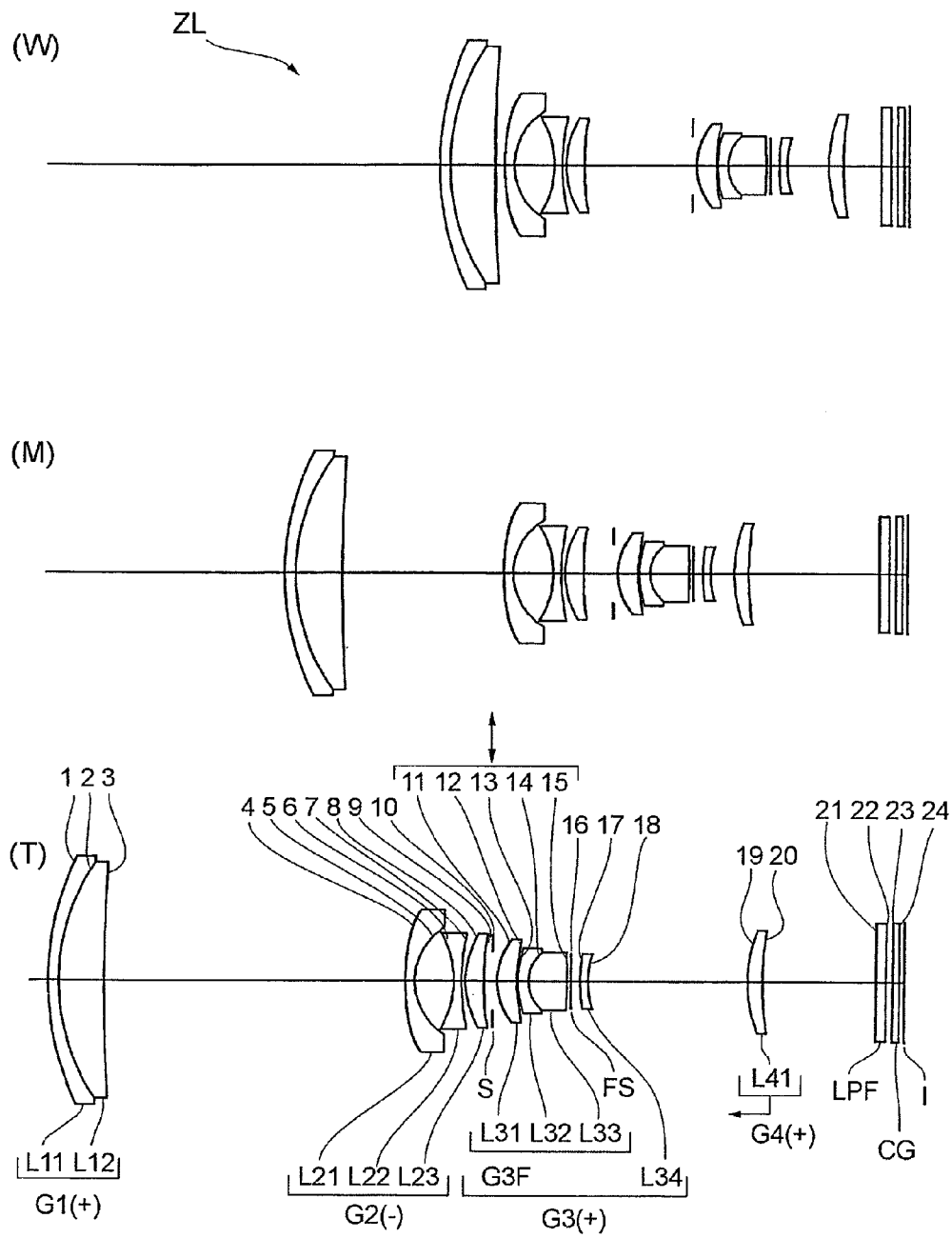
FIG. 26 are cross-sectional views depicting a configuration of a zoom lens according to a ninth example, where (W) shows a wide-angle end state in an infinity focusing state, (M) shows an intermediate focal length state in the infinity focusing state, and (T) is a telephoto end state in the infinity focusing state.

The ninth example will now be described with reference to FIG. 26 to FIG. 28, and Table 9. FIG. 26 shows the configuration of the zoom lens ZL according to the ninth example, wherein the change of the focal length state from the wide-angle end state (W) to the telephoto end state (T) via the intermediate focal length state (M), that is, the movement of each lens group during zooming, is shown.

Table 9 shows each data of the ninth example. The surface numbers 1 to 24 in Table 9 corresponds to the surfaces 1 to 24 in FIG. 26. In the ninth example, the object side lens surface of the negative meniscus lens L21, image side lens surface of the positive meniscus lens L23, object side lens surface of the positive meniscus lens L31, and image side lens surface of the biconvex lens L33, in other words, the lens surfaces of the fourth surface, ninth surface, eleventh surface and fifteenth surface are all formed to be an aspherical shape.

In the tables, d3 is an axial air distance between the first lens group G1 and the second lens group G2, d9 is an axial air distance between the second lens group G2 and the aperture stop S, d18 is an axial air distance between the third lens group G3 and the fourth lens group G4, and d20 is an axial air distance between the fourth lens group and the low pass filter LPF. These axial air distances d3, d9, d18 and d20 change during zooming.

TABLE 9

[All parameters]

| | Wide-angle end | | intermediate focal length | | telephoto end |
|---|---|---|---|---|---|
| F | 5.20 | ~ | 15.00 | ~ | 35.00 |
| FNO | 3.0 | ~ | 4.4 | ~ | 6.1 |
| ω | −39.32 | ~ | −14.76 | ~ | −7.66 |

TABLE 9-continued

[Lens parameters]

| Surface Number | r | d | nd | vd |
|---|---|---|---|---|
| 1 | 21.7945 | 0.8000 | 1.902000 | 25.10 |
| 2 | 16.1307 | 3.4000 | 1.617200 | 54.00 |
| 3 | 143.7476 | (d3 = variable) | | |
| 4* | 20.0988 | 0.7000 | 1.851350 | 40.10 |
| 5 | 4.8159 | 3.0000 | | |
| 6 | −7.0561 | 0.6000 | 1.755000 | 52.29 |
| 7 | 15.9179 | 0.3000 | | |
| 8 | 6.9706 | 1.4000 | 1.821140 | 24.06 |
| 9* | 69.0406 | (d9 = variable) | | |
| 10 | aperture stop S | 0.3000 | | |
| 11* | 4.7796 | 1.5000 | 1.768020 | 49.23 |
| 12 | 12.8665 | 0.1000 | | |
| 13 | 7.8084 | 0.8000 | 1.903660 | 31.31 |
| 14 | 2.9041 | 2.9000 | 1.592010 | 67.05 |
| 15* | −20.5387 | 0.3000 | | |
| 16 | Flare cut stop FS | 0.7000 | | |
| 17 | 13.1655 | 0.6000 | 1.883000 | 40.77 |
| 18 | 7.6286 | (d18 = variable) | | |
| 19 | 10.9258 | 1.1000 | 1.516800 | 64.12 |
| 20 | 24.3105 | (d20 = variable) | | |
| 21 | ∞ | 0.8000 | 1.516800 | 64.12 |
| 22 | ∞ | 0.5000 | | |
| 23 | ∞ | 0.5000 | 1.516800 | 64.12 |
| 24 | ∞ | (Bf) | | |

[Aspherical Data]

Fourth surface

K = 11.0079, A4 = 2.14710E−04, A6 = −2.42160E−06, A8 = 0.00000E+00, A10 = 0.00000E+00

Ninth surface

K = −100.0000, A4 = 1.03330E−03, A6 = 6.02490E−05, A8 = −6.60540E−06, A10 = 3.26160E−07

Eleventh surface

K = −0.4939, A4 = 1.79000E−04, A6 = 1.98550E−05, A8 = 0.00000E+00, A10 = 0.00000E+00

Fifteenth surface

K = −100.0000, A4 = 3.24000E−04, A6 = 1.54670E−04, A8 = 0.00000E+00, A10 = 0.00000E+00

[Variable distance during focusing]

| | Infinite distance | | | Close distance | | |
|---|---|---|---|---|---|---|
| F, β | 5.20000 | 15.00000 | 29.75200 | −0.05000 | −0.05000 | −0.05000 |
| D0 | ∞ | ∞ | ∞ | 94.3369 | 275.0159 | 628.5204 |
| d3 | 0.72531 | 12.13516 | 22.53601 | 0.72531 | 12.13516 | 22.53601 |
| d9 | 7.93142 | 2.20666 | 0.64475 | 7.93142 | 2.20666 | 0.64475 |
| d18 | 3.15712 | 1.81415 | 11.91646 | 2.32385 | 0.55617 | 8.91987 |
| d20 | 2.90657 | 9.93463 | 8.67126 | 3.73984 | 11.19261 | 11.66785 |
| Bf | 0.40631 | 0.40631 | 0.40631 | 0.40631 | 0.40631 | 0.40631 |
| TL | 35.42673 | 46.79692 | 64.47478 | 35.42673 | 6.79692 | 64.47478 |

[Zoom lens group data]

| Group No. | First surface of group | Focal length of group |
|---|---|---|
| G1 | 1 | 49.90959 |
| G2 | 4 | −5.45518 |
| G3 | 11 | 7.80739 |
| G4 | 19 | 37.35259 |

[Conditional Expressions]

(5) F2/F1 = −0.109
(6) F4/F1 = 0.748
(7) N11 = 1.902
(8) R12F/R12R = 0.112
(9) R23F/R23R = 0.101

As the data table in Table 9 shows, the zoom lens ZL according to the present example satisfies all the above conditional expressions (5) to (9).

Figure 27A:
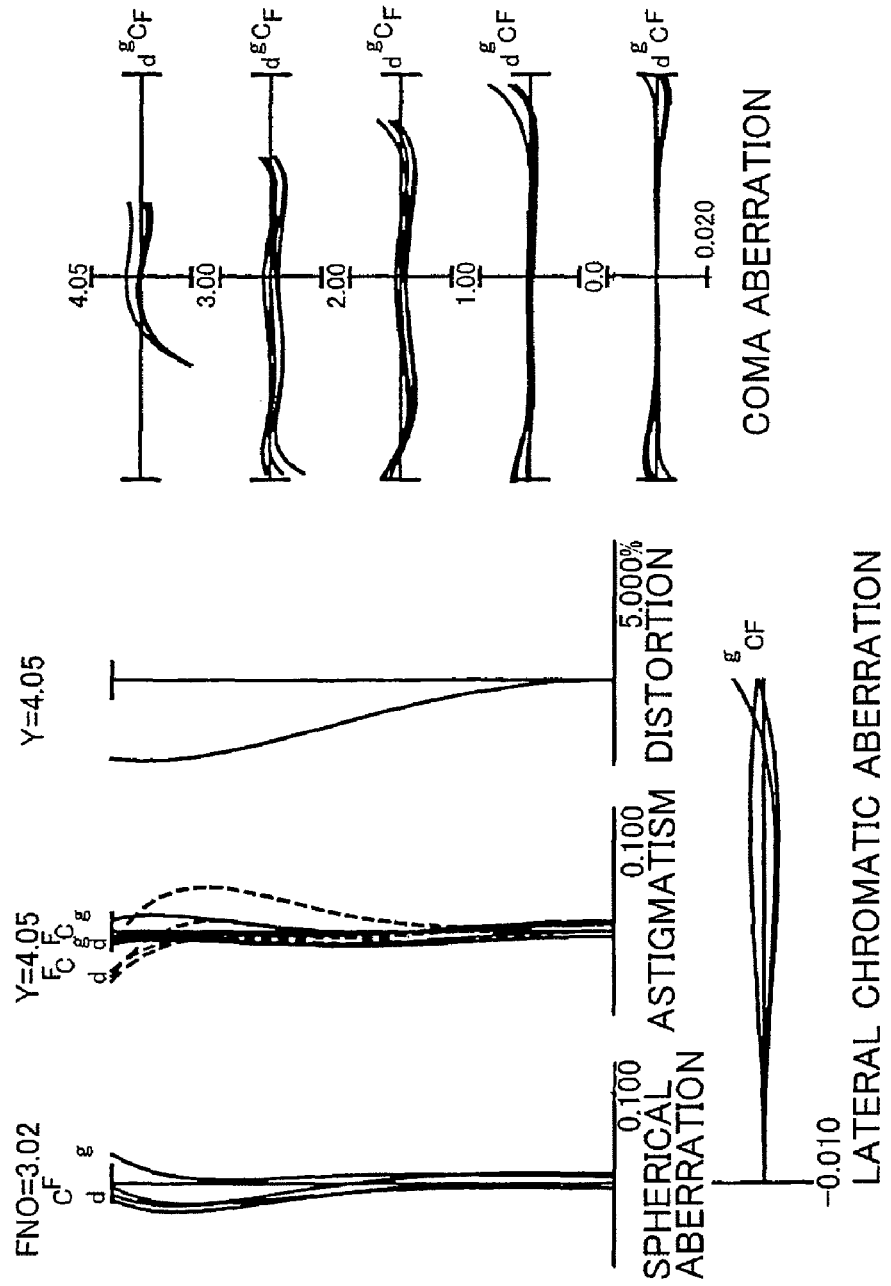
FIG. 27A is a case of a wide-angle end state.
Figure 27B:
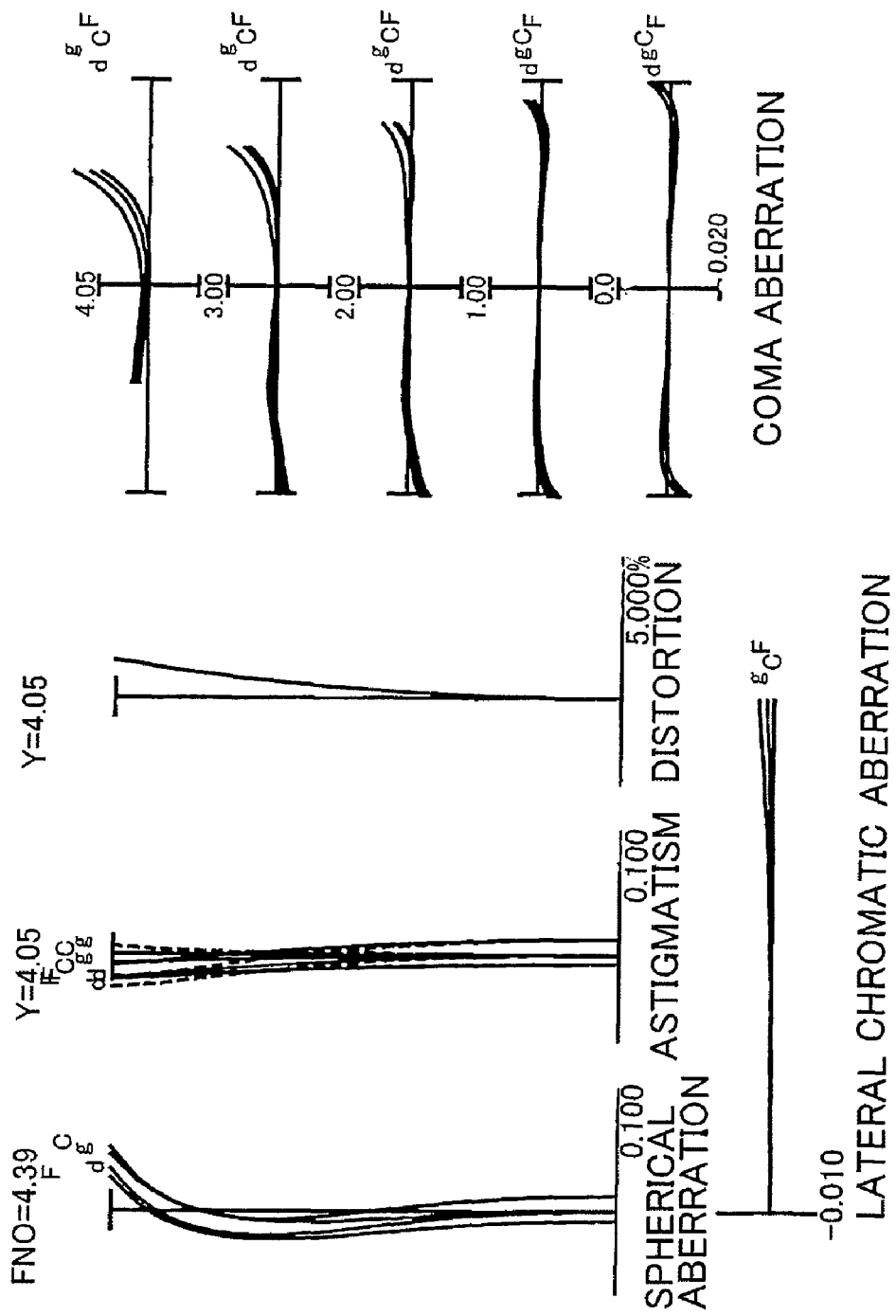
FIG. 27B is a case of an intermediate focal length state.
Figure 27C:
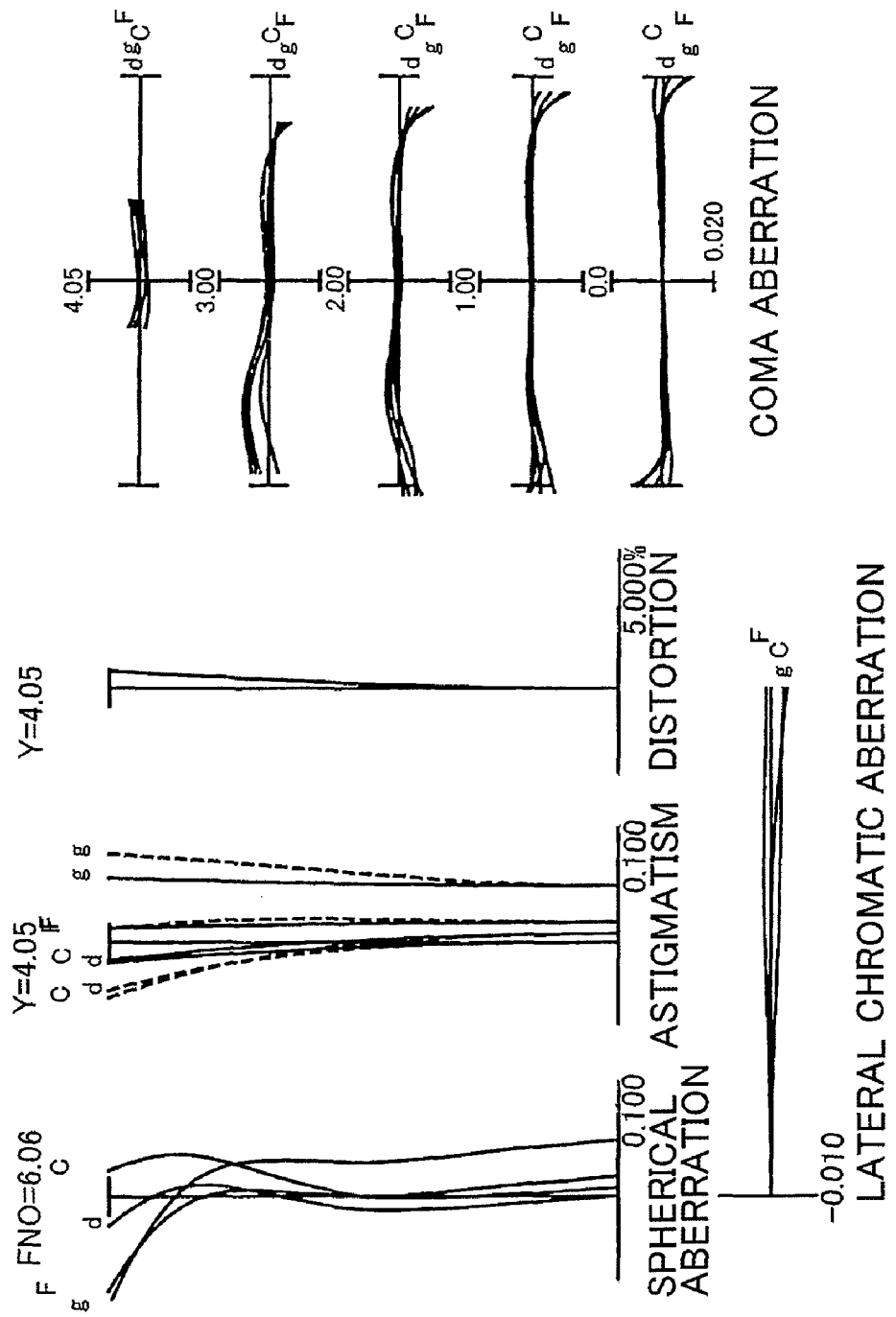
FIG. 27C is a case of a telephoto end state.
Figure 28B:
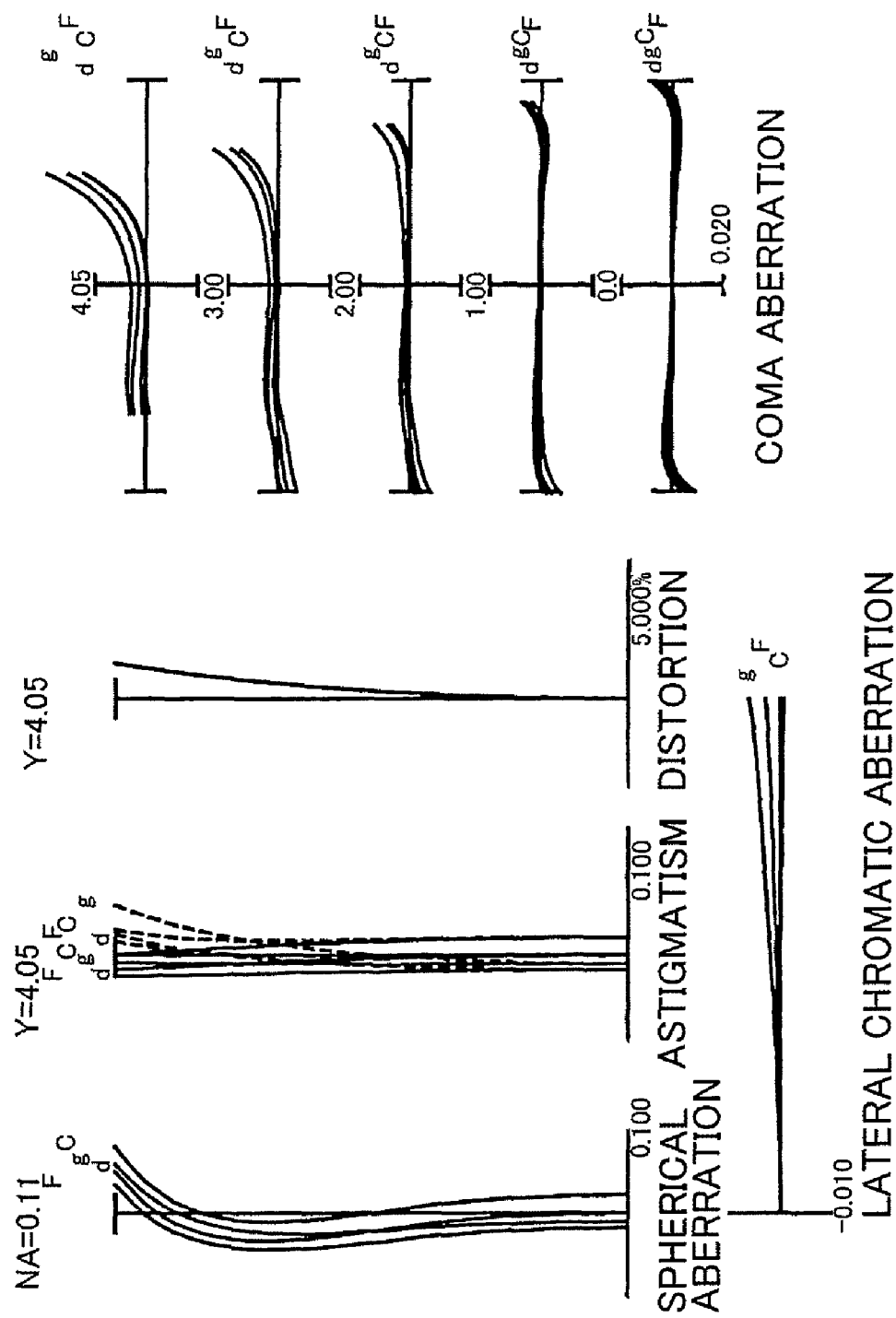
FIG. 28B is a case of an intermediate focal length state.
Figure 28C:
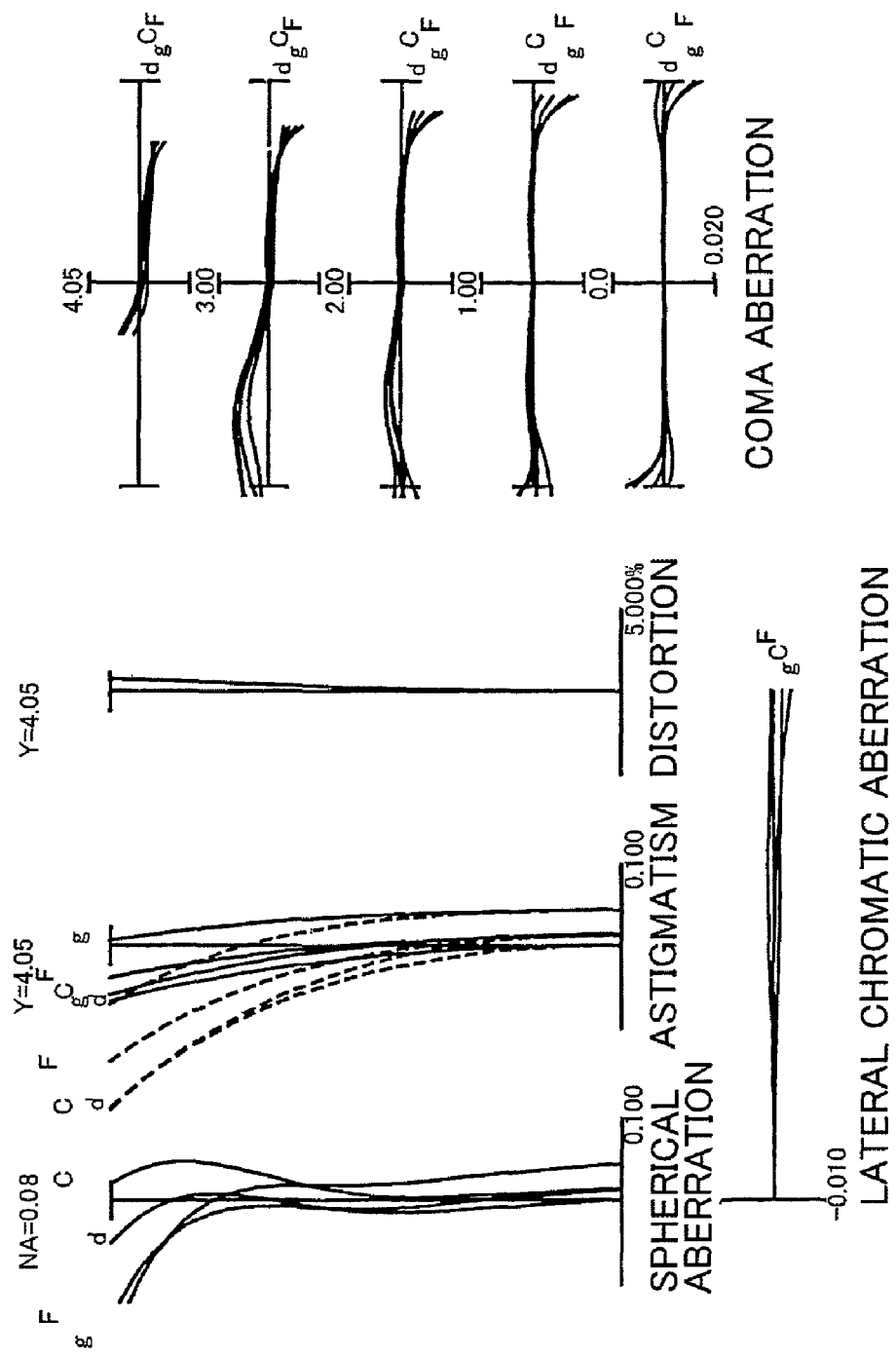
FIG. 28C is a case of a telephoto end state.

FIG. 27 are graphs showing various aberrations of the zoom lens in an infinite focusing state and lateral aberrations in the vibration proof state according to the ninth example, where FIG. 27A is a case of the wide-angle end state (F=5.20 mm), FIG. 27B is a case of the intermediate focal length state (F=15.00 mm), and FIG. 27C is a case of the telephoto end state (F=35.00 mm). FIG. 28 are graphs showing various aberrations of the zoom lens in a close distance focusing state and lateral aberrations in the vibration proof state according to the ninth example, where FIG. 28A is a case of the wide-angle end state (Rw=130 mm), FIG. 28B is a case of the intermediate focal length state (Rm=322 mm), and FIG. 28C is a case of the telephoto end state (Rt=693 mm).

As each aberration graph shows, in the zoom lens ZL according to the ninth example, various aberrations are well corrected in both the case of each focal length state from the wide-angle end to telephoto end in the infinite focusing state, and in the case of each focal length state from the wide-angle end to telephoto end in the close distance focusing state, and excellent image formation performance is implemented.

By equipping the zoom lens ZL of the first example, excellent optical performance can be insured for a digital single-lens reflex camera (optical apparatus, see FIG. 1).

Tenth Example

The tenth example will now be described with reference to FIG. 29 to FIG. 31, and Table 10. FIG. 29 shows the configuration of the zoom lens ZL according to the tenth example, wherein the change of the focal length state from the wide-angle end state (W) to the telephoto end state (T) via the intermediate focal length state (M), that is, the movement of each lens group during zooming, is shown.

Table 10 shows each data of the tenth example. The surface numbers 1 to 24 in Table 10 correspond to the surfaces 1 to 24 in FIG. 29. In the tenth example, the object side lens surface of the negative meniscus lens L21, image side lens surface of the positive meniscus lens L23, object side lens surface of the positive meniscus lens L31, and image side lens surface of the biconvex lens L33, in other words, the lens surfaces of the fourth surface, ninth surface, eleventh surface and fifteenth surface are all formed to be an aspherical shape.

In the tables, d3 is an axial air distance between the first lens group G1 and the second lens group G2, d9 is an axial air distance between the second lens group G2 and the aperture stop S, d18 is an axial air distance between the third lens group G3 and the fourth lens group G4, and d20 is an axial air distance between the fourth lens group G4 and the low pass filter LPF. These axial air distances d3, d9, d18 and d20 change during zooming.

TABLE 10

[All parameters]

| | Wide-angle end | | intermediate focal length | | telephoto end |
|---|---|---|---|---|---|
| F | 5.20 | ~ | 15.00 | ~ | 29.75 |
| FNO | 3.0 | ~ | 4.4 | ~ | 6.1 |
| ω | −39.32 | ~ | −14.68 | ~ | −7.54 |

[Lens parameters]

| Surface Number | r | d | nd | νd |
|---|---|---|---|---|
| 1 | 22.5789 | 0.8000 | 1.922860 | 20.88 |
| 2 | 17.2074 | 3.4000 | 1.754999 | 52.32 |
| 3 | 76.8562 | (d3 = variable) | | |
| 4* | 21.0921 | 0.7000 | 1.851350 | 40.10 |
| 5 | 4.8000 | 3.0000 | | |
| 6 | −7.5984 | 0.6000 | 1.755000 | 52.29 |
| 7 | 16.2867 | 0.3000 | | |
| 8 | 6.1060 | 1.4000 | 1.821140 | 24.06 |
| 9* | 24.9329 | (d9 = variable) | | |
| 10 | aperture stop S | 0.3000 | | |
| 11* | 5.3286 | 1.5000 | 1.768020 | 49.23 |
| 12 | 13.9187 | 0.1000 | | |
| 13 | 6.5274 | 0.8000 | 1.903660 | 31.31 |
| 14 | 2.8407 | 2.9000 | 1.592010 | 67.05 |
| 15* | −19.0700 | 0.3000 | | |
| 16 | Flare cut stop FS | 0.7000 | | |
| 17 | 17.8368 | 0.6000 | 1.883000 | 40.77 |
| 18 | 7.3901 | (d18 = variable) | | |
| 19 | 23.7123 | 1.1000 | 1.516800 | 64.12 |
| 20 | −45.6751 | (d20 = variable) | | |
| 21 | ∞ | 0.8000 | 1.516800 | 64.12 |
| 22 | ∞ | 0.5000 | | |
| 23 | ∞ | 0.5000 | 1.516800 | 64.12 |
| 24 | ∞ | (Bf) | | |

[Aspherical Data]

Fourth surface

K = 11.3059, A4 = 2.78670E−04, A6 = −3.58790E−06, A8 = 0.00000E−00, A10 = 0.00000E−00

TABLE 10-continued

Ninth surface

K = −100.0000, A4 = 2.06190E−03, A6 = 3.69370E−05, A8 = −6.44020E−06,
A10 = 3.26430E−07

Eleventh surface

K = −1.1345, A4 = 6.83490E−04, A6 = 1.95820E−05, A8 = 0.00000E−00,
A10 = 0.00000E−00

Fifteenth surface

K = −100.0000, A4 = −1.46160E−04, A6 = 9.38390E−05, A8 = 0.00000E−00,
A10 = 0.00000E−00

[Variable distance during focusing]

| | Infinite distance | | | Close distance | | |
|---|---|---|---|---|---|---|
| F, β | 5.20000 | 15.00000 | 29.75200 | −0.05000 | −0.05000 | −0.05000 |
| D0 | ∞ | ∞ | ∞ | 94.3705 | 275.0340 | 550.8531 |
| d3 | 0.59589 | 11.48771 | 18.95438 | 0.59589 | 11.48771 | 18.95438 |
| d9 | 8.55530 | 2.69871 | 1.00060 | 8.55530 | 2.69871 | 1.00060 |
| d18 | 2.23474 | 0.85659 | 4.67160 | 1.53591 | −0.26215 | 2.70122 |
| d20 | 3.70791 | 10.12128 | 12.07483 | 4.40674 | 11.24002 | 14.04521 |
| Bf | 0.40631 | 0.40631 | 0.40631 | 0.40631 | 0.40631 | 0.40631 |
| TL | 35.80015 | 45.87061 | 57.40770 | 35.80015 | 45.87061 | 57.40770 |

[Zoom lens group data]

| Group No. | First surface of group | Focal length of group |
|---|---|---|
| G1 | 1 | 45.00000 |
| G2 | 4 | −5.45518 |
| G3 | 11 | 7.92074 |
| G4 | 19 | 30.36698 |

[Conditional Expressions]

(5) F2/F1 = −0.121
(6) F4/F1 = 0.675
(7) N11 = 1.923
(8) R12F/R12R = 0.224
(9) R23F/R23R = 0.245

As the data table in Table 10 shows, the zoom lens ZL according to the present example satisfies all of the above conditional expression (5) to (9).

Figure 30A:
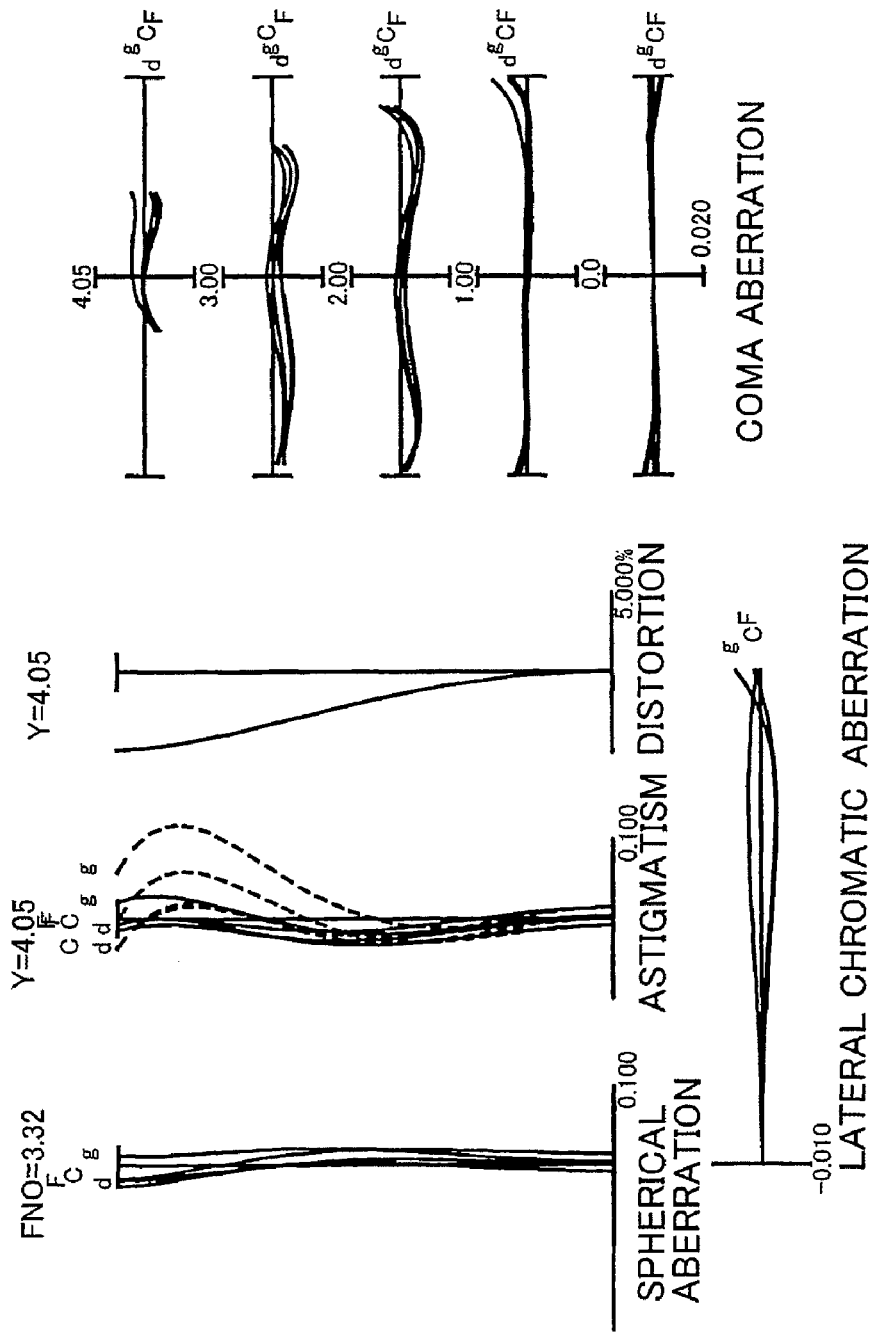
FIG. 30A is a case of a wide-angle end state.
Figure 30B:
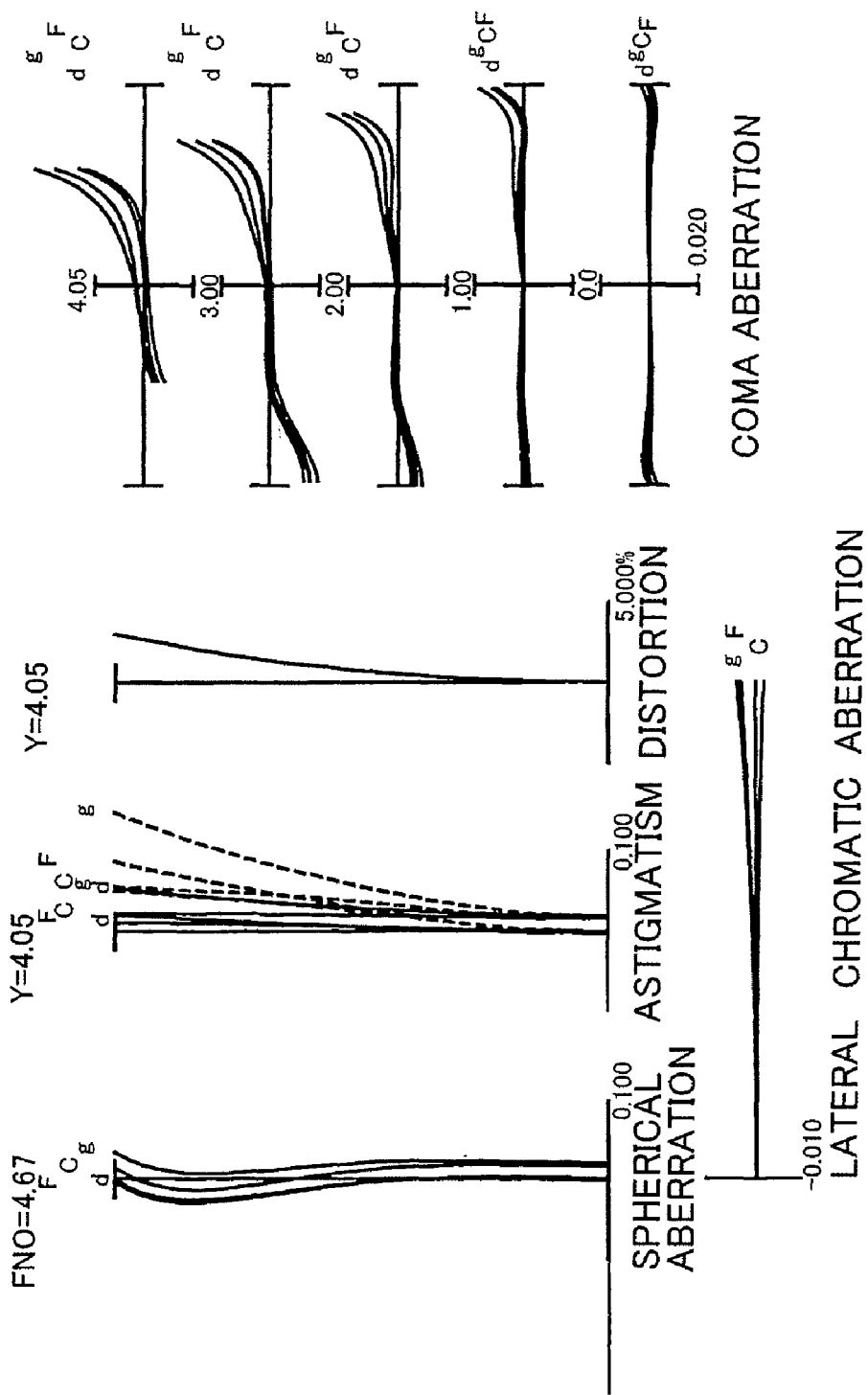
FIG. 30B is a case of an intermediate focal length state.
Figure 30C:
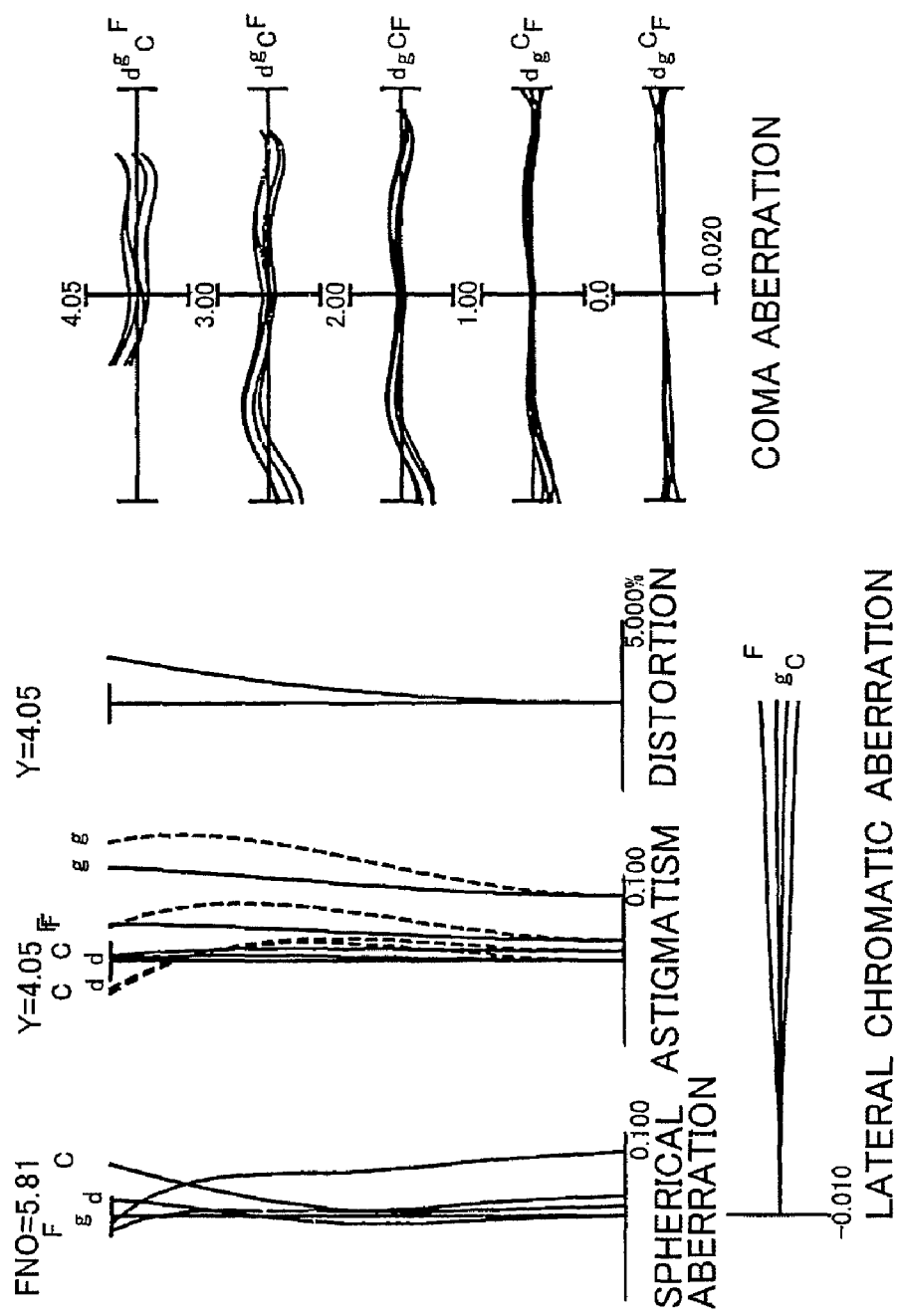
FIG. 30C is a case of a telephoto end state.
Figure 31A:
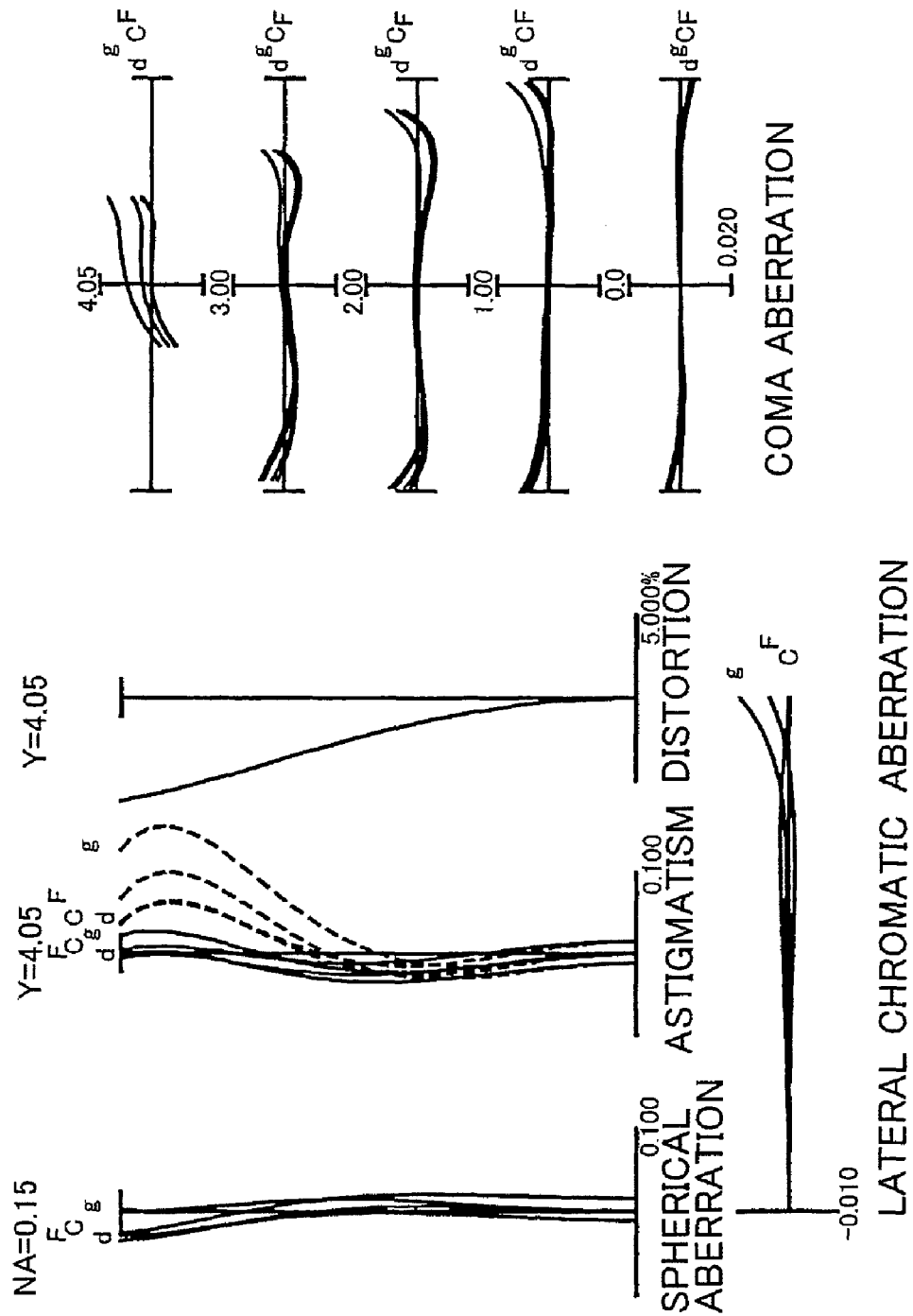
FIG. 31A is a case of a wide-angle end state.
Figure 31B:
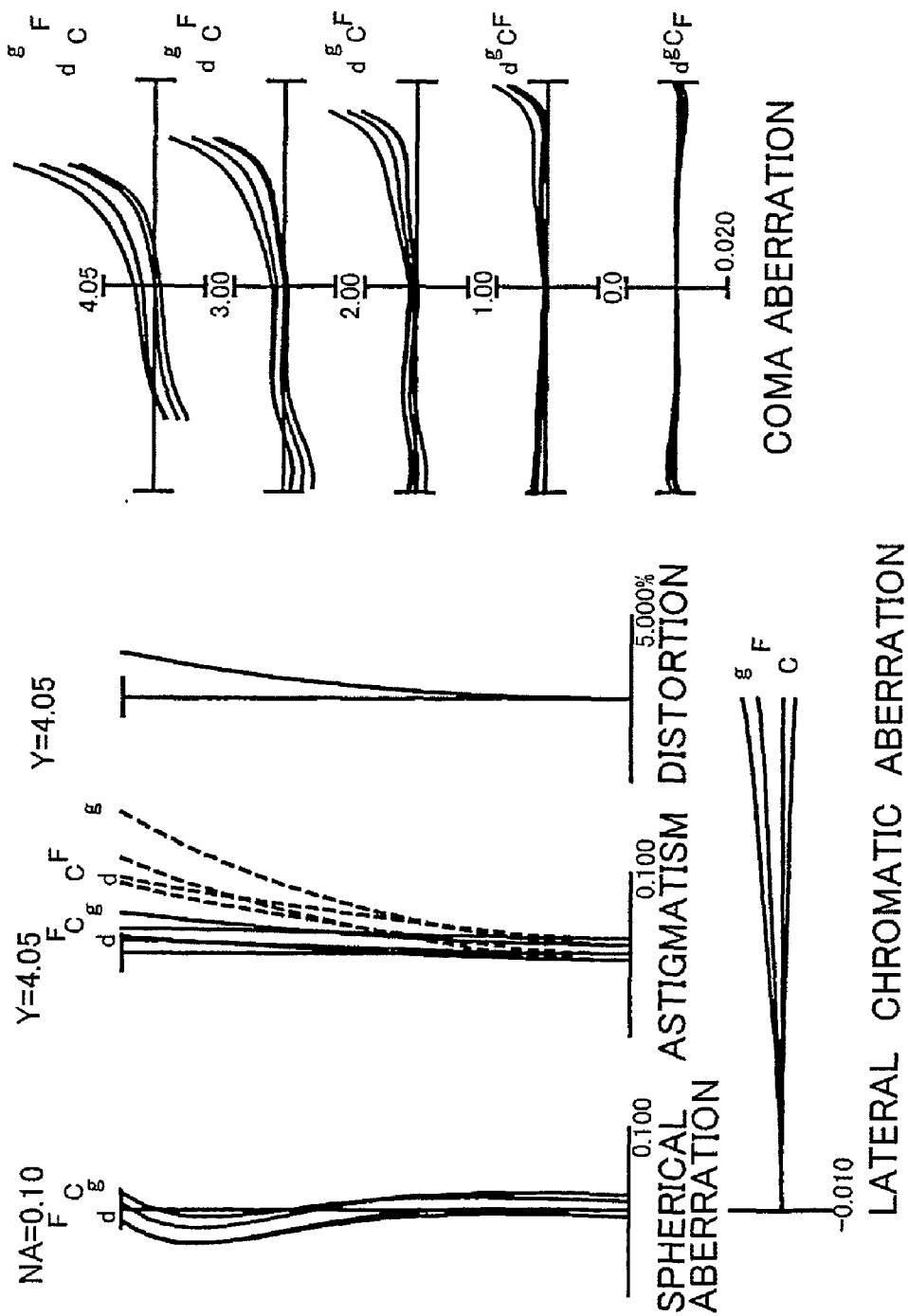
FIG. 31B is a case of an intermediate focal length state.
Figure 31C:
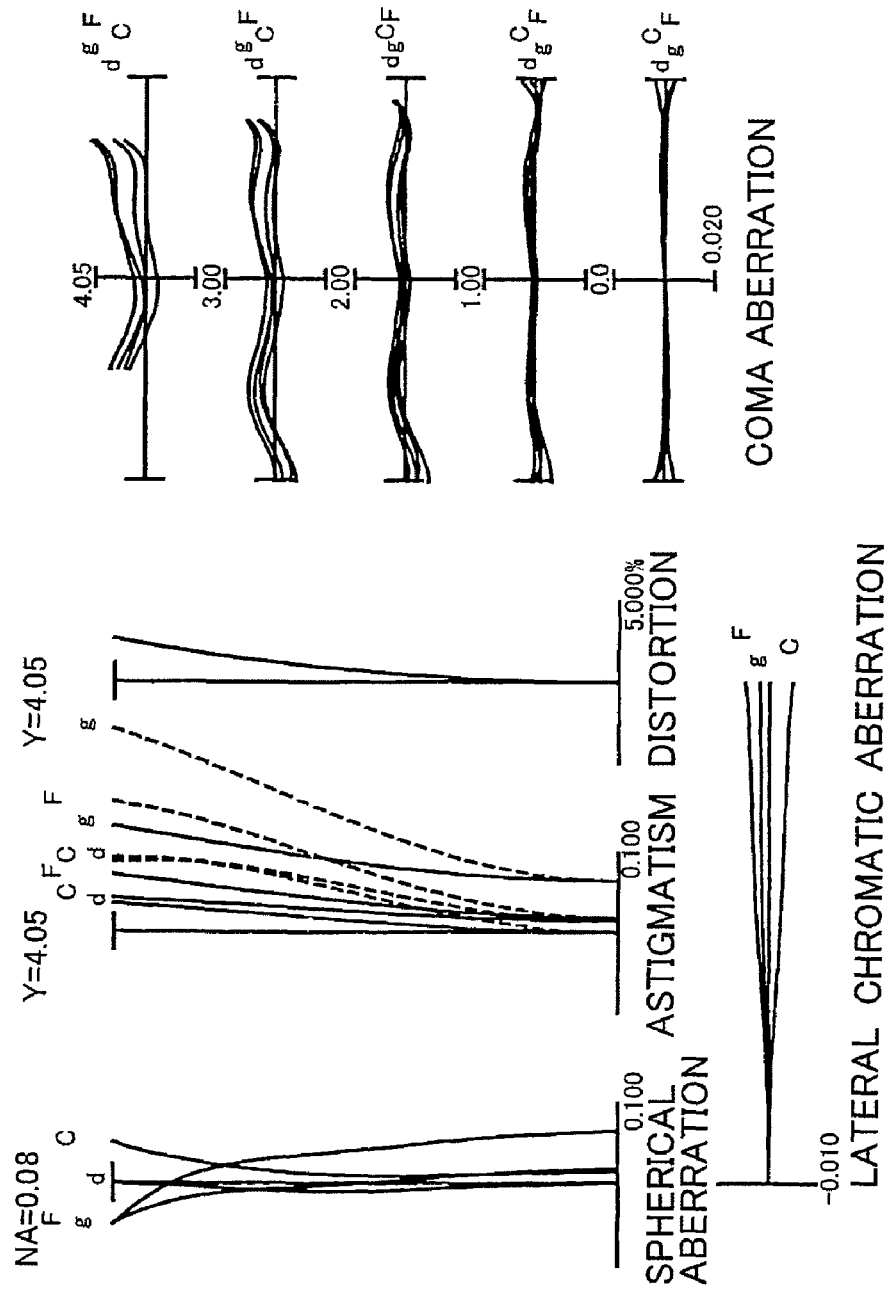
FIG. 31C is a case of a telephoto end state.

FIG. 30 are graphs showing various aberrations of the zoom lens in an infinite focusing state and lateral aberrations in the vibration proof state according to the tenth example, where FIG. 30A is a case of the wide-angle end state (F=5.20 mm), FIG. 30B is a case of the intermediate focal length state (F=15.00 mm), and FIG. 30C is a case of the telephoto end state (F=29.75 mm). FIG. 31 are graphs showing various aberrations of the zoom lens in a close distance focusing state and lateral aberrations in the vibration proof state according to the tenth example, where FIG. 31A is a case of the wide-angle end state (Rw=130 mm), FIG. 31B is a case of the intermediate focal length state (Rm=321 mm), and FIG. 31C is a case of the telephoto end state (Rt=608 mm).

As each aberration graph shows, in the zoom lens ZL according to the tenth example, various aberrations are well corrected in both the case of each focal length state from the wide-angle end to telephoto end in the infinite focusing state, and in the case of each focal length state from the wide-angle end to telephoto end in the close distance focusing state, and excellent image formation performance is implemented.

By equipping the zoom lens ZL of the tenth example, excellent optical performance can be insured for a digital single-lens reflex camera (optical apparatus, see FIG. 1).

Eleventh Example

Figure 32:
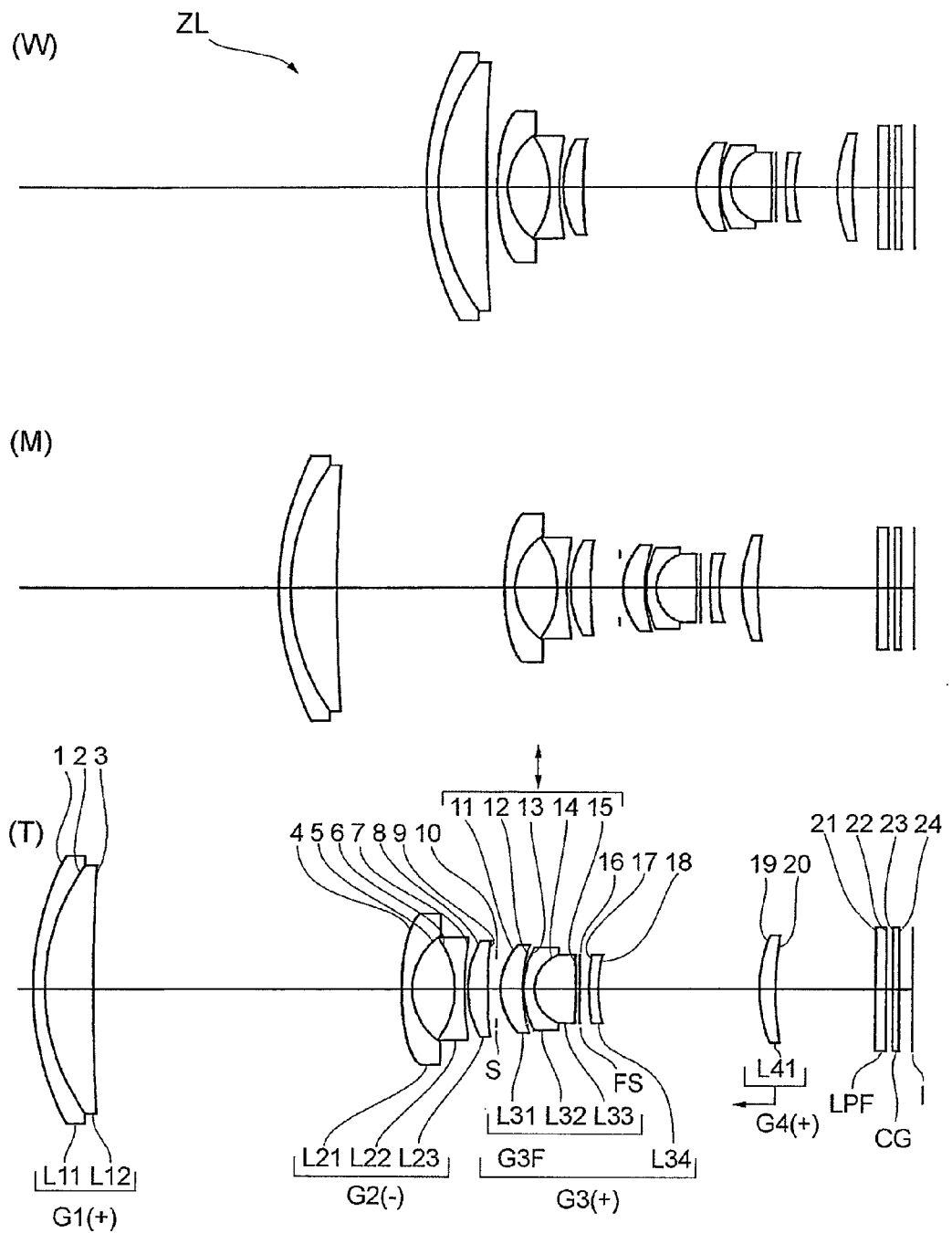
FIG. 32 are cross-sectional views depicting a configuration of a zoom lens according to a eleventh example, where (W) shows a wide-angle end state in an infinity focusing state, (M) shows an intermediate focal length state in the infinity focusing state, and (T) is a telephoto end state in the infinity focusing state.

The eleventh example will now be described with reference to FIG. 32 to FIG. 34, and Table 11. FIG. 32 shows the configuration of the zoom lens ZL according to the eleventh example, wherein the change of the focal length state from the wide-angle end state (W) to the telephoto end state (T) via the intermediate focal length state (M), that is, the movement of each lens group during zooming, is shown.

Table 11 shows each data of the eleventh example. The surface numbers 1 to 24 in Table 11 correspond to the surfaces 1 to 24 in FIG. 32. In the eleventh example, the object side lens surface of the negative meniscus lens L21, image side lens surface of the positive meniscus lens L23, object side lens surface of the positive meniscus lens L31, and image side lens surface of the biconvex lens L33, in other words, the lens surfaces of the fourth surface, ninth surface, eleventh surface and fifteenth surface are all formed to be an aspherical shape.

In the tables, d3 is an axial air distance between the first lens group G1 and the second lens group G2, d9 is an axial air distance between the second lens group G2 and the aperture stop S, d18 is an axial air distance between the third lens group G3 and the fourth lens group G4, and d20 is an axial air distance between the fourth lens group G4 and the low pass filter LPF. These axial air distances d3, d9, d18 and d20 change during zooming.

TABLE 11

[All parameters]

| | Wide-angle end | | intermediate focal length | | telephoto end |
|---|---|---|---|---|---|
| F | 5.20 | ~ | 15.00 | ~ | 35.00 |
| FNo | 3.0 | ~ | 4.2 | ~ | 5.8 |
| ω | −39.27 | ~ | −14.79 | ~ | −6.53 |

[Lens parameters]

| Surface Number | r | d | nd | vd |
|---|---|---|---|---|
| 1 | 22.6580 | 0.9000 | 1.903660 | 31.31 |
| 2 | 16.7546 | 3.6000 | 1.603000 | 65.47 |
| 3 | 173.7135 | (d3 = variable) | | |
| 4* | 21.9913 | 0.8000 | 1.851350 | 40.10 |
| 5 | 5.0876 | 3.2000 | | |
| 6 | −6.8073 | 0.7000 | 1.755000 | 52.29 |
| 7 | 21.2947 | 0.3000 | | |
| 8 | 8.0515 | 1.5000 | 1.821140 | 24.06 |
| 9* | 209.2176 | (d9 = variable) | | |
| 10 | aperture stop S | 0.3000 | | |
| 11* | 4.8173 | 1.7000 | 1.743300 | 49.32 |
| 12 | 10.9922 | 0.1000 | | |
| 13 | 6.8149 | 0.8000 | 1.903660 | 31.31 |
| 14 | 2.8338 | 3.1000 | 1.592010 | 67.05 |
| 15* | −25.9491 | 0.3000 | | |
| 16 | Flare cut stop FS | 0.7000 | | |
| 17 | 18.7998 | 0.7000 | 1.883000 | 40.77 |
| 18 | 9.2180 | (d18 = variable) | | |
| 19 | 11.1802 | 1.2000 | 1.516800 | 64.12 |
| 20 | 28.5786 | (d20 = variable) | | |
| 21 | ∞ | 0.8000 | 1.516800 | 64.12 |
| 22 | ∞ | 0.5000 | | |
| 23 | ∞ | 0.5000 | 1.516800 | 64.12 |
| 24 | ∞ | (Bf) | | |

[Aspherical Data]

Fourth surface

K = 12.6108, A4 = 1.85220E−04, A6 = −2.26860E−06, A8 = 0.00000E−00, A10 = 0.00000E−00

Ninth surface

K = −100.0000, A4 = 7.77520E−04, A6 = 2.59180E−05, A8 = −2.13670E−06, A10 = 9.21200E−08

Eleventh surface

K = −0.2317, A4 = −9.45990E−05, A6 = 6.25740E−06, A8 = 0.00000E−00, A10 = 0.00000E−00

Fifteenth surface

K = −100.0000, A4 = 1.03610E−03, A6 = 6.26560E−05, A8 = 0.00000E−00, A10 = 0.00000E−00

[Variable distance during focusing]

| | Infinite distance | | | Close distance | | |
|---|---|---|---|---|---|---|
| F, β | 5.20000 | 15.00000 | 29.75200 | −0.05000 | −0.05000 | −0.05000 |
| D0 | ∞ | ∞ | ∞ | 93.4240 | 273.3649 | 621.7957 |
| d3 | 0.83822 | 12.69829 | 23.53397 | 0.83822 | 12.69829 | 23.53397 |
| d9 | 8.49164 | 2.26178 | 0.68535 | 8.49164 | 2.26178 | 0.68535 |
| d18 | 3.33154 | 1.73374 | 12.46170 | 2.50391 | 0.52898 | 9.55383 |
| d20 | 1.98878 | 9.21679 | 7.74807 | 2.81640 | 10.42155 | 10.65594 |
| Bf | 0.93390 | 0.93390 | 0.93390 | 0.93390 | 0.93390 | 0.93390 |
| TL | 37.28407 | 48.54449 | 67.06298 | 37.28407 | 48.54449 | 67.06298 |

[Zoom lens group data]

| Group No. | First surface of group | Focal length of group |
|---|---|---|
| G1 | 1 | 52.51005 |
| G2 | 4 | −5.66394 |
| G3 | 11 | 8.03479 |
| G4 | 19 | 34.71946 |

TABLE 11-continued

[Conditional Expressions]

(5) F2/F1 = −0.108
(6) F4/F1 = 0.661
(7) N11 = 1.904
(8) R12F/R12R = 0.096
(9) R23F/R23R = 0.038

As the data table in Table 11 shows, the zoom lens ZL according to the present example satisfies all the above conditional expressions (5) to (9).

Figure 33A:
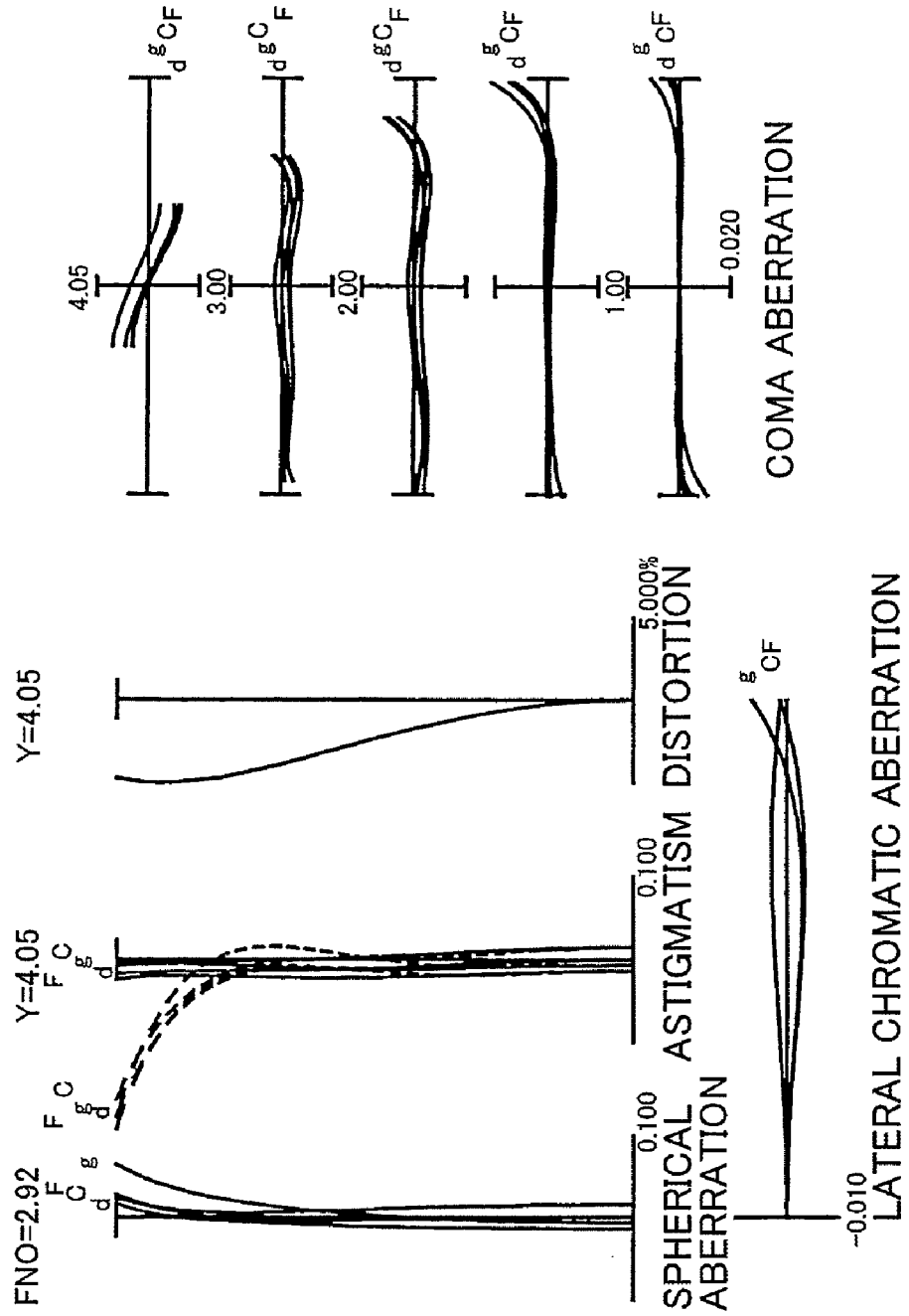
FIG. 33A is a case of a wide-angle end state.
Figure 33B:
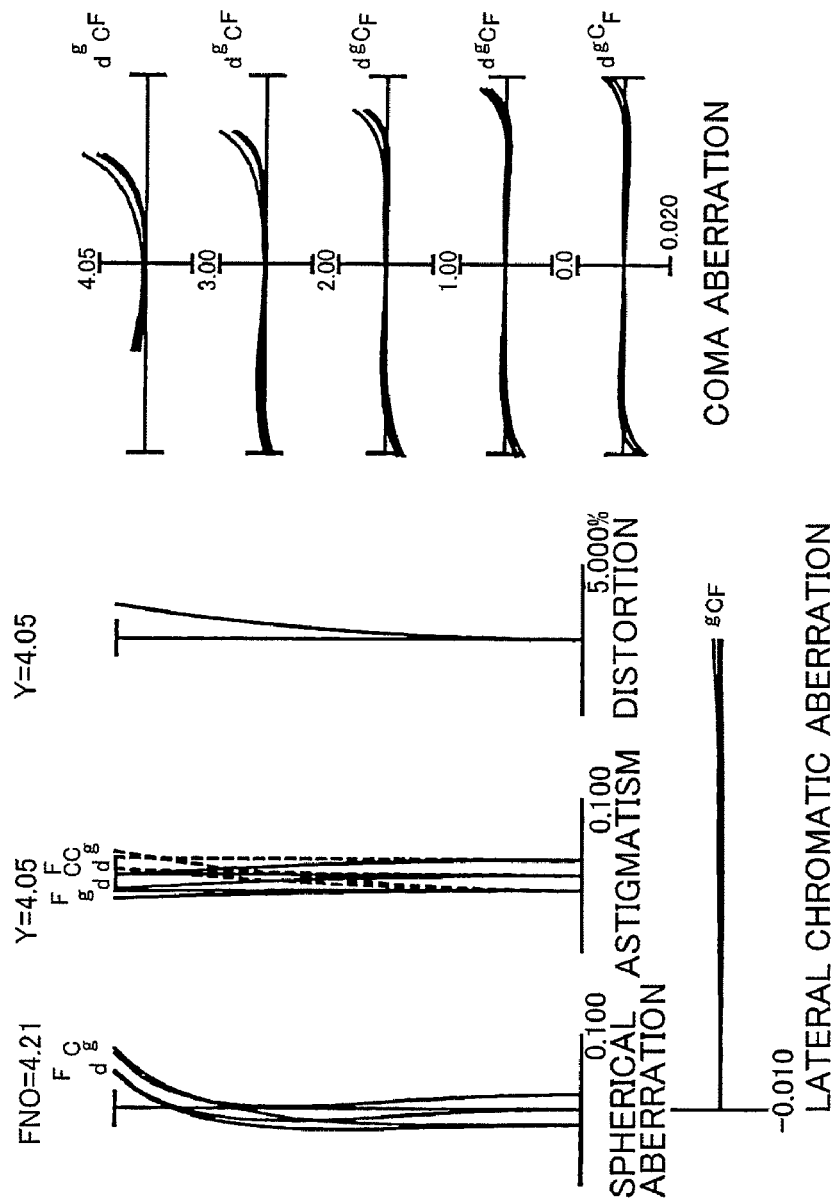
FIG. 33B is a case of an intermediate focal length state.
Figure 33C:
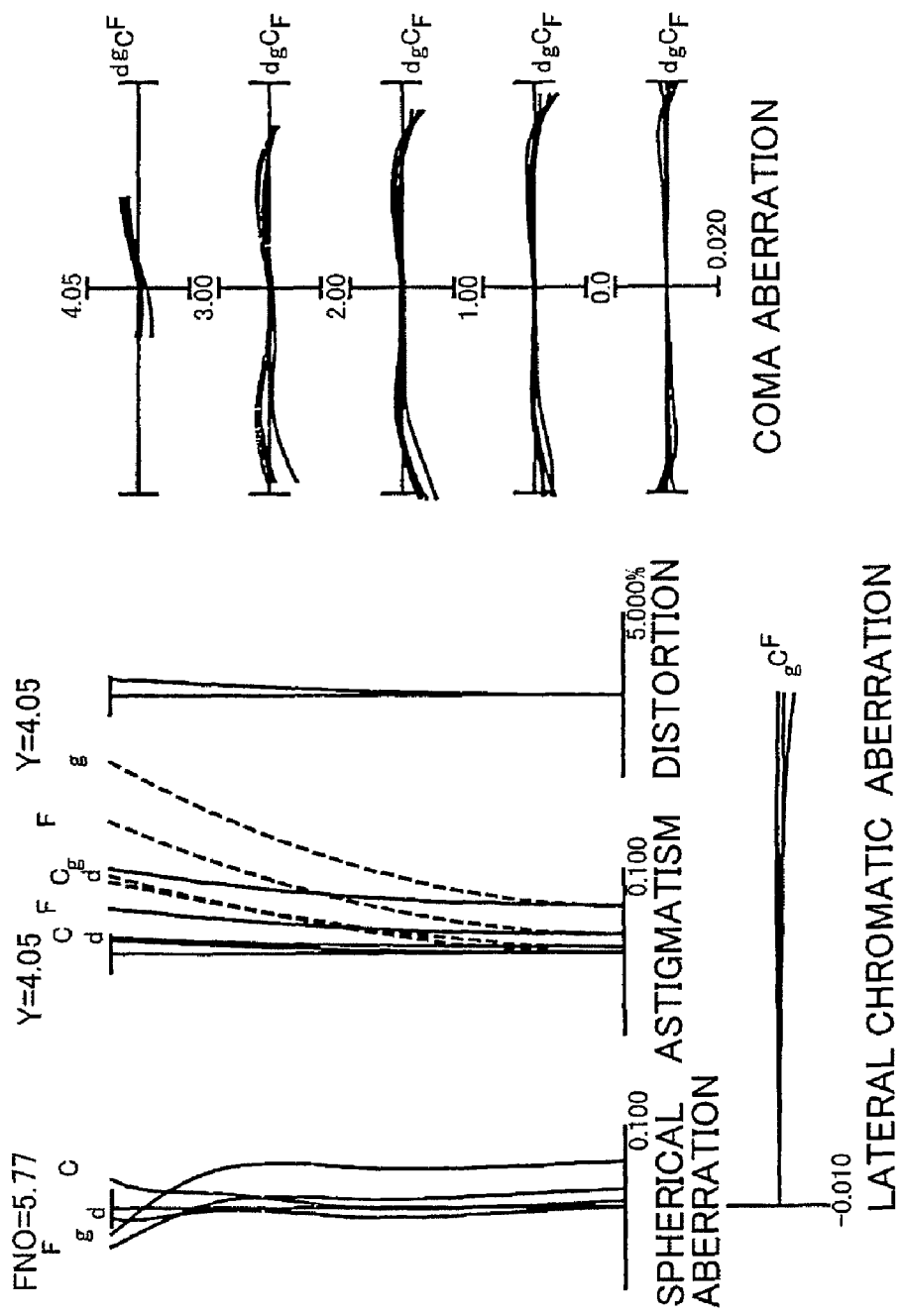
FIG. 33C is a case of a telephoto end state.
Figure 34A:
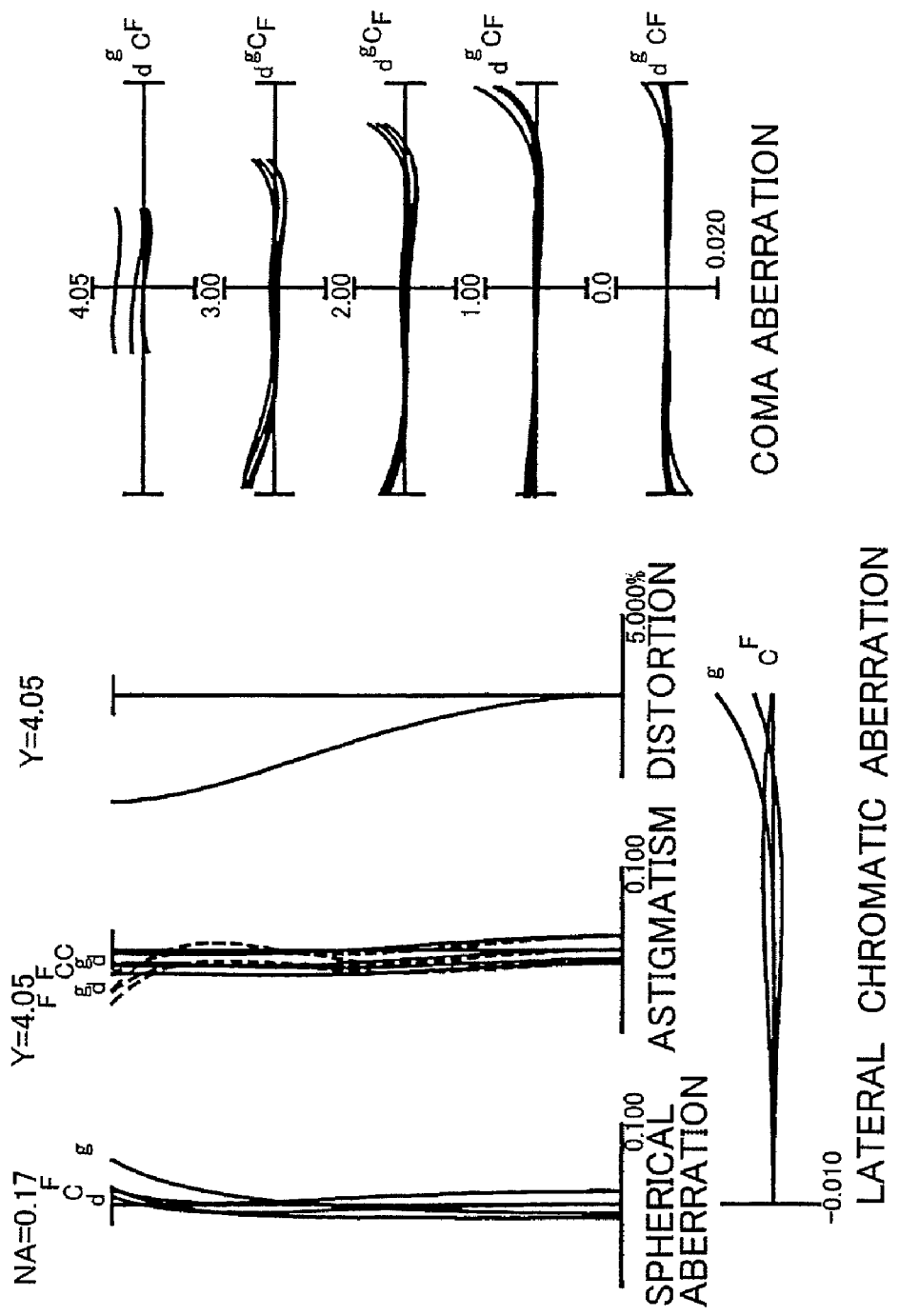
FIG. 34A is a case of a wide-angle end state.
Figure 34C:
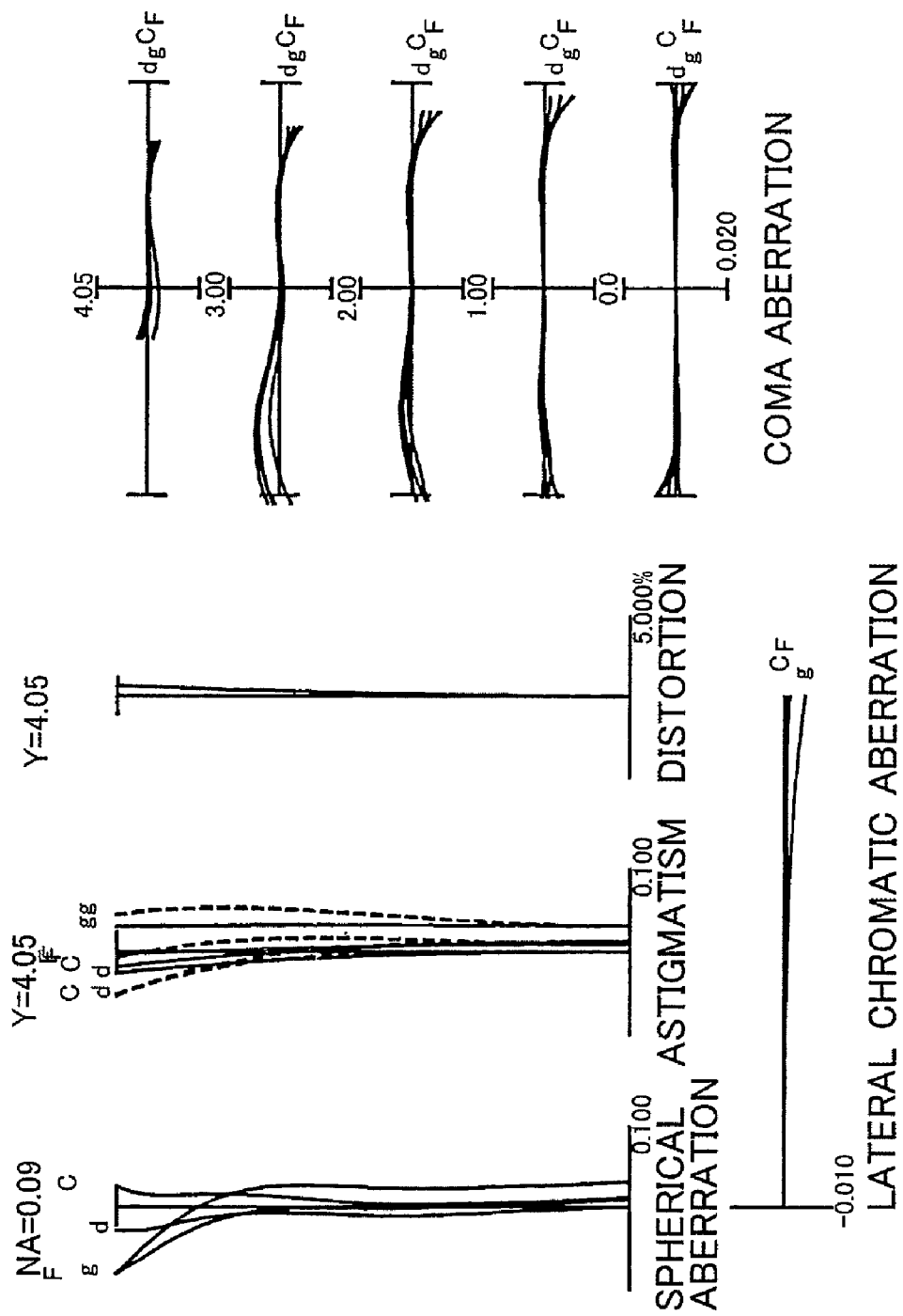
FIG. 34C is a case of a telephoto end state.

FIG. 33 are graphs showing various aberrations of the zoom lens in an infinite focusing state and lateral aberrations in the vibration proof state according to the eleventh example, where FIG. 33A is a case of wide-angle end state (F=5.20 mm), FIG. 33B is a case of the intermediate focal length state (F=15.00 mm), and FIG. 33C is a case of the telephoto end state (F=35.00 mm). FIG. 34 are graphs showing various aberrations of the zoom lens in a close distance focusing state and lateral aberrations in the vibration proof state according to the fifth example, where FIG. 34A is a case of the wide-angle end state (Rw=131 mm), FIG. 34B is a case of the intermediate focal length state (Rm=322 mm), and FIG. 34C is a case of the telephoto end state (Rt=689 mm).

As each aberration graph shows, in the zoom lens ZL according to the eleventh example, various aberrations are well corrected in both the case of each focal length state from the wide-angle end to telephoto end in the infinite focusing state, and in the case of each focal length state from the wide-angle end to telephoto end in the close distance focusing state, and excellent image formation performance is implemented.

By equipping the zoom lens ZL of the eleventh example, excellent optical performance can be insured for a digital single-lens reflex camera (optical apparatus, see FIG. 1).

In the above embodiments and examples, the following content can be used within a scope of not diminishing the optical performance.

In each of the examples described above, a four-group configuration is used as the zoom lens, but other group configurations, such as five-group and six-group, can be used.

In each of the examples, all the lens groups are moved during zooming (power change), but the intent of the present invention is not limited to this. For example, if the first lens group G1 is fixed, an eccentric aberration, due to an inter-fit difference of the moving mechanism of the first lens group G1 generated by zooming, is not generated. Also if the third lens group G3 is fixed as a vibration proof correction group, even during zooming, then the vibration proof correction mechanism and the zooming mechanism can be separated.

A single or a plurality of lens groups or a part of a lens group may be moved in the optical axis direction so as to be constructed as a focusing lens group which performs focusing from an infinite object to short distance object. This focusing lens group can be applied to auto focus, and is suitable for a motor drive (by an ultrasonic motor, for example) for auto focus. In particular, it is preferable to construct the fourth lens group G4, which is a lens group closest to the image surface side, to be the focusing lens group.

In each of the examples, the fourth lens group G4 is used for focusing in a short distance, but if the zooming mechanism of the first lens group G1 and the short distance focusing mechanism can coexist, the short distance focusing may be performed by all or a part of the first lens group G1. If the zooming mechanism of the second lens group G2 and the short distance focusing mechanism can coexist, the short distance focusing may be performed by all or a part of the second lens group G2.

A lens group or a part of a lens group may be vibrated in direction vertical to the optical axis, so as to be constructed as a vibration proof lens group for correcting an image blur generated by a motion blur. In particular, it is preferable to construct all or a part of the second lens group G2 or the third lens group G3 (pre-group G3F in particular) to be the vibration proof lens group.

Each lens surface may be aspherical. The aspherical surface may be an aspherical surface created by grinding processing, a glass mold aspherical surface created by forming glass to be an aspherical shape using a die, or a composite aspherical surface created by forming resin in an aspherical shape on the surface of glass. It is preferable to dispose an aspherical surface on each lens group. And it is particularly preferable that the surface of a single lens is aspherical.

It is preferable to dispose the aperture stop S near the third lens group G3, particularly between the second lens group G2 and the third lens group G3, but if the aperture stop S may not be disposed, then this role may be replaced by a lens frame.

An anti-reflection film having high transmittance in a wide wavelength range may be formed on each lens surface so that flares and ghosts are decreased, and good optical performance with high contrast is implemented.

In order to assist in understanding the present invention, the present invention was described with composing requirements of the embodiments, but needless to say the present invention is not limited to this.

Figure 35:
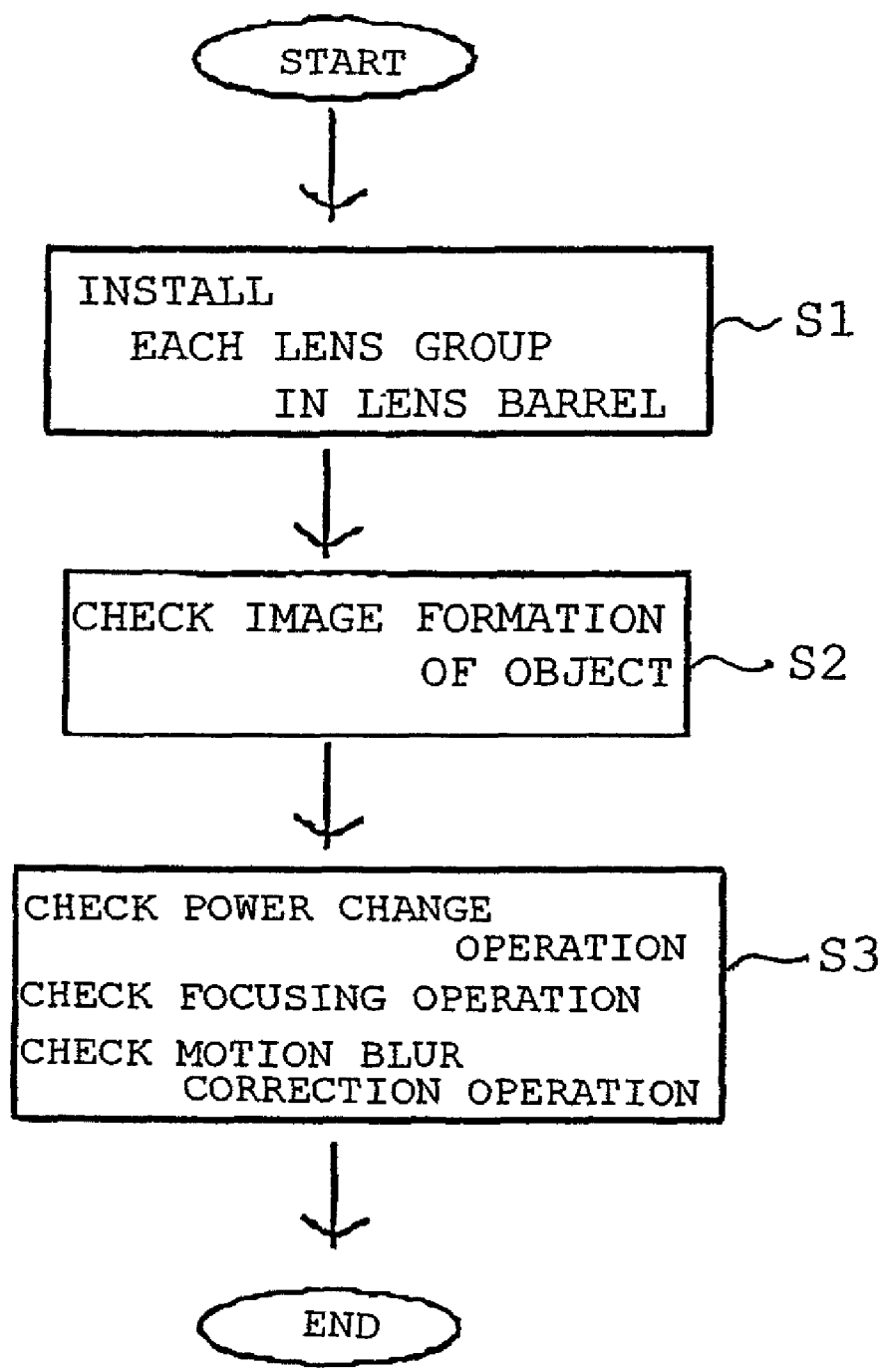
FIG. 35 is a flow chart depicting a method for manufacturing a zoom lens.

Now a method for manufacturing the zoom lens will be described with reference to FIG. 35.

First the first lens group to the fourth lens group are equipped in the cylindrical lens-barrel (step S1). When each lens group is equipped in the lens-barrel, the lens groups may be equipped in the lens-barrel one by one in sequence along the optical axis, or a part or all of the lens groups may be integrated and held by a holding element, and then equipped in the lens-barrel. After each lens group is equipped in the lens-barrel, it is preferable to check whether an image of the object is formed in a state where each lens group is equipped in the lens-barrel (step S2).

After assembling the zoom lens, as mentioned above, various operations of the zoom lens are confirmed (step S3). Examples of the various operations according to the present embodiment are the power change operation, in which the first lens group to the fourth lens group move along the optical axis during power change (specifically, upon zooming from the wide-angle end state to the telephoto end state in an infinite focusing state, the first lens group and the third lens group move to the object, the second lens group moves with a concave locus to the object, and the fourth lens group moves with a convex locus to the object), the focusing operation, in which the fourth lens group which focuses from a long distance object to a short distance object, moving along the optical axis, and the motion blur operation, in which at least a part of the lenses of the second lens group and the third group move so as to have components in a direction perpendicular to the optical axis. The sequence of confirming various operations is arbitrary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens, comprising a first lens group having a positive refractive power, a second lens group having a negative refractive power, a third lens group having a positive refractive power and a fourth lens group having a positive refractive power, which are disposed in order from an object, wherein
the first lens group comprises a 1st group-1st negative lens and a 1st group-2nd positive lens which are disposed in order from the object,
the second lens group comprises a 2nd group-1st negative lens, a 2nd group-2nd negative lens, and a 2nd group-3rd positive lens which are disposed in order from the object,
an object side lens surface of the 2nd group-1st negative lens is aspherical, and
the 2nd group-3rd positive lens has at least one aspherical surface.

2. The zoom lens according to claim 1, wherein a condition of the following expression $-0.15<F2/F1<-0.05$ is satisfied, where F1 is a focal length of the first lens group, and F2 is a focal length of the second lens group.

3. The lens group according to claim 1, wherein a condition of the following expression $0.57<F4/F1<1.30$ is satisfied, where F1 is a focal length of the first lens group, and F4 is a focal length of the fourth lens group.

4. The zoom lens according to claim 1, wherein a condition of the following expression $1.85<N11<2.30$ is satisfied, where N11 is a refractive index of the 1st group-1st negative lens.

5. The zoom lens according to claim 1, wherein the 1st group-1st negative lens and the 1st group-2nd positive lens are cemented, and the 2nd group-1st negative lens, the 2nd group-2nd negative lens and the 2nd group-3rd positive lens are all single lenses.

6. The zoom lens according to claim 1, wherein a condition of the following expression $-0.15<R12F/R12I<0.25$ is satisfied, where R12F is a radius of curvature of an object side lens surface of the 1st group-2nd positive lens, and R12I is a radius of curvature of an image side lens surface of the 1st group-2nd positive lens.

7. The zoom lens according to claim 1, wherein a condition of the following expression $-0.15<R23F/R23I<0.30$ is satisfied, where R23F is a radius of curvature of an object side lens surface of the 2nd group-3rd positive lens, and R23I is a radius of curvature of an image side lens surface of the 2nd group-3rd positive lens.

8. The zoom lens according to claim 1, wherein the third lens group comprises a 3rd group-1st positive lens, a 3rd group-2nd negative meniscus lens having a convex surface facing the object, a 3rd group-3rd positive lens, and a 3rd group-4th negative meniscus lens having a convex surface facing the object, which are disposed in order from the object.

9. The zoom lens according to claim 1, wherein the fourth lens group has a 4th group-1st positive lens having an object side lens surface having a convex surface facing the object, an absolute value of a radius of curvature of the object side lens surface of the 4th group-1st positive lens is smaller than an absolute value of a radius of curvature of the image side lens surface of the 4th group-1st positive lens, and the 4th group-1st positive lens moves to the object in a case of focusing.

10. The zoom lens according to claim 1, wherein, upon zooming from a wide-angle focal length to a telephoto focal length, the first lens group and the third lens group are moved to the object, the second lens group is moved in a concave locus facing the object, and the fourth lens group is moved in a convex locus facing the object.

11. The zoom lens according to claim 1, wherein at least one of the 1st group-1st negative lens and the 2nd group-1st negative lens is a negative meniscus lens having a convex surface facing the object.

12. The zoom lens according to claim 1, wherein the 2nd group-2nd negative lens has a biconcave shape.

13. An optical apparatus in which the zoom lens according to claim 1 is equipped.

14. The zoom lens according to claim 1, wherein the third lens group has a plurality of lenses,
a lens surface closest to the object, of the second lens group, is aspherical,
at least one surface of a lens disposed closest to the image, of the second lens group, is aspherical,
at least one surface from a lens surface closest to the object, of the third lens group, to an object side lens surface of a lens having the greatest central thickness in the third lens group is aspherical, and
at least one surface from an image side lens surface of the lens having the greatest central thickness in the third lens group to a lens surface closest to the image of the third lens group is aspherical.

15. The zoom lens according to claim 14, wherein the third lens group has a negative meniscus lens having a convex surface facing the object.

16. An optical apparatus in which the zoom lens according to claim 14 is equipped.

17. The zoom lens according to claim 14, wherein
the third lens group comprises a 3rd group-1st positive lens, a 3rd group-2nd negative lens, a 3rd group-3rd positive lens, and a 3rd group-4th negative lens, which are disposed in order from the object.

18. The zoom lens according to claim 17, wherein the lens of which central thickness is greatest in the third lens group is the 3rd group-3rd positive lens.

19. The zoom lens according to claim 1, wherein
the third lens group comprises a 3rd group-1st positive lens, a 3rd group-2nd negative lens, a 3rd group-3rd positive lens and a 3rd group-4th negative lens, which are disposed in order from the object, at least one of three surfaces of an object side lens surface of the 3rd group-1st positive lens, an image side lens surface of the 3rd group-1st positive lens, and an object side lens surface of the 3rd group-2nd negative lens is aspherical, and
at least one of three surfaces of an image side lens surface of the 3rd group-3rd positive lens, an object side lens surface of the 3rd group-4th negative lens and an image side lens surface of the 3rd group-4th negative lens is aspherical.

20. The zoom lens according to claim 19, wherein a radius of curvature of the image side lens surface of the 3rd group-2nd negative lens and a radius of curvature of the object side lens surface of the 3rd group-3rd positive lens are smaller than a radius of curvature of other lens surfaces constituting the third lens group.

21. The zoom lens according to claim 19, wherein a condition of the following expression $-0.6 < f30/f34 < -0.1$ is satisfied, where f30 is a focal length of the third lens group and f34 is a focal length of the 3rd group-4th negative lens.

22. The zoom lens according to claim 19, wherein in the third lens group, the 3rd group-2nd negative lens and the 3rd group-3rd positive lens are cemented to be a cemented lens.

23. The zoom lens according to claim 19, wherein a condition of the following expression $-0.24 < fG3F/(f34 \times N3n) < -0.05$ is satisfied, where fG3F is a composite focal length of the 3rd group-1st positive lens, the 3rd group-2nd negative lens and the 3rd group-3rd positive lens, f34 is a focal length of the 3rd group-4th negative lens, and N3n is an average refractive index of the 3rd group-2nd negative lens and the 3rd group-4th negative lens.

24. The zoom lens according to claim 19, wherein a condition of the following expression $0.03 < (Fw \times f30)/Ft^2 < 0.08$ is satisfied, where Fw is a focal length of the zoom lens in a wide-angle end state, f30 is a focal length of the third lens group, and Ft is a focal length of the zoom lens in a telephoto end state.

25. The zoom lens according to claim 19, wherein a condition of the following expression $0.28 < d33/d30 < 0.60$ is satisfied, where d33 is a thickness of the 3rd group-3rd positive lens on an optical axis, and d30 is a thickness of the third lens group on the optical axis.

26. The zoom lens according to claim 19, wherein at least a part of the third lens group is moved in a direction vertical to the optical axis of the zoom lens.

27. The zoom lens according to claim 19, wherein the image side lens surface of the 3rd group-3rd positive lens is aspherical.

28. The zoom lens according to claim 19, wherein in the third lens group, a flare cut stop is disposed between the 3rd group-3rd positive lens and the 3rd group-4th negative lens.

29. The zoom lens according to claim 19, wherein, upon zooming from a wide-angle end state to a telephoto end state, the first lens group and the third lens group are moved to the object, the second lens group is moved in a concave locus facing the object, and the fourth lens group is moved in a convex locus facing the object.

30. The zoom lens according to claim 19, wherein the fourth lens group consists of a positive meniscus lens having a convex surface facing the object, and moves to the object in a case of focusing.

31. The zoom lens according to claim 19, wherein at least one of the 3rd group-2nd negative lens and the 3rd group-4th negative lens is a negative meniscus lens having a convex surface facing the object.

32. An optical apparatus in which the zoom lens according to claim 19 is equipped 33. The zoom lens according to claim 19, wherein at least a part of the second lens group is moved in a direction vertical to the optical axis of the zoome lens.

34. The zoom lens according to claim 33, wherein a flare cut stop is disposed respectively at the object side and the image side of the second lens group.

35. A method for manufacturing a zoom lens, comprising steps of:
arranging a first lens group having a positive refractive power, a second lens group having a negative refractive power, a third lens group having a positive refractive power, and a fourth lens group having a positive refractive power, which are disposed in order from an object;
arranging, in the first lens group, a 1st group-1st negative lens and a 1st group-2nd positive lens, which are disposed in order from the object; and
arranging, in the second lens group, a 2nd group-1st negative lens, a 2nd group-2nd negative lens, and a 2nd group-3rd positive lens, which are disposed in order from the object;
wherein an object side lens surface of the 2nd group-1st negative lens is aspherical; and
wherein at least one surface of the 2nd group-3rd positive lens is aspherical.

36. The method for manufacturing a zoom lens according to claim 35, wherein the 1st group-1st negative lens and the 1st group-2nd positive lens are cemented, and the 2nd group-1st negative lens, the 2nd group-2nd negative lens and the 2nd group-3rd positive lens are all single lenses.

37. The method for manufacturing a zoom lens according to claim 35, wherein the fourth lens group is moved to the object in a case of focusing.

38. The method for manufacturing a zoom lens according to claim 35, wherein, upon zooming from a wide-angle focal length to a telephoto focal length, the first lens group and the third lens group are moved to the object, the second lens group is moved in a concave locus facing the object, and the fourth lens group is moved in a convex locus facing the object.

39. The method for manufacturing a zoom lens according to claim 35, wherein
a plurality of lenses are arranged in the third lens group;
a lens surface closest to the object, of the second lens group, is aspherical;
at least one surface of a lens closest to the image, of the second lens group, is aspherical;
at least one surface from a lens surface closest to the object, of the third lens group, to an object side lens surface of a lens having the greatest central thickness in the third lens group is aspherical; and
at least one surface from an image side lens surface of the lens having the greatest central thickness in the third lens group to a lens surface closest to the image, of the third lens group, is aspherical.

40. The method for manufacturing a zoom lens according to claim 39, wherein a 3rd group-1st positive lens, a 3rd group-2nd negative lens, a 3rd group-3rd positive lens and a 3rd group-4th negative lens are disposed in order from the object in the third lens group.

41. The method for manufacturing a zoom lens according to claim 39, wherein the fourth lens group is moved to the object in a case of focusing.

42. The method for manufacturing a zoom lens according to claim 39, wherein, upon zooming from a wideangle focal length to a telephoto focal length, the first lens group and the third lens group are moved to the object, the second lens group is moved in a concave locus facing the object, and the fourth lens group is moved in a convex locus facing the object.

43. The method for manufacturing a zoom lens according to claim 35, wherein the method further comprises the step of arranging, in the third lens group, a 3rd group-1st positive lens, a 3rd group-2nd negative lens, a 3rd group-3rd positive lens and a 3rd group-4th negative lens, which are disposed in order from the object;

at least one of three surfaces of an object side lens surface of the 3rd group-1st positive lens, an image side lens surface of the 3rd group-1st positive lens, and an object side lens surface of the 3rd group-2nd negative lens is aspherical; and at least one of three surfaces of an image side lens surface of the 3rd group-3rd positive lens, an object side lens surface of the 3rd group-4th negative lens, and an image side lens surface of the 3rd group-4th negative lens is aspherical.

44. The method for manufacturing a zoom lens according to claim 43, wherein at least one of the 3rd group-2nd negative lens and the 3rd group-4th negative lens is a negative meniscus lens having a convex surface facing the object.

45. The method for manufacturing a zoom lens according to claim 43, wherein in the third lens group, the 3rd group-2nd negative lens and the 3rd group-3rd positive lens are cemented to be a cemented lens.

46. The method for manufacturing a zoom lens according to claim 43, wherein at least a part of the third lens group is moved in a direction vertical to the optical axis of the zoom lens.

47. The method for manufacturing a zoom lens according to claim 43, wherein at least a part of the second lens group is moved in a direction vertical to the optical axis of the zoom lens.

48. The method for manufacturing a zoom lens according to claim 43, wherein, upon zooming from a wide- angle end state to a telephoto end state, the first lens group and the third lens group are moved to the object, the second lens group is moved in a concave locus facing the object, and the fourth lens group is moved in a convex locus facing the object.

49. The method for manufacturing a zoom lens according to claim 43, wherein the fourth lens group is moved to the object in a case of focusing.

* * * * *